(12) United States Patent
Tanaka et al.

(10) Patent No.: US 7,631,925 B2
(45) Date of Patent: Dec. 15, 2009

(54) DOOR FOR VEHICLE

(75) Inventors: Yoshinori Tanaka, Susono (JP);
Takayuki Tsuruta, Susono (JP); Naoya Kosaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 337 days.

(21) Appl. No.: 11/643,965

(22) Filed: Dec. 22, 2006

(65) Prior Publication Data

US 2007/0145771 A1 Jun. 28, 2007

(30) Foreign Application Priority Data

| Dec. 27, 2005 | (JP) | ............................. 2005-375736 |
| Dec. 28, 2005 | (JP) | ............................. 2005-378893 |
| Jul. 19, 2006 | (JP) | ............................. 2006-197017 |

(51) Int. Cl.
*B60J 5/04* (2006.01)

(52) U.S. Cl. ................................. 296/146.6; 296/146.2

(58) Field of Classification Search ................. 280/735; 296/146.6, 187.12, 146.2; 49/502; 293/121; 180/282

See application file for complete search history.

(56) References Cited

U.S. PATENT DOCUMENTS 6,053,565 A * 4/2000 Cho ...................... 296/187.12

6,095,553 A * 8/2000 Chou et al. .................. 280/735
6,456,916 B1 * 9/2002 Edgar et al. .................... 701/49
6,644,688 B1 * 11/2003 Hu et al. ...................... 280/735
2004/0216387 A1 * 11/2004 Furuse ......................... 49/502

FOREIGN PATENT DOCUMENTS

| JP | U-64-48351 | 3/1989 |
| JP | U-2-59012 | 4/1990 |
| JP | U 06-050926 | 7/1994 |
| JP | A-7-89345 | 4/1995 |
| JP | A-10-305730 | 11/1998 |
| JP | A-11-348523 | 12/1999 |
| JP | A 2000-094963 | 4/2000 |
| JP | A 2000-127880 | 5/2000 |
| JP | A-2001-206176 | 7/2001 |
| JP | A-2004-130963 | 4/2004 |
| JP | A-2005-319915 | 11/2005 |

* cited by examiner

*Primary Examiner*—Patricia L Engle
*Assistant Examiner*—Sunsurraye Westbrook
(74) *Attorney, Agent, or Firm*—Oliff & Berridge, PLC

(57) ABSTRACT

A vehicular door includes an inner door panel provided on an inner surface-side of an outer panel; a side impact beam provided between the outer panel and the inner panel; and a support member which is provided between the inner panel and the side impact beam, and which is connected to at least one of the inner panel and the side impact beam.

21 Claims, 65 Drawing Sheets

DOOR FOR VEHICLE

INCORPORATION BY REFERENCE

The disclosure of Japanese Patent Applications Nos. 2005-375736, 2005-378893, 2006-197017 filed on Dec. 27, 2005, Dec. 28, 2005, and Jul. 19, 2006, respectively, each including the specification, drawings and abstract is incorporated herein by reference in its entirety.

BACKGROUND OF THE INVENTION

1. Field of the Invention

The invention relates to a vehicular door.

2. Description of the Related Art

Japanese Patent Application Publication No. JP-A-2000-127880 describes a vehicular door, in which a side impact beam is provided to protect an occupant in a host vehicle from another vehicle when the host vehicle has a lateral collision with the other vehicle. When the host vehicle has a lateral collision with the other vehicle, the side impact beam transmits a collision load applied to the host vehicle, to a vehicle framework such as pillars, thereby absorbing and dispersing the energy applied to the host vehicle at the time of a lateral collision. In general, the side impact beam includes a cylindrical pipe, and brackets. The pipe extends in a vehicle fore-and-aft direction. The brackets are provided at the respective ends of the pipe, and connected to the vehicular door. Japanese Patent Application Publication No. JP-A-2000-94963 describes a side impact beam in which the length of the bracket portion is equal to or longer than substantially half of the entire length of the pipe.

However, because the both ends of the side impact beam support the collision load at the time of a lateral collision, there is a possibility that a bending moment may occur in the side impact beam, and the side impact beam may bend. If the side impact beam bends, the collision load that can be supported extremely decreases. The side impact beam may be reinforced to suppress the bending of the side impact beam. However, it is difficult to reinforce the side impact beam without interfering with the upward and downward movement of door glass.

Japanese Utility Model Application Publication No. JP-U-6-50926 describes a vehicular door that includes a side impact beam, and a reinforcement member (guard means) that is provided below the side impact beam to reduce an impact applied to the lumbar part of an occupant.

The height of a bumper varies among vehicles. Also, even in one vehicle, the height of the bumper varies depending on the number of occupants and the load applied to the vehicle. If the height of the bumper of the other vehicle that collides with the lateral portion of the host vehicle differs from the height of the side impact beam of the host vehicle, serious local deformation occurs in the vehicular door. In Japanese Utility Model Application Publication No. JP-U-6-50926, the reinforcement member is provided to suppress the local deformation of the vehicular door due to a lateral collision, regardless of the height of the bumper of the other vehicle. In this case, however, the size of the reinforcement member is inevitably increased. This increases the weight of the vehicular door.

SUMMARY OF THE INVENTION

The invention provides a vehicular door that has increased strength against a collision load applied to the lateral surface of a vehicle.

According to a first aspect of the invention, a vehicular door includes (a) an outer panel; (b) an inner panel provided on an inner surface-side of the outer panel; (c) a side impact beam provided between the outer panel and the inner panel; and (d) a support member which is provided between the inner panel and the side impact beam, and which is connected to at least one of the inner panel and the side impact beam.

In the vehicular door in the first aspect, because the support member is provided between the inner panel and the side impact beam, a tension load that occurs in the inner panel is transmitted to the side impact beam via the support member. Therefore, a bending moment that occurs in the side impact beam is decreased by the tension load that occurs in the inner panel. This suppresses the bending of the side impact beam. Accordingly, in the vehicular door in the first aspect, the strength against the collision load applied to the outer panel at the time of a lateral collision or the like is increased.

The support member may include a first portion and a second portion that are adjacent to each other in a vehicle-width direction. The first portion may be adjacent to the side impact beam, and the upper end of the second portion may be lower than the upper end of the first portion in a vehicle-height direction. With this configuration, because the upper end of the second portion is lower than the upper end of the first portion in the vehicle-height direction, it is possible to secure an area above the second portion so that door glass can be housed in the area when a window is open.

According to a second aspect of the invention, a vehicular door includes (a) an outer panel; (b) an inner panel provided on an inner surface-side of the outer panel; (c) a side impact beam provided between the outer panel and the inner panel; (d) a load-receiving member which is provided between the inner panel and the side impact beam, and provided away from the inner panel, and which has both end portions connected to at least one of the inner panel and the side impact beam; (e) and a support member which is provided between the load-receiving member and the side impact beam, and which is connected to at least one of the load-receiving member and the side impact beam.

In the vehicular door in the second aspect, the support member is provided between the load-receiving member and the side impact beam, and the both end portions of the load-receiving member are connected to at least one of the inner panel and the side impact beam. Therefore, the tension load that occurs in the load-receiving member is transmitted to the side impact beam via the support member. Accordingly, the bending moment that occurs in the side impact beam is decreased by the tension load that occurs in the load-receiving member. This suppresses the bending of the side impact beam. Thus, in the vehicular door in the second aspect, the strength against the collision load applied to the outer panel at the time of a lateral collision or the like is increased.

Also, in the vehicular door in the second aspect, because the load-receiving member is provided away from the inner panel, it is possible to secure an area between the load-receiving member and the inner panel so that the door glass can be housed in the area when the window is open.

In the first aspect and the second aspect of the invention, by providing the support member between the side impact beam and the inner panel, the strength against the collision load applied to the lateral surface of the vehicle is increased.

According to a third aspect of the invention, a vehicular door includes an outer panel; an inner panel provided on an inner surface-side of the outer panel; a side impact beam provided between the outer panel and the inner panel; door glass; and a support member which is connected to the lower portion of the door glass, and which is disposed between the inner panel and the side impact beam.

In the vehicular door in the third aspect, the support member is connected to the lower portion of the door glass. Therefore, the support member can be moved upward or downward along with the door glass. Also, the support member can be disposed between the inner panel and the side impact beam. Accordingly, the tension load that occurs in the inner panel can be transmitted to the side impact beam via the support member. As a result, the bending moment that occurs in the side impact beam is decreased by the tension load that occurs in the inner panel. This suppresses the bending of the side impact beam. Accordingly, in the vehicular door in the third aspect, it is possible to increase the strength against the collision load applied to the outer panel when the vehicle has a lateral collision or the like, without interfering with the upward or downward movement of the door glass.

The vehicular door in the third aspect may further include an electric motor that moves the door glass upward or downward; a sensor that detects an object beside a vehicle; a determination device that determines whether there is a possibility of a lateral collision with the object based on a signal from the sensor, and a drive device that drives the electric motor so that the support member is adjacent to the side impact beam in a vehicle-width direction when the determination device determines that there is the possibility of the lateral collision.

With this configuration, the sensor detects an object beside the vehicle, and the determination device determines whether there is the possibility of the lateral collision with the object. When the determination the determination device determines that there is the possibility of the lateral collision, the drive device drives the electric motor, and the support member is moved upward or downward along with the door glass. As a result, it is possible to make the support member adjacent to the side impact beam in the vehicle-width direction. Accordingly, with this configuration, it is possible to increase the strength against the load collision applied to the outer panel when the vehicle has a lateral collision or the like, regardless of the operating state of the door glass in the vehicle-height direction.

According to a fourth aspect of the invention, a vehicular door includes an outer panel; an inner panel provided on an inner surface-side of the outer panel; door glass; and a reinforcement member which has a first portion and a second portion, and which is connected to the lower portion of the door glass, and provided between the outer panel and the inner panel. The first portion extends in a vehicle fore-and-aft direction, and has both end portions each of which is adjacent to a vehicle framework member in a vehicle-width direction. The second portion is continuous with the first portion, and extends in the vehicle-width direction.

In the vehicular door in the fourth aspect, the reinforcement member is provided between the outer panel and the inner panel, and the both end portions of the first portion that extends in the vehicle fore-and-aft direction are adjacent to the vehicle framework member in the vehicle-width direction. Therefore, the collision load can be supported by the tension load that occurs in the first portion.

Because the reinforcement member also includes the second portion that is continuous with the first portion, and extends in the vehicle-width direction, the tension load that occurs in the inner panel is transmitted to the first portion via the second portion. Therefore, the bending moment that occurs in the first portion is decreased by the tension load that occurs in the inner panel. This suppresses the bending of the first portion. Also, in the vehicular door in the fourth aspect, because the reinforcement member is connected to the door glass, the reinforcement member can be moved upward or downward along with the door glass. Accordingly, in the vehicular door in the fourth aspect, it is possible to increase the strength against the collision load applied to the outer panel when the vehicle has a lateral collision or the like, without interfering with the upward or downward movement of the door glass.

The vehicular door in the fourth aspect may further include an electric motor that moves the door glass upward or downward; a sensor that detects an object beside a vehicle; a determination device that determines whether there is a possibility of a lateral collision with the object based on a signal from the sensor, and a drive device that drives the electric motor so that the reinforcement member is disposed at a predetermined position when the determination device determines that there is the possibility of the lateral collision.

With this configuration, the sensor detects an object beside the vehicle, and the determination device determines whether there is the possibility of the lateral collision with the object. When the determination device determines that there is the possibility of the lateral collision, the drive device drives the electric motor, and the support member is moved upward or downward along with the door glass. As a result, it is possible to dispose the reinforcement member at the appropriate position where the collision load can be supported. Accordingly, with this configuration, it is possible to increase the strength against the load collision applied to the outer panel when the vehicle has a lateral collision or the like, regardless of the operating state of the door glass in the vehicle-height direction.

In the third aspect and the fourth aspect of the invention, it is possible to increase the strength against the collision load applied to the lateral surface of the vehicle, without interfering with the upward or downward movement of the door glass.

According to a fifth aspect of the invention, the vehicular door in the fourth aspect of the invention may further include an other-vehicle detection device that detects the height position of a strengthening member of a vehicle other than a host vehicle; and a drive device that moves the reinforcement member in the vehicle-height direction based on the height position of the strengthening member of the other vehicle, when there is a possibility that the host vehicle may have a lateral collision with the other vehicle. In this case, the other-vehicle detection device may detect the height position of the bumper of the other vehicle. When there is the possibility that the host vehicle may have the lateral collision with the other vehicle, the drive device may move the reinforcement member in the vehicle-height direction based on the height position of the bumper of the other vehicle, which is detected the other-vehicle detection device.

In the vehicular door in the fifth aspect, when there is the possibility of the lateral collision with the other vehicle, the drive device moves the reinforcement member in the vehicle-height direction, based on the height of the bumper of the other vehicle, which is detected by the other-vehicle detection device. Therefore, it is possible to move the reinforcement member to the appropriate height position, based on the height position of the bumper of the other vehicle that may collide with the lateral portion of the host vehicle. Also, in this vehicular door, because the reinforcement member can be moved in the vehicle-height direction, the width of the reinforcement member in the vehicle-height direction does not need to be increased. This suppresses the increase in the weight of the vehicular door.

The drive device may move the reinforcement member to a predetermined height position when the height position of the bumper of the other vehicle is not detected by the other-vehicle detection device. For example, the predetermined position is the position of the bumper of an ordinary vehicle. In this vehicular door, it is possible to move the reinforcement member to the appropriate position using the drive device, even when the height position of the bumper of the other vehicle is not detected by the other-vehicle detection device.

The vehicular door in the fifth aspect may further include a vehicle-height detection device that detects the vehicle height of the host vehicle. The drive device may move the reinforcement member, based on the vehicle height of the host vehicle, which is detected by the vehicle-height detection device.

In the vehicular door in the fifth aspect, the drive device moves the reinforcement member, based on the vehicle height of the host vehicle, which is detected by the vehicle-height detection device. Therefore, for example, even when the vehicle height of the host vehicle varies depending on the number of occupants, the load applied to the vehicle, and the like, the reinforcement member can be moved to the appropriate position when the host vehicle has a lateral collision with the other vehicle.

The vehicular door in the fifth aspect may further include a clearance change device which is disposed between the door glass and the reinforcement to connect the door glass and the reinforcement member, and which changes a clearance between the door glass and the reinforcement member. The drive device may move the reinforcement member by driving the clearance change device.

In the vehicular door in the fifth aspect, the clearance change device is disposed between the door glass and the reinforcement member, and the drive device changes the clearance between the door glass and the reinforcement member by driving the clearance change device. Therefore, the reinforcement member can be moved with the door glass closed when the host vehicle has a lateral collision with the other vehicle. This improves the safety of the occupant.

In the vehicular door in the fifth aspect of the invention, it is possible to suppress the increase in the weight of the vehicular door, and to suppress the local deformation of the vehicular door when the host vehicle has a lateral collision with the other vehicle, regardless of the height of the bumper of the other vehicle.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Figure 1A:
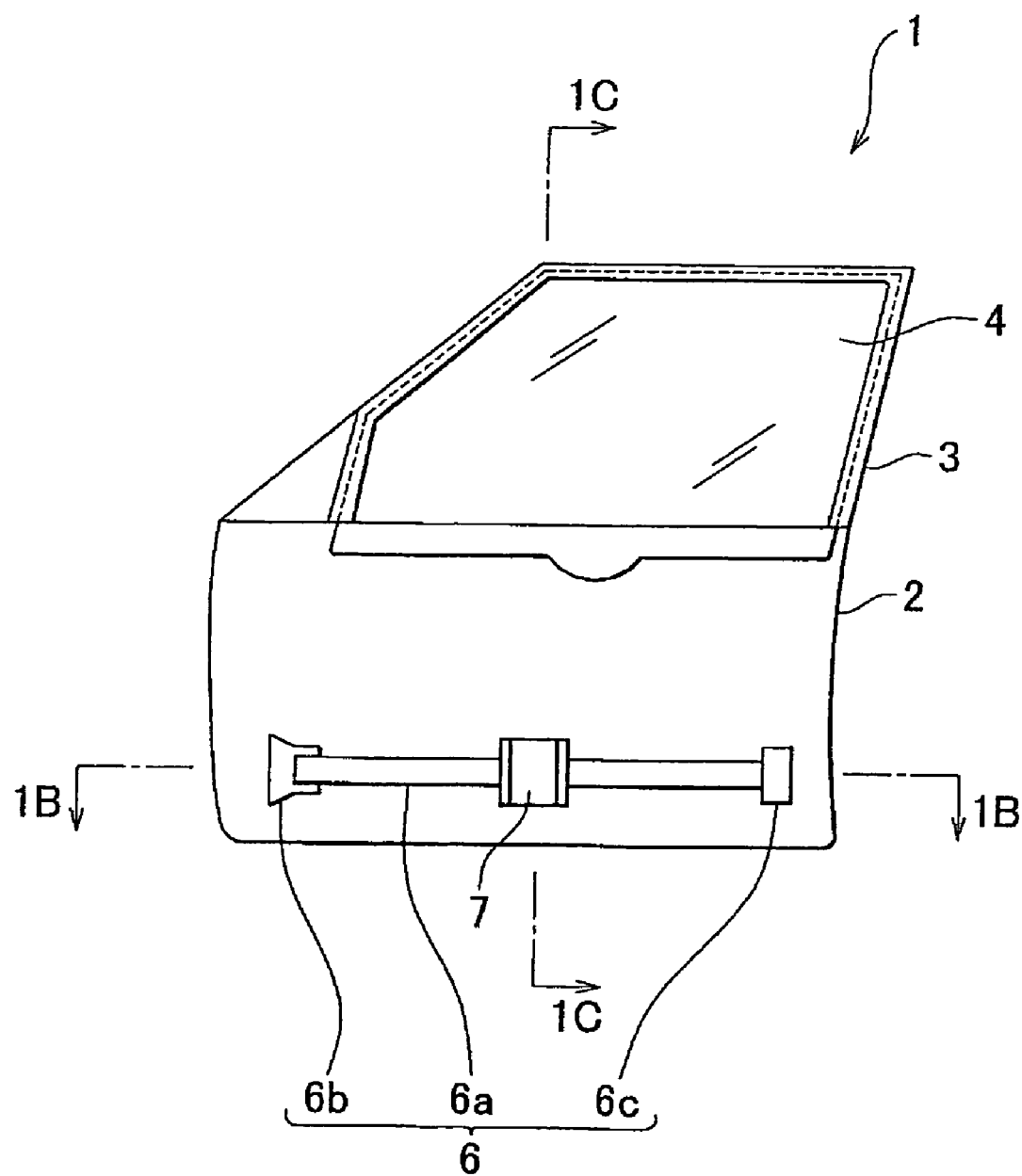
FIG. 1A is a diagrams showing a vehicular door according to a first embodiment of the invention, which is viewed from an inner surface-side.

Hereinafter, example embodiments of the invention will be described in detail with reference to the drawings. In the drawings, the same or corresponding portions are denoted by the same reference numerals.

First Embodiment

Figure 1B:
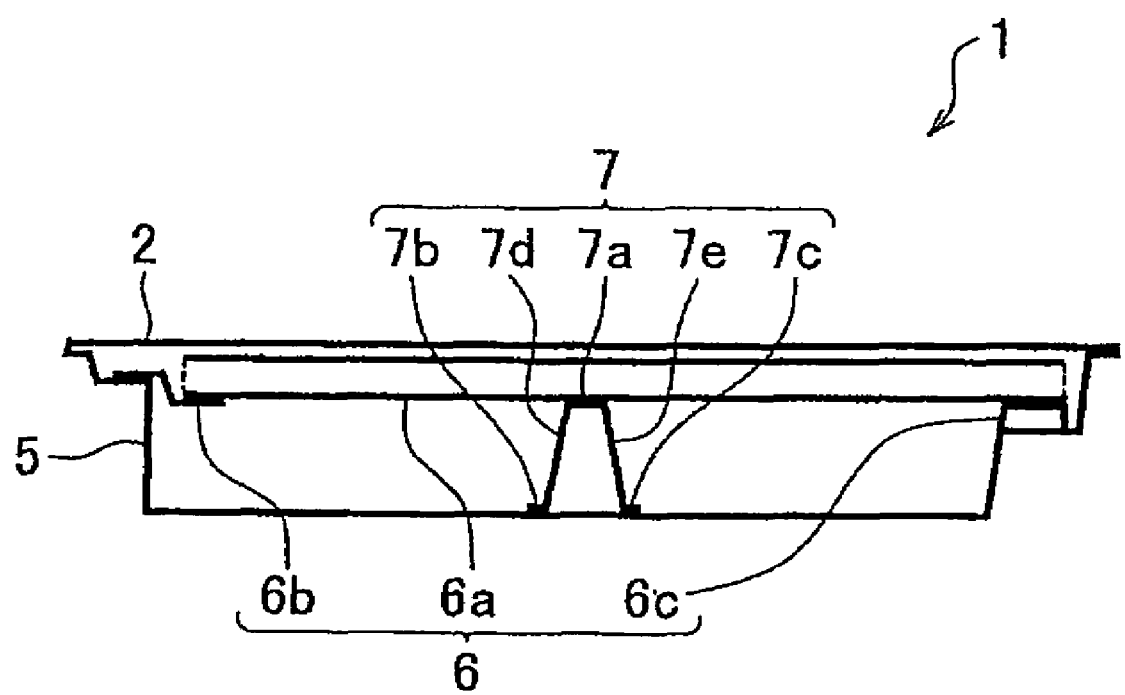
FIG. 1B is an end view of the vehicular door taken along line 1B-1B in FIG. 1A.
Figure 1C:
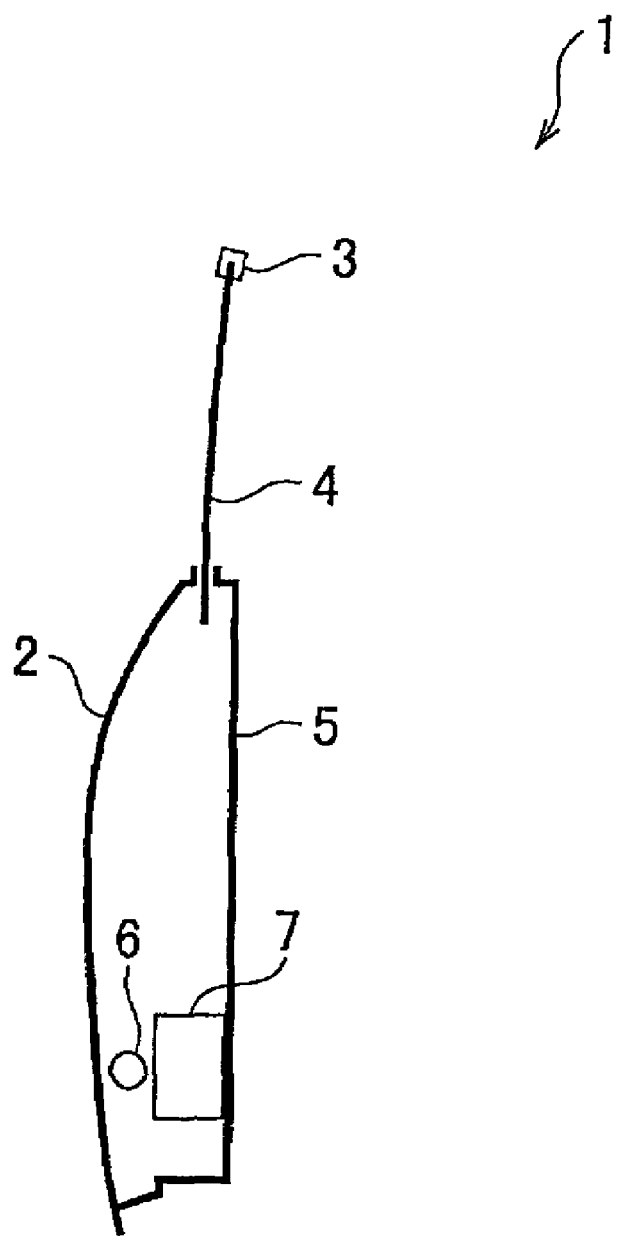
FIG. 1C is an end view of the vehicular door taken along line 1C-1C in FIG. 1A.

First, the structure of a vehicular door according to a first embodiment of the invention will be described with reference to FIGS. 1A to 1C. FIG. 1A is a diagram showing the vehicular door according to the first embodiment of the invention, which is viewed from an inner surface-side. In FIG. 1A, an inner panel is omitted so that the characteristic portions of the embodiment are clearly shown. FIG. 1B is an end view of the vehicular door taken along line 1B-1B in FIG. 1A. FIG. 1C is an end view of the vehicular door taken along line 1C-1C in FIG. 1A.

The vehicular door 1 shown in FIGS. 1A to 1C includes an outer panel 2, a door frame 3, a door glass 4, an inner panel 5, a side impact beam 6, and a support member 7.

The outer panel 2 forms the outer surface of the vehicular door 1. The outer panel 2 constitutes a part of the body of the vehicle. A door frame 3 is provided on the outer panel 2. The outer panel 2 and the door frame 3 cover the outer edge portion of the door glass 4 when a window is closed.

The inner panel 5 is provided on the inner surface-side of the outer panel 2. The outer edge portion of the inner panel 5 is connected to the outer panel 2. The portion of the inner panel 5 other than the outer edge portion is away from the outer panel 2. The side impact beam 6 is provided between the outer panel 2 and the inner panel 5.

The side impact beam 6 extends in a vehicle fore-and-aft direction. For example, the both end portions of the side impact beam 6 are connected to the inner panel 5. More specifically, the side impact beam 6 includes a pipe 6a and brackets 6b and 6c. The pipe 6a is cylindrical, and extends in the vehicle fore-and-aft direction. The bracket 6b is connected to one end of the pipe 6a. The bracket 6b is connected to, for example, the inner panel 5. The bracket 6c is connected to the other end of the pipe 6a. The bracket 6c is connected to, for example, the inner panel 5. These components are connected to each other, for example, by welding. A support member 7 is provided between the pipe 6a of the side impact beam 6 and the inner panel 5.

The support member 7 has a hat-shaped cross section. The support member 7 includes flat plate portions 7a, 7b, 7c, 7d, and 7e. The flat plate portion 7a extends along the longitudinal direction of the side impact beam 6. The flat plate portions 7b and 7c extend along the inner panel 5. The flat plate portion 7d connects one end of the flat plate portion 7a to the flat plate portion 7b. The flat plate portion 7e connects the other end of the flat plate portion 7a to the flat plate portion 7c. The flat plate portions 7b and 7c of the support member 7 are connected to the inner panel 5, for example, by welding.

It is preferable that the support member 7 should be provided to face the center portion of the side impact beam 6 in the longitudinal direction for the following reason. Only the both end portions of the side impact beam 6 are connected to, for example, the inner panel 5. Therefore, a bending moment that occurs in the side impact beam 6 is greatest at the center portion of the side impact beam 6 in the longitudinal direction. The support member 7 is formed using, for example, the same material that is used to form the inner panel 5.

Figure 2:
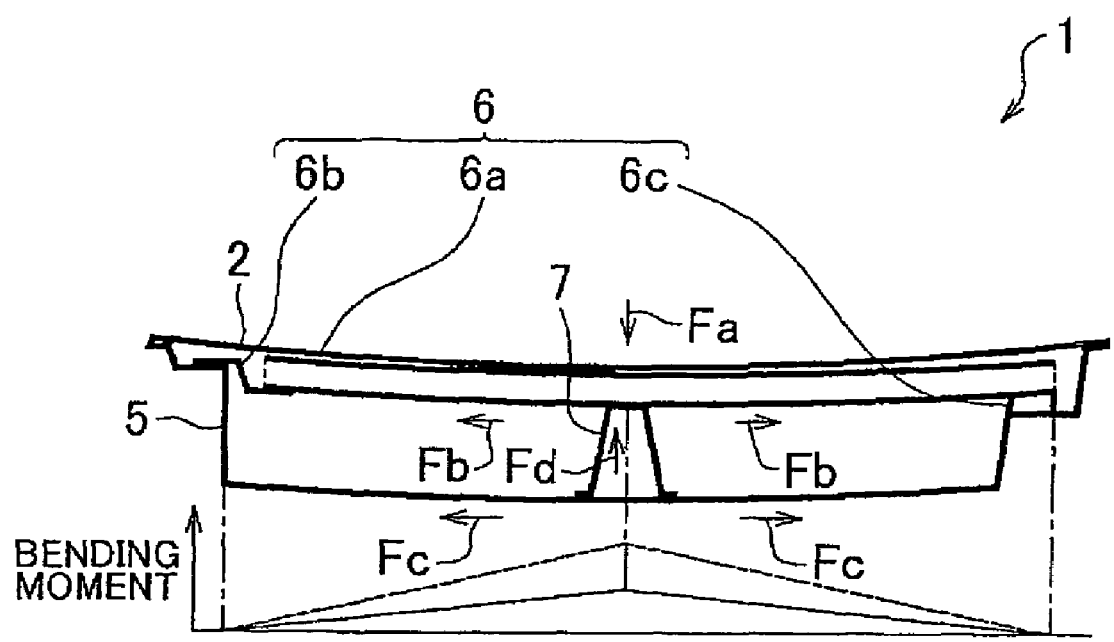
FIG. 2 is a diagram explaining a collision load applied to the vehicular door shown in FIG. 1B, and a tension load that occurs in the vehicular door shown in FIG. 1B.
Figure 3:
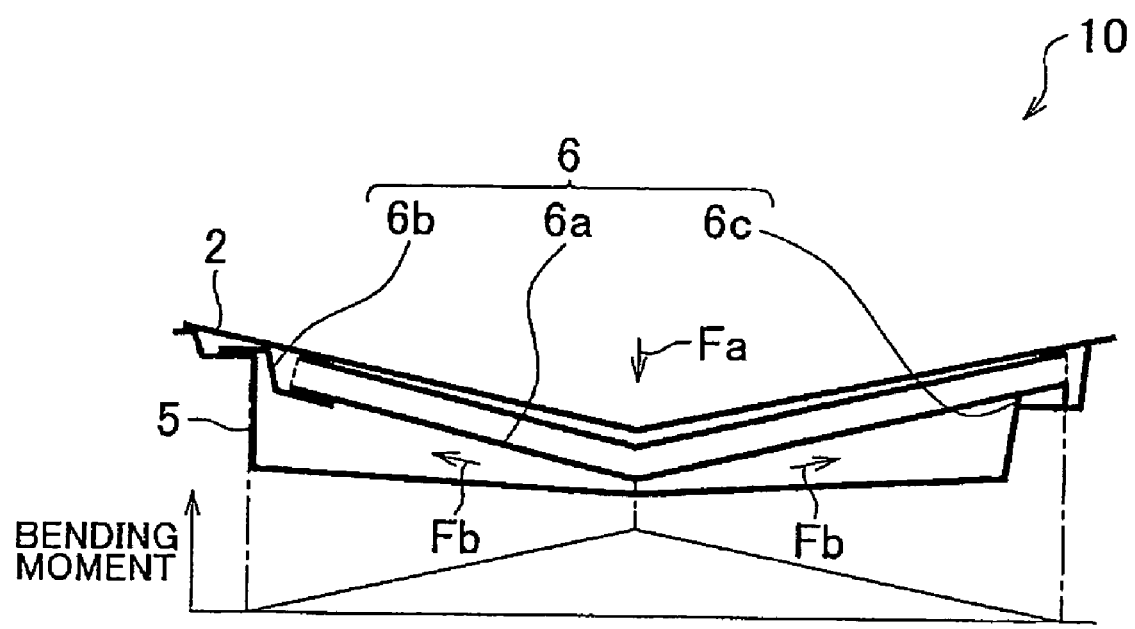
FIG. 3 is a diagram explaining a collision load applied to a conventional vehicular door, and a tension load that occurs in the conventional vehicular door.

Next, the operation of the vehicular door 1 according to the first embodiment at the time of a lateral collision will be described. FIG. 2 is a diagram explaining a collision load applied to the vehicular door shown in FIG. 1B, and a tension load that occurs in the vehicular door shown in FIG. 1B. FIG. 3 is a diagram explaining a collision load applied to a conventional vehicular door, and a tension load that occurs in the conventional vehicular door, in comparison with FIG. 2.

First, the conventional vehicular door 10 that does not include the support member 7 will be described with reference to FIG. 3. When the vehicle has a lateral collision or the like, if a collision load Fa is applied to the outer panel 2 of the conventional vehicular door 10, the collision load Fa is transmitted to the side impact beam 6 via the outer panel 2. The brackets 6b and 6c of the side impact beam 6 are connected to the inner panel 5. That is, the both end portions of the side impact beam 6 are connected to the inner panel 5. Therefore, a tension load Fb occurs in the side impact beam 6. The side impact beam 6 supports the collision load Fa using this tension load Fb.

Because the both end portions of the side impact beam 6 are connected to the inner panel 5, the bending moment occurs in the side impact beam 6. The bending moment varies depending on the collision load Fa. As shown in FIG. 3, the bending moment is greatest at the center portion of the side impact beam 6 in the longitudinal direction. The bending moment decreases toward the both end portions of the side impact beam 6.

Accordingly, if the collision load Fa and the bending moment increase, the tension load Fb in the side impact beam 6 cannot support the collision load Fa and the bending moment. As a result, the center portion of the side impact beam 6 or a portion near the center portion of the side impact beam 6 in the longitudinal direction bends. If the side impact beam 6 bends, the tension load Fb decreases. As a result, the collision load Fa that can be supported by the side impact beam 6 extremely decreases.

Next, the vehicular door 1 according to the embodiment will be described with reference to FIG. 2. As in the case of the conventional vehicular door 10, when the vehicle has a lateral collision or the like, if the collision load Fa is applied to the outer panel 2 of the vehicular door 1, the collision load Fa is transmitted to the side impact beam 6 via the outer panel 2. The tension load Fb occurs in the side impact beam 6. Further, the collision load Fa is transmitted to the inner panel 5 via the support 7, and a tension load Fc occurs in the inner panel 5. As a result, a reaction force Fd is transmitted to the side impact beam 6 via the support member 7. The reaction force Fd varies depending on the tension load Fc.

As a result, as shown in FIG. 2, the bending moment that occurs in the side impact beam 6 is decreased by the reaction force Fd, from the moment indicated by the dotted line to the moment indicated by the solid line. Accordingly, even if the collision load Fa and the bending moment are further increased, the bending of the side impact beam 6 is suppressed.

Thus, in the vehicular door 1 according to the embodiment, it is possible to increase the strength against the collision load Fa applied to the outer panel 2 when the vehicle has a lateral collision or the like.

Second Embodiment

Figure 4A:
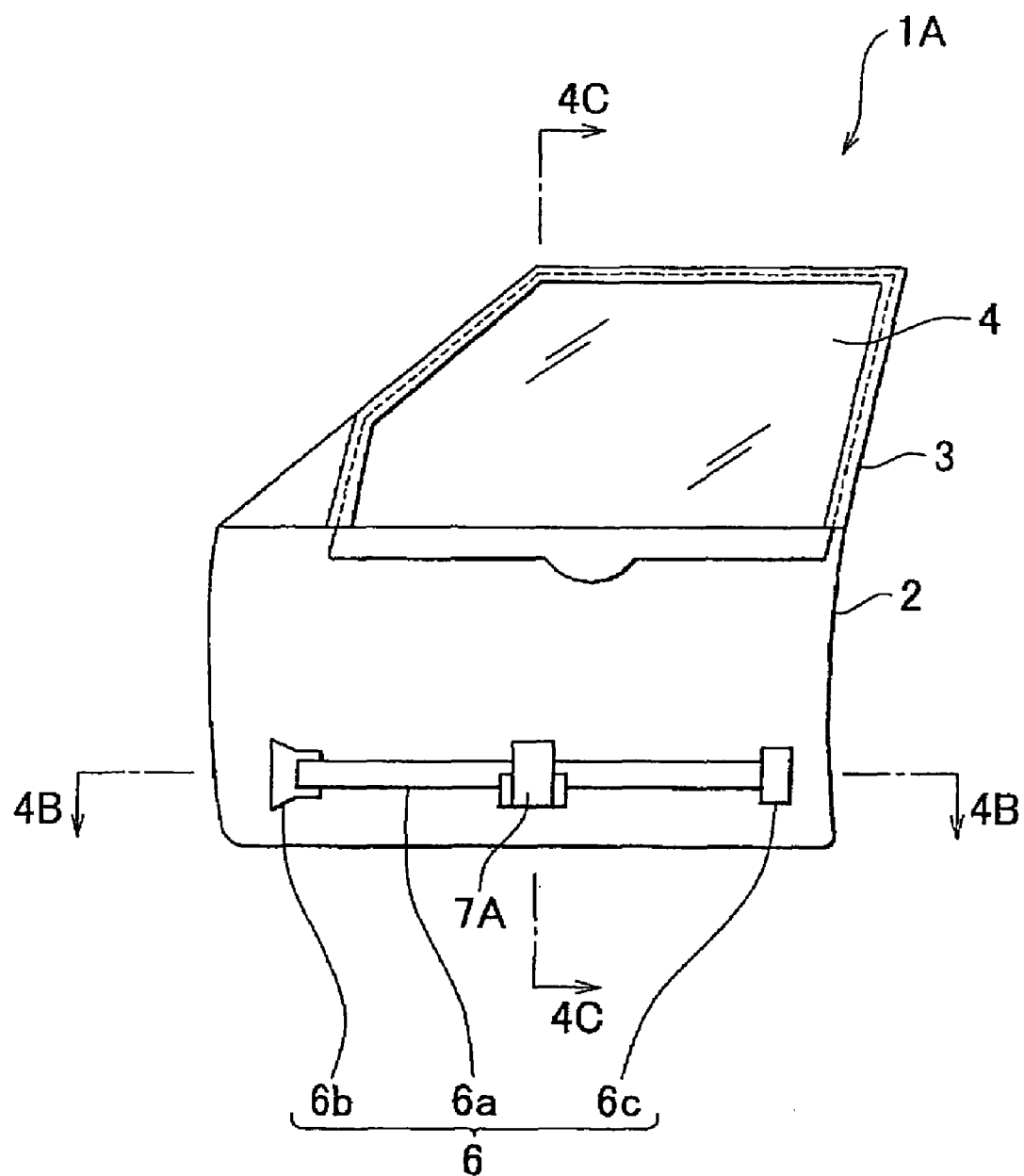
FIG. 4A is a diagram showing a vehicular door according to a second embodiment of the invention, which is viewed from the inner surface-side.
Figure 4B:
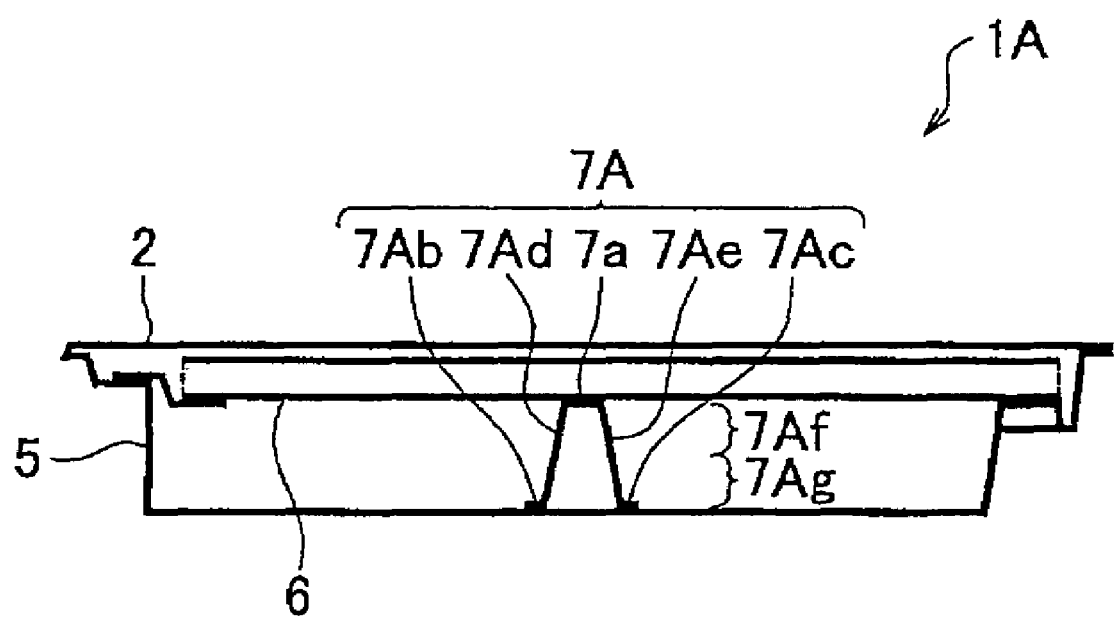
FIG. 4B is an end view of the vehicular door taken along line 4B-4B in FIG. 4A.
Figure 4C:
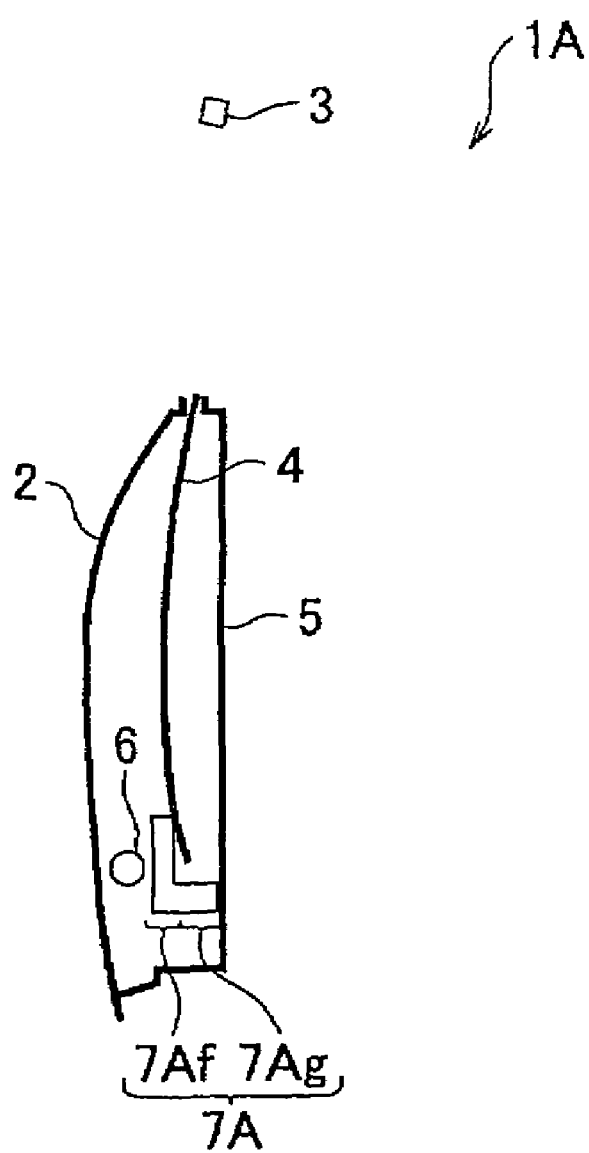
FIG. 4C is an end view of the vehicular door taken along line 4C-4C in FIG. 4A.

Next, the structure of a vehicular door according to a second embodiment of the invention will be described with reference to FIGS. 4A to 4C. FIG. 4A is a diagram showing the vehicular door according to the second embodiment of the invention, which is viewed from the inner surface-side. In FIG. 4A, the inner panel is omitted so that the characteristic portions of the embodiment are clearly shown. FIG. 4B is an end view of the vehicular door taken along line 4B-4B in FIG. 4A. FIG. 4C is an end view of the vehicular door taken along line 4C-4C in FIG. 4A.

The vehicular door 1A shown in FIGS. 4A to 4C differs from the vehicular door 1 in the first embodiment in that the vehicular door 1A includes a support member 7A instead of the support member 7. Because the other portions of the configuration of the vehicular door 1A are the same as those of the vehicular door 1, the description thereof will be omitted.

As shown in FIG. 4B and FIG. 4C, the support member 7A differs from the support member 7 in that the support member 7A includes flat plate portions 7Ad and 7Ae instead of the flat plate portions 7d and 7e; and flat plate portions 7Ab and 7Ac instead of the flat plate portions 7b and 7c. Each of the flat plate portions 7Ad and 7Ae has an L-shaped cross section. The flat plate portions 7Ab and 7Ac are short in a vehicle-height direction.

In other words, the support member 7A includes a first portion 7Af and a second portion 7Ag that are adjacent to each other in a vehicle-width direction. The first portion 7Af includes the flat plate portion 7a, and portions of the flat plate portions 7Ad and 7Ae, which are long in the vehicle-height direction. The second portion 7Ag includes portions of the flat plate portions 7Ad and 7Ae, which are short in the vehicle-height direction, and the flat plate portions 7Ab and 7Ac. That is, the first portion 7Af is adjacent to the side impact beam 6. The upper end of the second portion 7Ag is lower than the upper end of the first portion 7Af in the vehicle-height direction.

Thus, in the vehicular door 1A in the embodiment, the support member 7A is provided instead of the support member 7 in the first embodiment. The tension load Fc that occurs in the inner panel 5 is transmitted to the side impact beam 6 via the support member 7A. Therefore, it is possible to obtain the same advantages as those obtained in the vehicular door 1 in the first embodiment.

Further, in the vehicular door 1A in the embodiment, as shown in FIG. 4C, the upper end of the second portion 7Ag of the support member 7A is lower than the upper end of the first portion 7Af of the support member 7A in the vehicle-height direction. Therefore, it is possible to secure an area above the second portion 7Ag so that the door glass 4 is housed in the area when the window is open. Accordingly, in the vehicular door 1A in the embodiment, the side impact beam 6 can be provided at any position in the vehicle-height direction. Also, it is possible to increase the strength against the collision load Fa applied to the outer panel 2 when the vehicle has lateral collision or the like.

Third Embodiment

Figure 5A:
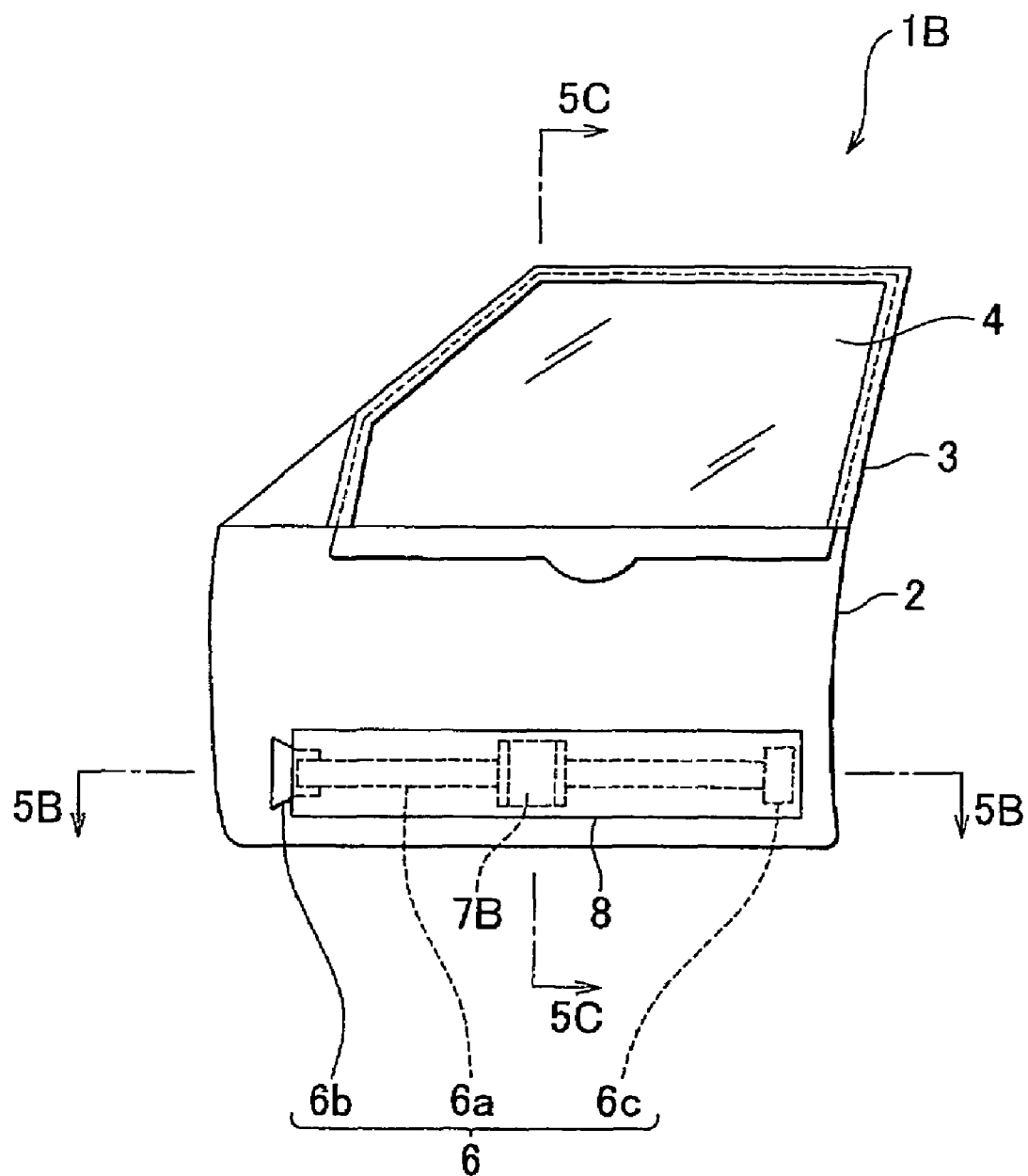
FIG. 5A is a diagram showing a vehicular door according to a third embodiment of the invention, which is viewed from the inner surface-side.
Figure 5B:
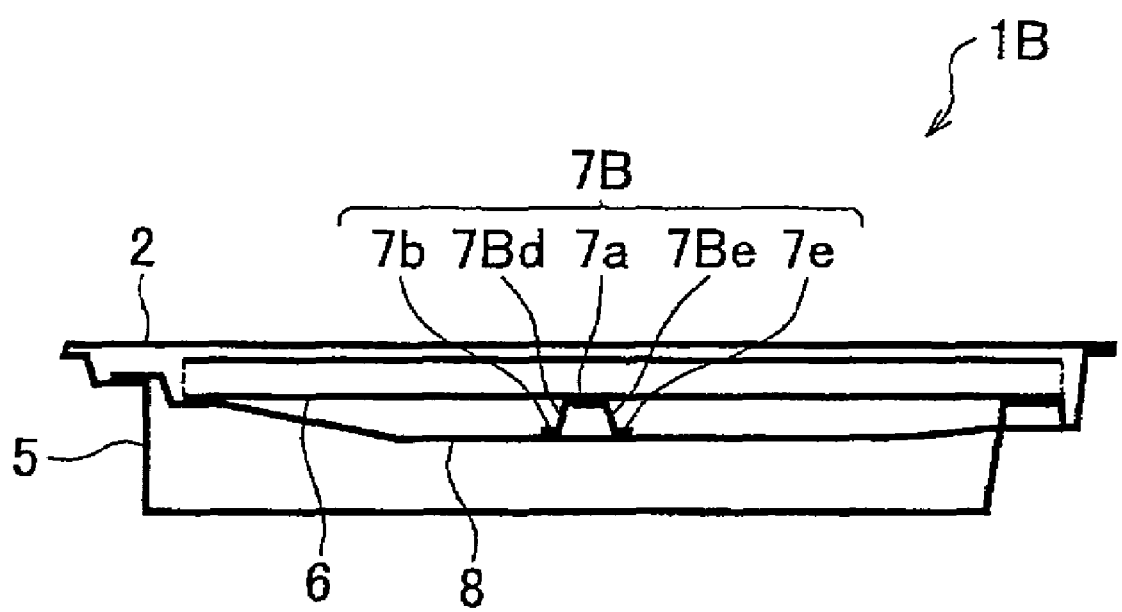
FIG. 5B is an end view of the vehicular door taken along line 5B-5B in FIG. 5A.
Figure 5C:
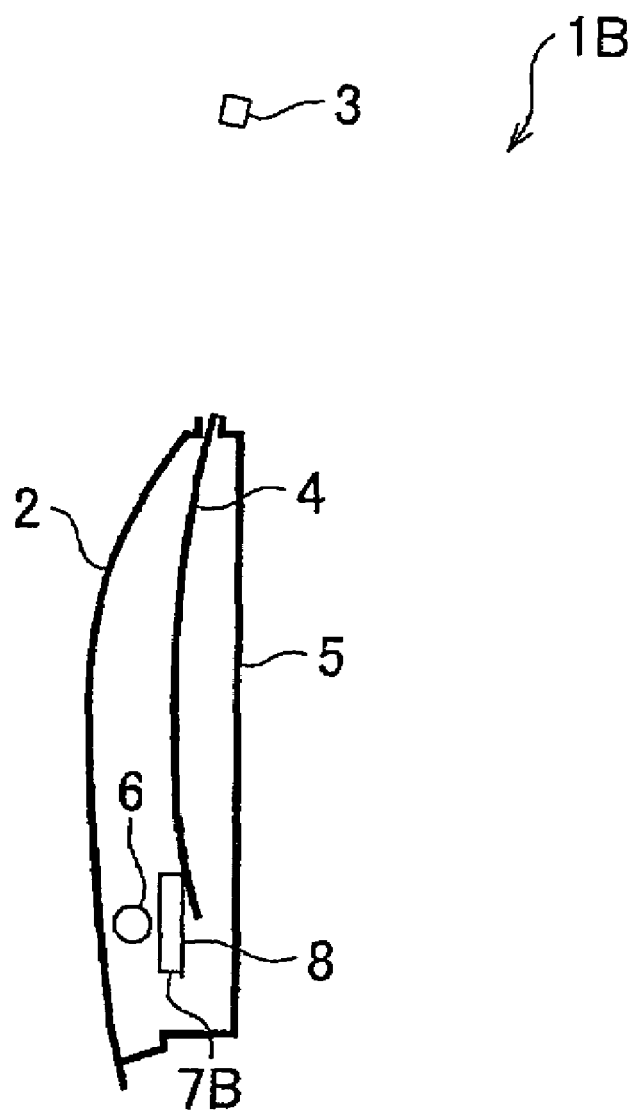
FIG. 5C is an end view of the vehicular door taken along line 5C-5C in FIG. 5A.

Next, the structure of a vehicular door according to a third embodiment of the invention will be described with reference to FIGS. 5A to 5C. FIG. 5A is a diagram showing the vehicular door according to the third embodiment of the invention, which is viewed from the inner surface-side. In FIG. 5A, the inner panel is omitted so that the characteristic portions of the embodiment are clearly shown. FIG. 5B is an end view of the vehicular door taken along line 5B-5B in FIG. 5A. FIG. 5C is an end view of the vehicular door taken along line 5C-5C in FIG. 5A.

The vehicular door 1B shown in FIGS. 5A to 5C differs from the vehicular door 1 in the first embodiment in that the vehicular door 1B further includes a load-receiving member 8, and includes a support member 7B instead of the support member 7. The other portions of the configuration of the vehicular door 1B are the same as those of the vehicular door 1. Therefore, the description thereof will be omitted.

The load-receiving member 8 is a flat plate that extends in the vehicle fore-and-aft direction. The load-receiving member 8 is provided between the side impact beam 6 and the inner panel 5. For example, both end portions of the load-receiving member 8 are connected to the inner panel 5. More specifically, one end of the load-receiving member 8 is connected to the bracket 6b of the side impact beam 6. The other end of the load-receiving member 8 is connected to the bracket 6c of the side impact beam 6. As described above, the brackets 6b and 6c of the side impact beam 6 are connected to the inner panel 5. Therefore, the both end portions of the load-receiving member 8 are connected to the inner panel 5.

The portion of the load-receiving member 8 other than the both end portions is away from the side impact beam 6 and the inner panel 5. The load-receiving member 8 is formed using, for example, the same material as that used to form the inner panel 5. The support member 7B is provided between the load-receiving member 8 and the side impact beam 6.

As shown in FIG. 5C, the support member 7B differs from the support member 7 in that the support member 7B includes flat plate portions 7Bd and 7Be instead of the flat plate portions 7d and 7e. The flat plate portions 7Bd and 7Be are shorter than the flat plate portions 7d and 7e in the vehicle-width direction. The flat plate portion 7a extends along the longitudinal direction of the side impact beam 6. The flat plate portions 7b and 7c extend along the load-receiving member 8. The flat plate portions 7b and 7c are connected to the load-receiving member 8, for example, by welding.

Figure 6:
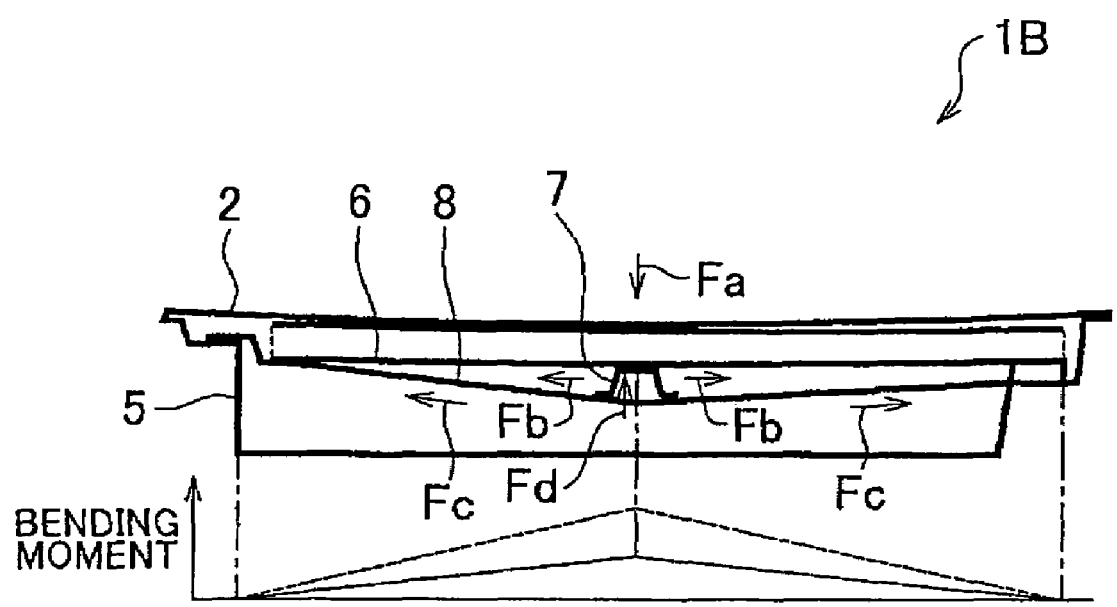
FIG. 6 is a diagram explaining the collision load applied to the vehicular door shown in FIG. 5B, and the tension load that occurs in the vehicular door shown in FIG. 5B.

Next, the operation of the vehicular door 1B according to the third embodiment at the time of a lateral collision will be described. FIG. 6 is a diagram explaining the collision load applied to the vehicular door shown in FIG. 5B, and the tension load that occurs in the vehicular door shown in FIG. 5B.

As in the case of the conventional vehicular door 10, when the vehicle has a lateral collision or the like, if the collision load Fa is applied to the outer panel 2 of the vehicular door 1B, the collision load Fa is transmitted to the side impact beam 6 via the outer panel 2. The tension load Fb occurs in the side impact beam 6. Further, the collision load Fa is transmitted to the load-receiving member 8 via the support member 7B, and the tension load Fc occurs in the load-receiving member 8. Thus, a reaction force Fd is transmitted to the side impact beam 6 via the support member 7B. The reaction force Fd varies depending on the tension load Fc.

As a result, as shown in FIG. 6, the bending moment that occurs in the side impact beam 6 is decreased by the reaction force Fd, from the moment indicated by the dotted line to the moment indicated by the solid line. Accordingly, even if the collision load Fa and the bending moment are further increased, the bending of the side impact beam 6 is suppressed.

Thus, in the vehicular door 1B according to the embodiment, it is possible to increase the strength against the collision load Fa applied to the outer panel 2 when the vehicle has a lateral collision or the like.

It is preferable that the load-receiving member 8 should be away from the side impact beam 6 so that the reaction force Fd is caused due to the tension load Fc in the load-receiving member 8.

In the vehicular door 1B in the embodiment, as shown in FIG. 5C, the load-receiving member 8 is away from the inner panel 5. Therefore, it is possible to secure an area between the load-receiving member 8 and the inner panel 5 so that the door glass 4 is housed in the area when the window is open. Accordingly, in the vehicular door 1B in the embodiment, the side impact beam 6 can be provided at any position in the vehicle-height direction. Also, it is possible to increase the strength against the collision load Fa applied to the outer panel 2 when the vehicle has a lateral collision or the like.

In the vehicular door 1B in the embodiment, a space is formed between the load-receiving member 8 and the inner panel 5. Therefore, the vehicular door 1B is easily assembled.

Fourth Embodiment

Figure 7A:
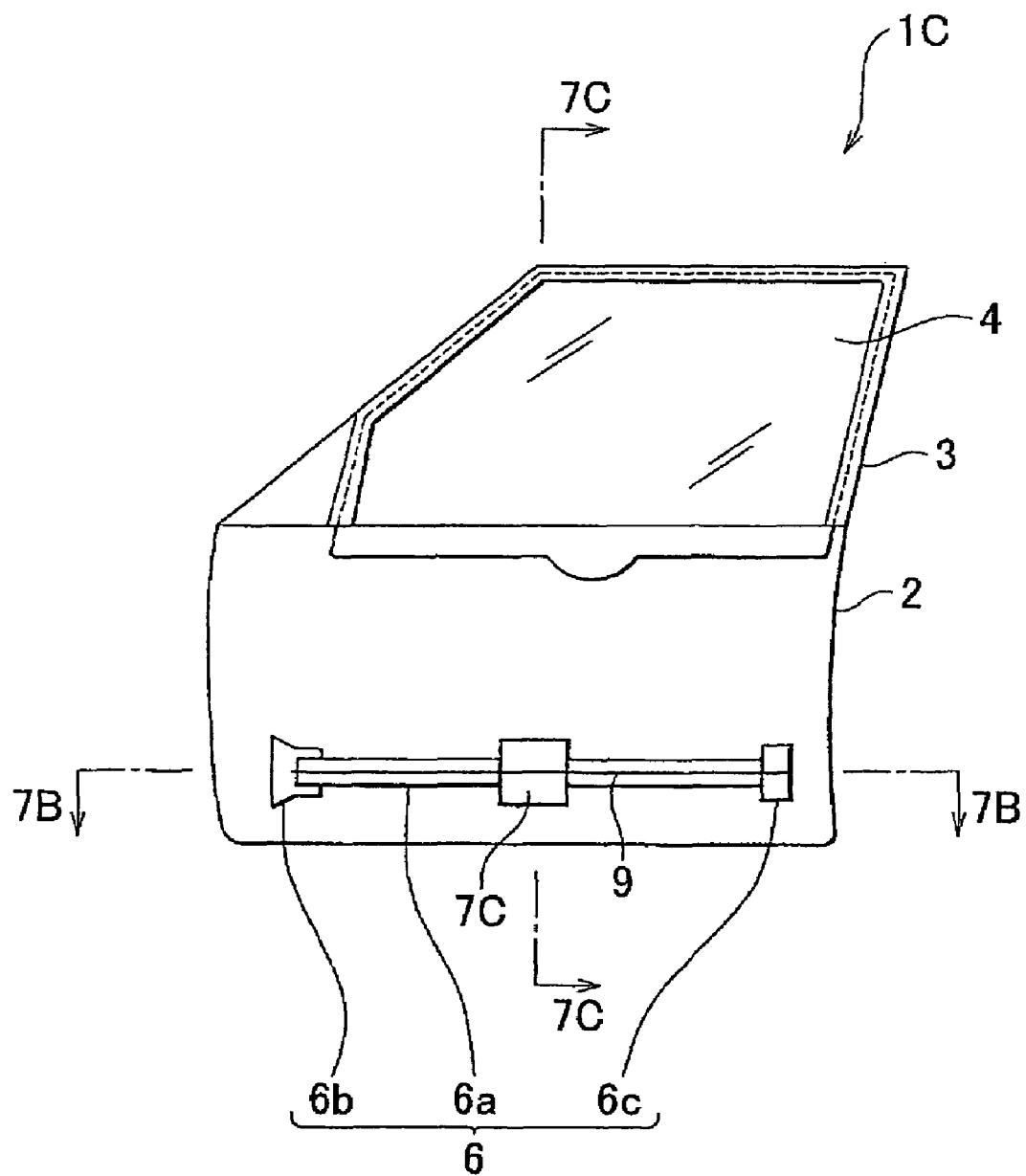
FIG. 7A is a diagram showing a vehicular door according to a fourth embodiment of the invention, which is viewed from the inner surface-side.
Figure 7B:
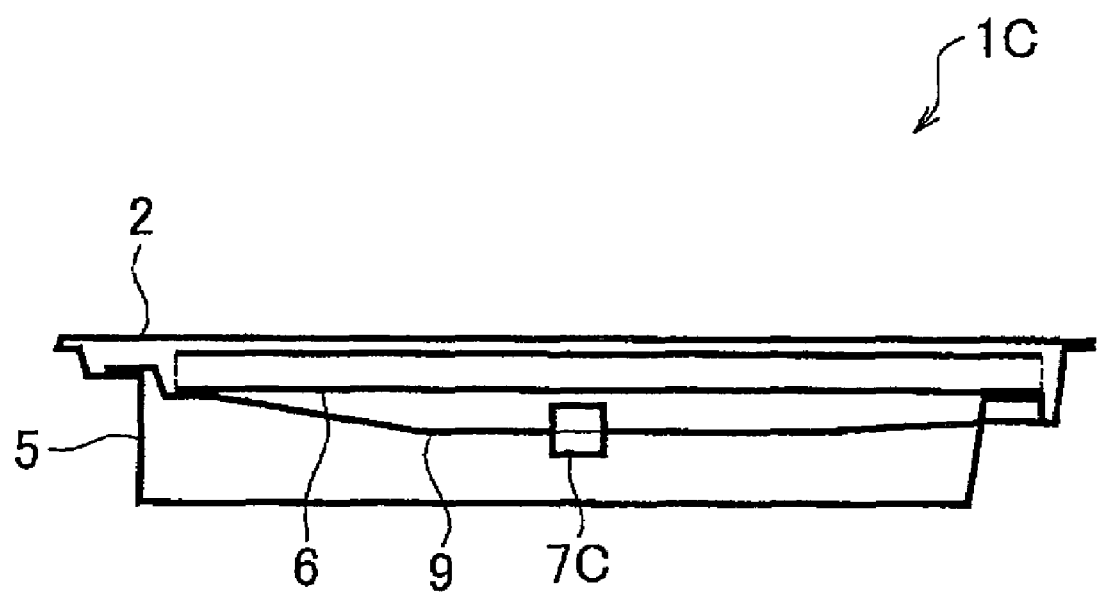
FIG. 7B is an end view of the vehicular door taken along line 7B-7B in FIG. 7A.
Figure 7C:
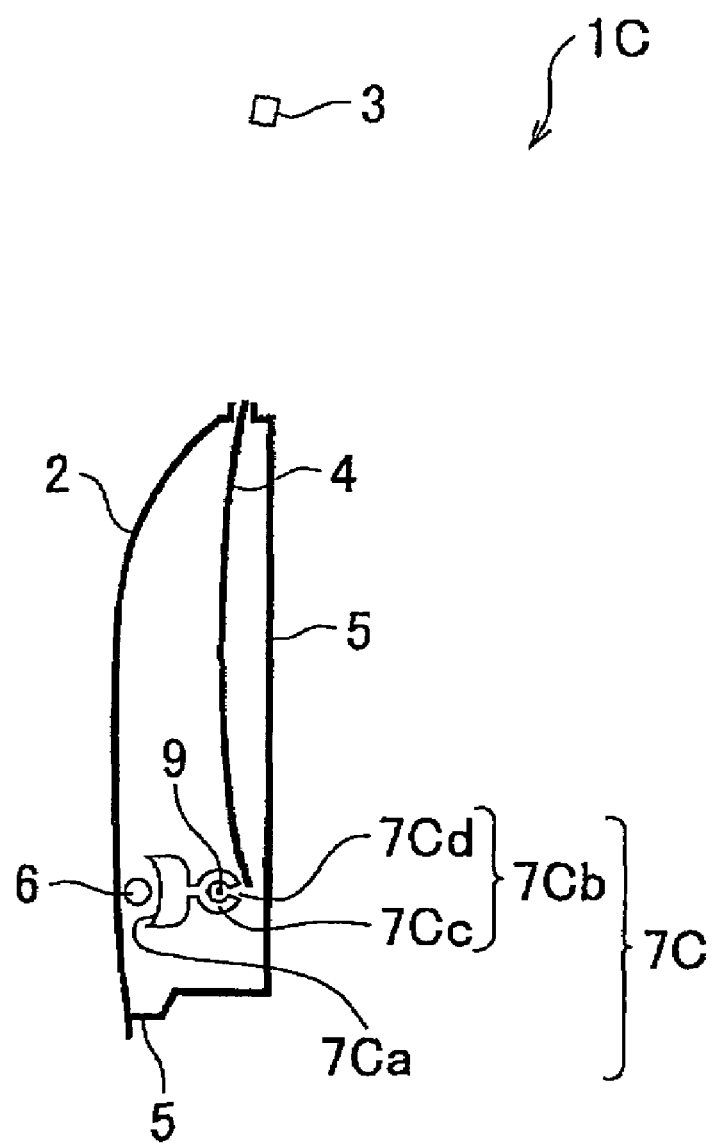
FIG. 7C is an end view of the vehicular door taken along line 7C-7C in FIG. 7A.

Next, the structure of a vehicular door according to a fourth embodiment of the invention will be described with reference to FIGS. 7A to 7C. FIG. 7A is a diagram showing the vehicular door according to the fourth embodiment of the invention, which is viewed from the inner surface-side. In FIG. 7A, the inner panel is omitted so that the characteristic portions of the embodiment are clearly shown. FIG. 7B is an end view of the vehicular door taken along line 7B-7B in FIG. 7A. FIG. 7C is an end view of the vehicular door taken along line 7C-7C in FIG. 7A.

The vehicular door 1C shown in FIGS. 7A to 7C differs from the vehicular door 1B in the third embodiment in that the vehicular door 1C includes a load-receiving member 9 instead of the load-receiving member 8; and a support member 7C instead of the support member 7B. The other portions of the configuration of the vehicular door 1C are the same as those of the vehicular door 1B. Therefore, the description thereof will be omitted.

The load-receiving member 9 is a wire that extends in the vehicle fore-and-aft direction. The load-receiving member 9 is provided between the side impact beam 6 and the inner panel 5. For example, both end portions of the load-receiving member 9 are connected to the inner panel 5. The portion of the load-receiving member 9 other than the both end portions is away from the side impact beam 6 and the inner panel 5. For example, a metallic wire is employed as the load-receiving member 9. The support member 7C is provided between the load-receiving member 9 and the side impact beam 6.

The support member 7C is a clip member. The surface 7Ca of the support member 7C is adjacent to the side impact beam 6. A protrusion portion 7Cb is provided on the side of the support member 7C, which is opposite to the surface 7Ca. The protrusion portion 7Cb includes an inner surface 7Cc and an opening 7Cd. The inner surface 7Cc extends along the outer periphery of the load-receiving member 9. The load-receiving member 9 is guided to the inner surface 7Cc through the opening 7Cd. The width of the opening 7Cd is smaller than the diameter of the load-receiving member 9. The load-receiving member 9 is held by the inner surface 7Cc of the protrusion portion 7Cb. Thus, the support member 7C is connected to the load-receiving member 9. Elastic materials such as resin materials are employed to form the support member 7C.

Thus, in the vehicular door 1C in the embodiment, the support member 7C and the load-receiving member 9 are provided, instead of the support member 7B and the load-receiving member 8 in the third embodiment, respectively. The tension load Fc that occurs in the load-receiving member 9 is transmitted to the side impact beam 6 via the support member 7C. Therefore, it is possible to obtain the same advantages obtained in the vehicular door 1C in the third embodiment.

The invention is not limited to the above-described embodiments. Various modifications may be made.

Figure 8:
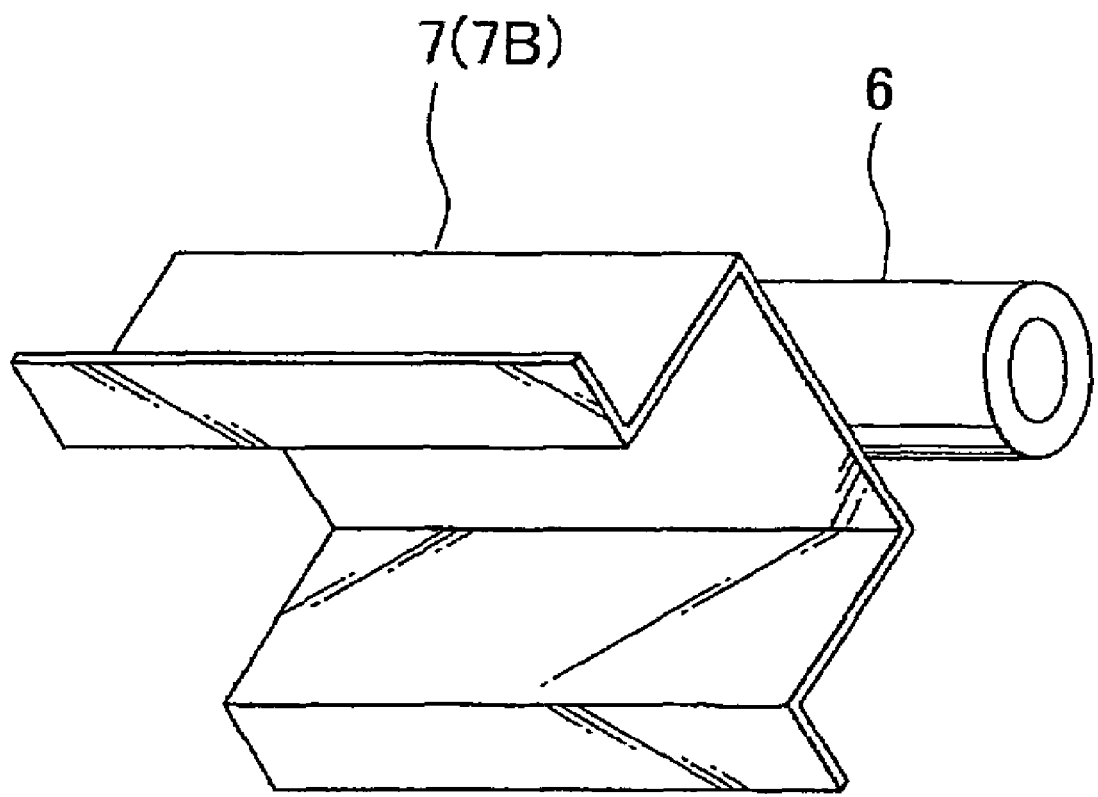
FIG. 8 is a perspective view of a support member and a side impact beam, which is viewed from an inner panel-side.

FIG. 8 is a perspective view of the support member and the side impact beam, which is viewed from the inner panel-side. As shown in FIG. 8, in the first and third embodiments, the support members 7 and 7B may be rotated by 90 degrees in a horizontal direction with respect to the lateral surface of the vehicle.

In the vehicular door 1 in the first embodiment, one support member 7 is provided. In the vehicular door 1A in the second embodiment, one support member 7A is provided. However, a plurality of support members 7 or 7A may be provided between the side impact beam 6 and the inner panel 5 in the longitudinal direction of the side impact beam 6. With this configuration, it is possible to increase the strength of the vehicular door 1 or 1A in the vehicle fore-and-aft direction.

In the vehicular door 1B in the third embodiment, one support member 7B is provided. In the vehicular door 1C in the fourth embodiment, one support member 7C is provided. However, a plurality of support members 7B or 7C may be provided in the longitudinal direction of the side impact beam 6. With this configuration, it is possible to increase the strength of the vehicular door 1B or 1C in the vehicle fore-and-aft direction.

In the vehicular door 1 in the first embodiment, the support member 7 is connected to the inner panel 5. In the vehicular door 1A in the second embodiment, the support member 7A is connected to the inner panel 5. However, the support member 7 or 7A may be connected to the side impact beam 6. Alternatively, the support member 7 or 7A may be connected to both of the inner panel 5 and the side impact beam 6.

In the vehicular door 1B in the third embodiment, the support member 7B is connected to the load-receiving member 8. In the vehicular door 1C in the fourth embodiment, the support member 7C is connected to the load-receiving member 9. However, the support member 7B or 7C may be connected to the side impact beam 6. Alternatively, the support member 7B may be connected to both of the load-receiving member 8 and the side impact beam 6. The support member 7C may be connected to both of the load-receiving member 9 and the side impact beam 6.

In the vehicular doors 1, 1A, 1B, and 1C in the above-described embodiments, the both end portions of the side impact beam 6 are connected to the inner panel 5. However, the component to which the side impact beam 6 is connected is not limited to the inner panel 5, as long as the collision load Fa can be transmitted to the vehicle framework such as pillars to absorb and disperse the energy applied when a lateral collision occurs.

In the vehicular door 1B in the third embodiment, the both end portions of the load-receiving member 8 are connected to the inner panel 5. In the vehicular door 1C in the fourth embodiment, the both end portions of the load-receiving member 9 are connected to the inner panel 5. However, the component to which the load-receiving members 8 and 9 are connected is not limited to the inner panel 5, as long as the tension load Fc can be caused when a lateral collision occurs.

The support members 7, 7A, 7B, and 7C in the embodiments may have various configurations, as long as the tension load in the inner panel 5 or the load-receiving member 8 or 9 is transmitted to the side impact beam 6 so that the bending moment that occurs in the side impact beam 6 can be reduced. Part of modified examples of the support members 7, 7A, 7B, and 7C according to the invention will be described below.

First Modified Example

Figure 9:
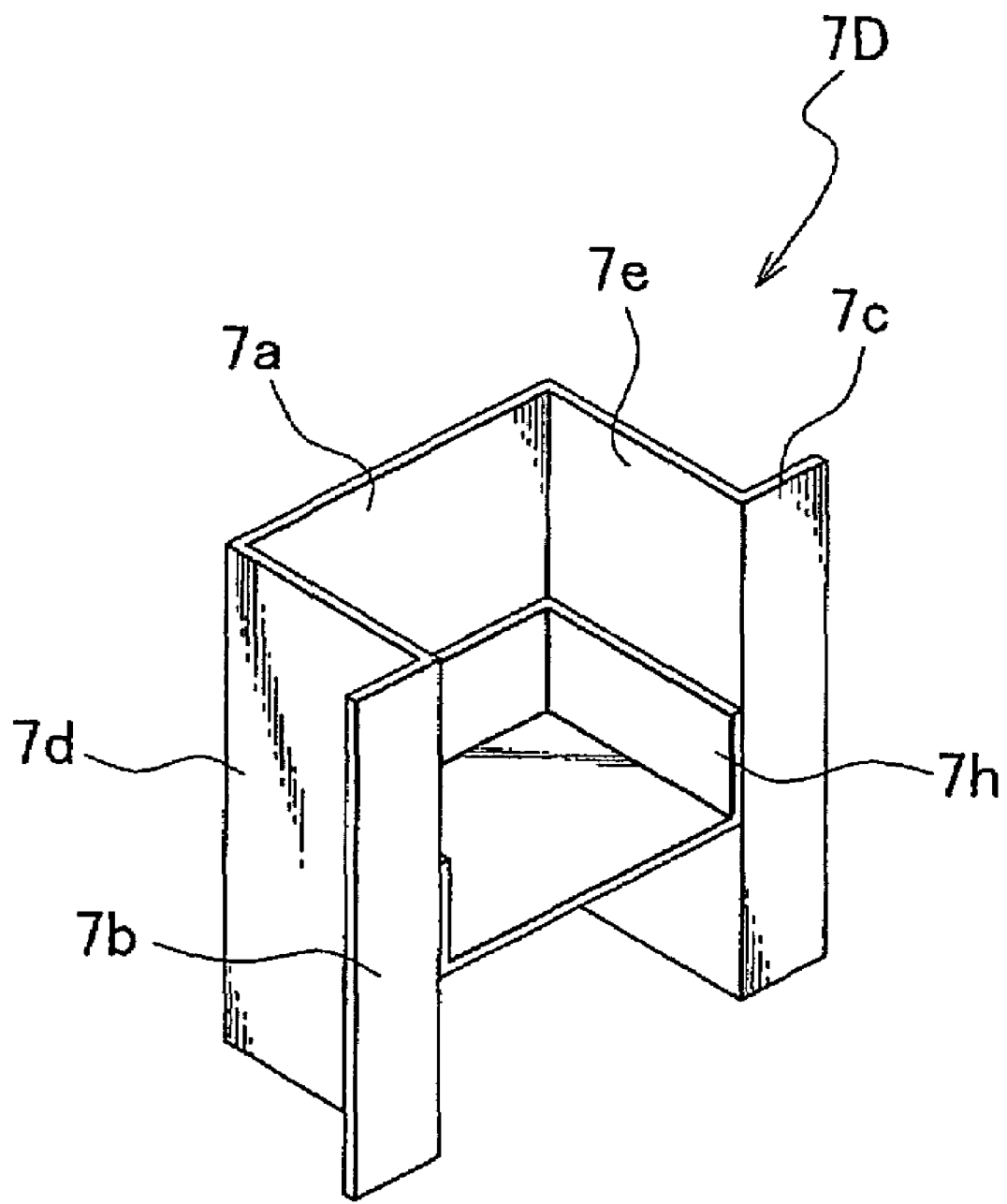
FIG. 9 is a perspective view of a support member according to a first modified example, which is viewed from the inner panel-side.

FIG. 9 is a perspective view of a support member according to the first modified example, which is viewed from the inner panel-side. The support member 7D shown in FIG. 9 differs from the support member 7 in the first embodiment in that the support member 7D further includes a bulk 7h. The bulk 7h is provided on the inner side of the support member 7D. The bulk 7h includes a flat plate portion that is orthogonal to the flat plate portions 7a, 7d, and 7e; and a flat plate portion that is formed to extend along the flat plate portions 7a, 7d, and 7e, and to have a U-shaped cross section.

The support member 7D in the first modified example is reinforced by the bulk 7h. Therefore, the support member 7D is not deformed easily. Accordingly, the flat plate portions of the support member 7D can be made thin. This decreases the weight of the support member 7D. Particularly when the support member 7D is rotated by 90 degrees in the horizontal direction with respect to the lateral surface of the vehicle as shown in FIG. 8, a great effect can be obtained.

Second Modified Example

Figure 10:
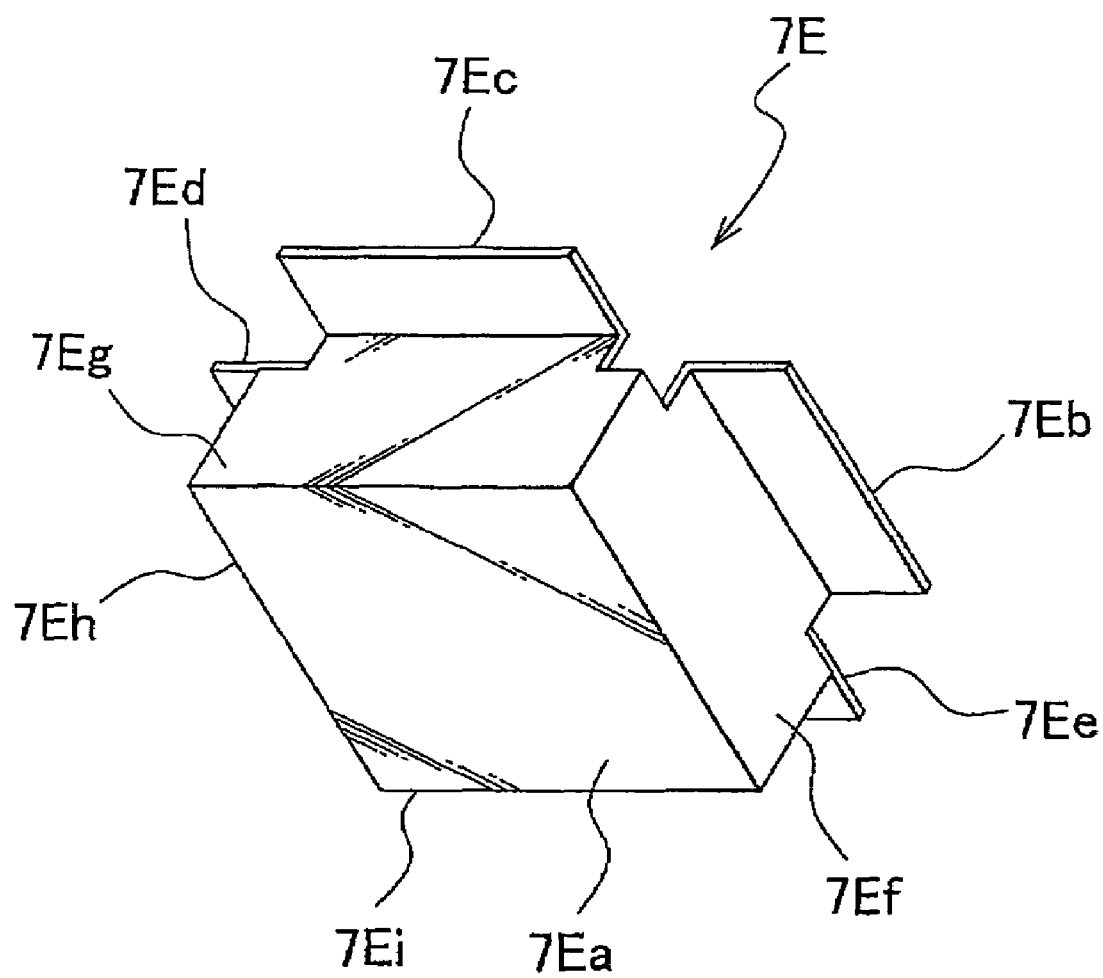
FIG. 10 is a perspective view of a support member according to a second modified example, which is viewed from a side impact beam-side.

FIG. 10 is a perspective view of a support member according to second modified example, which is viewed from the side impact beam-side. The support member 7E shown in FIG. 10 is formed using a draw mold. More specifically, the support member 7E is formed to have a cup shape by pressing using a draw mold. The support member 7E includes plate portions 7Ea, 7Eb, 7Ec, 7Ed, 7Ee, 7Ef, 7Eg, 7Eh, and 7Ei. The flat plate portion 7Ea extends along the side impact beam 6. The flat plate portions 7Eb, 7Ec, 7Ed, and 7Ee are connected to the inner panel 5. The flat plate portions 7Ef, 7Eg, 7Eh, and 7Ei are continuous with the flat plate portion 7Ea such that flat plate portions 7Ef, 7Eg, 7Eh, and 7Ei are orthogonal to the flat plate portion 7Ea. The flat plate portions 7Ef, 7Eg, 7Eh, and 7Ei are also continuous with the flat plate portions 7Eb, 7Ec, 7Ed, and 7Ee, respectively.

In the support member 7E in the second modified example, the four sides of the flat plate portion 7Ea are supported by the flat plate portions 7Ef, 7Eg, 7Eh, and 7Ei. Therefore, the support member 7E is not deformed easily. Accordingly, the flat plate portions of the support member 7E can be made thin. This decreases the weight of the support member 7E.

Third Modified Example

Figure 11:
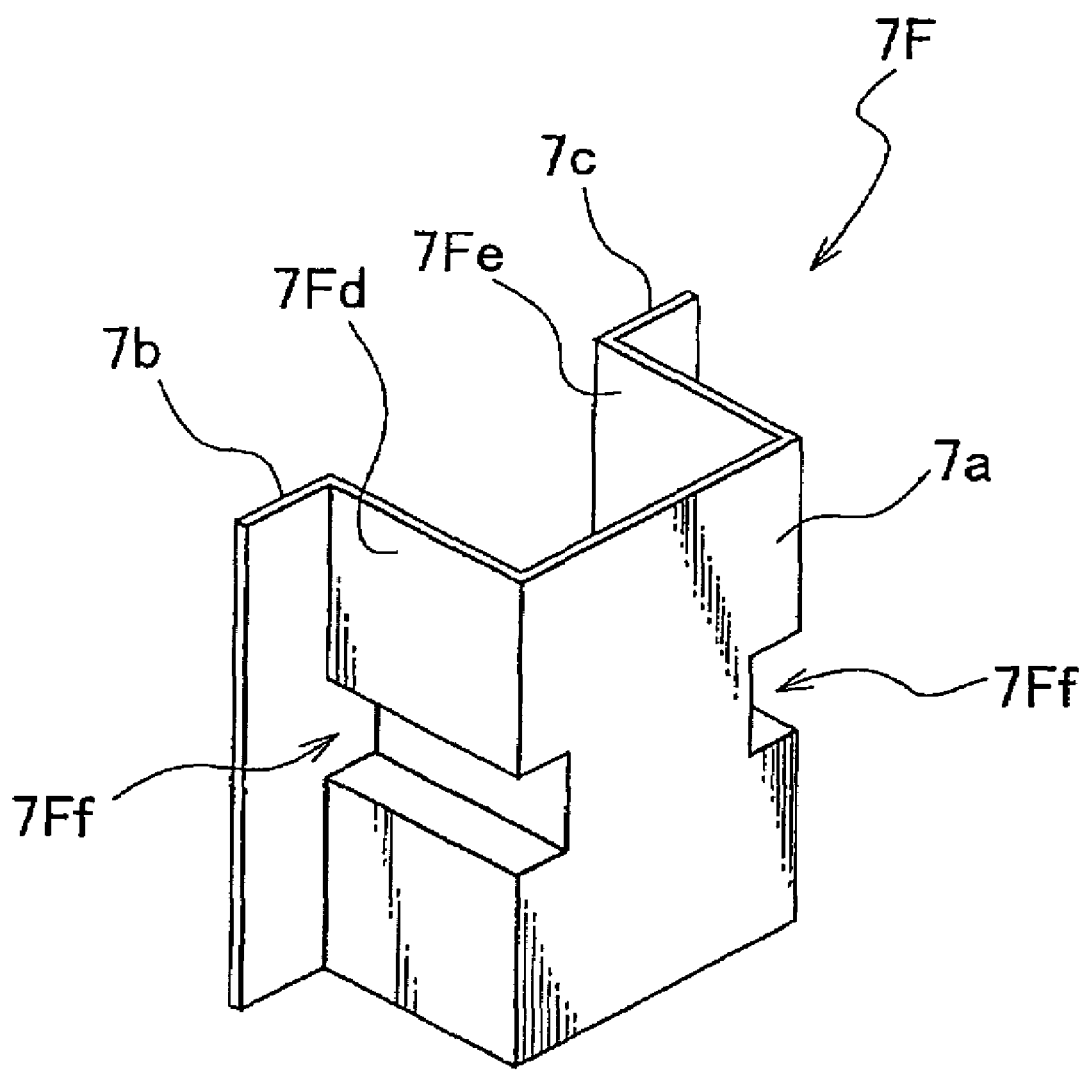
FIG. 11 is a perspective view of a support member according to a third modified example, which is viewed from the side impact beam-side.

FIG. 11 is a perspective view of a support member according to a third modified example, which is viewed from the side impact beam-side. The support member 7F shown in FIG. 11 differs from the support member 7 in the first embodiment in that the support member 7F includes flat plate portions 7Fd and 7Fe instead of the flat plate portions 7d and 7e. A bead portion 7Ff having a U-shaped cross section is provided in the flat plate portion 7Fd. The bead portion 7Ff is formed to be inwardly recessed in the support member 7F. A bead portion 7Ff is similarly provided in the flat plate portion 7Fe.

The support member 7F in the third modified example is reinforced by the bead portion 7Ff. Therefore, the support member 7F is not deformed easily. Accordingly, the flat portions of the support member 7F can be made thin. This decreases the weight of the support member 7F. Particularly when the support member 7F is rotated by 90 degrees in the horizontal direction with respect to the lateral surface of the vehicle as shown in FIG. 8, a great effect can be obtained.

Fourth Modified Example

Figure 12A:
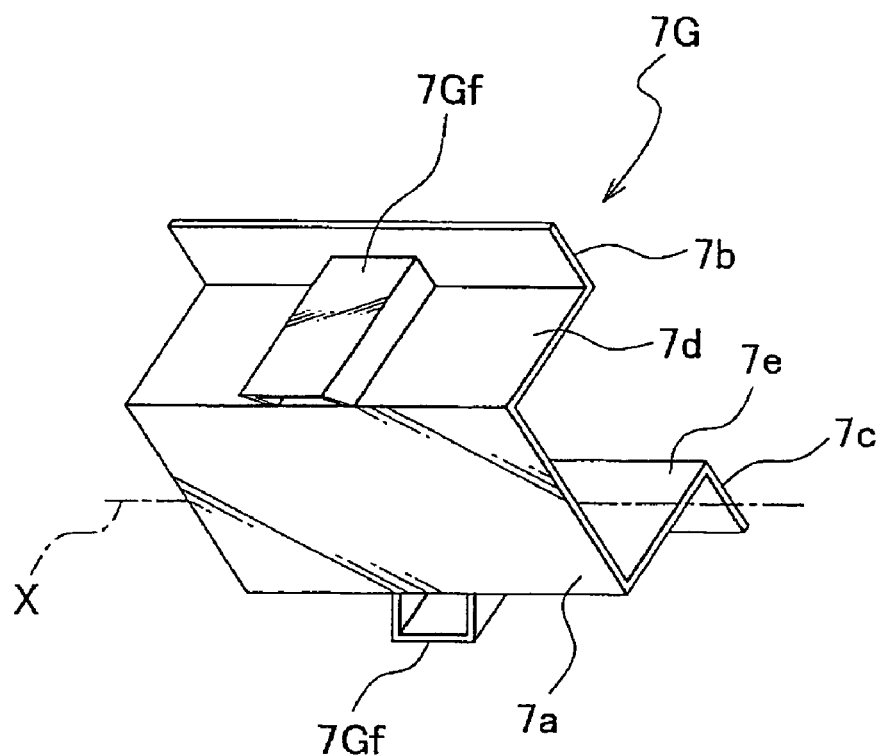
FIG. 12A is a perspective view of a support member according to a fourth modified example, which is viewed from the side impact beam-side.
Figure 12B:
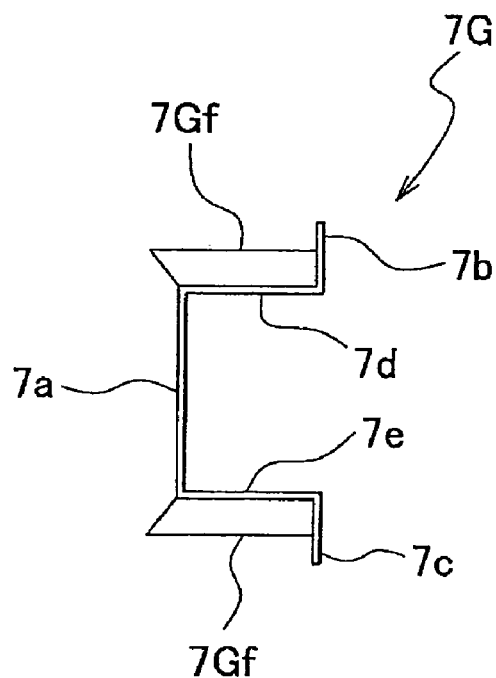
FIG. 12B is a cross sectional view of the support member, which is perpendicular to an axis X in FIG. 12A.

FIG. 12A is a perspective view of a support member according to a fourth modified example, which is viewed from the side impact beam-side. FIG. 12B is a cross sectional view of the support member, which is perpendicular to an axis X in FIG. 12A. FIG. 12A shows the support member rotated by 90 degrees in the horizontal direction with respect to the lateral surface of the vehicle as shown in FIG. 8. The support member 7G shown in FIG. 12A differs from the support member 7 in the first embodiment in that the support member 7G further includes bead portions 7Gf. The bead portion 7Gf having a U-shaped cross section is provided on the outer side of the flat plate portion 7d. The bead portion 7Gf protrudes from the flat plate portion 7a toward the side impact beam 6. The bead portion 7Gf is similarly provided on the outer side of the flat plate portion 7e.

The support member 7G in the fourth modified example is reinforced by the bead portion 7Gf. Therefore, the support member 7G is not deformed easily. Accordingly, the flat plate portions of the support member 7G can be made thin. This decreases the weight of the support member 7G.

Figure 13:
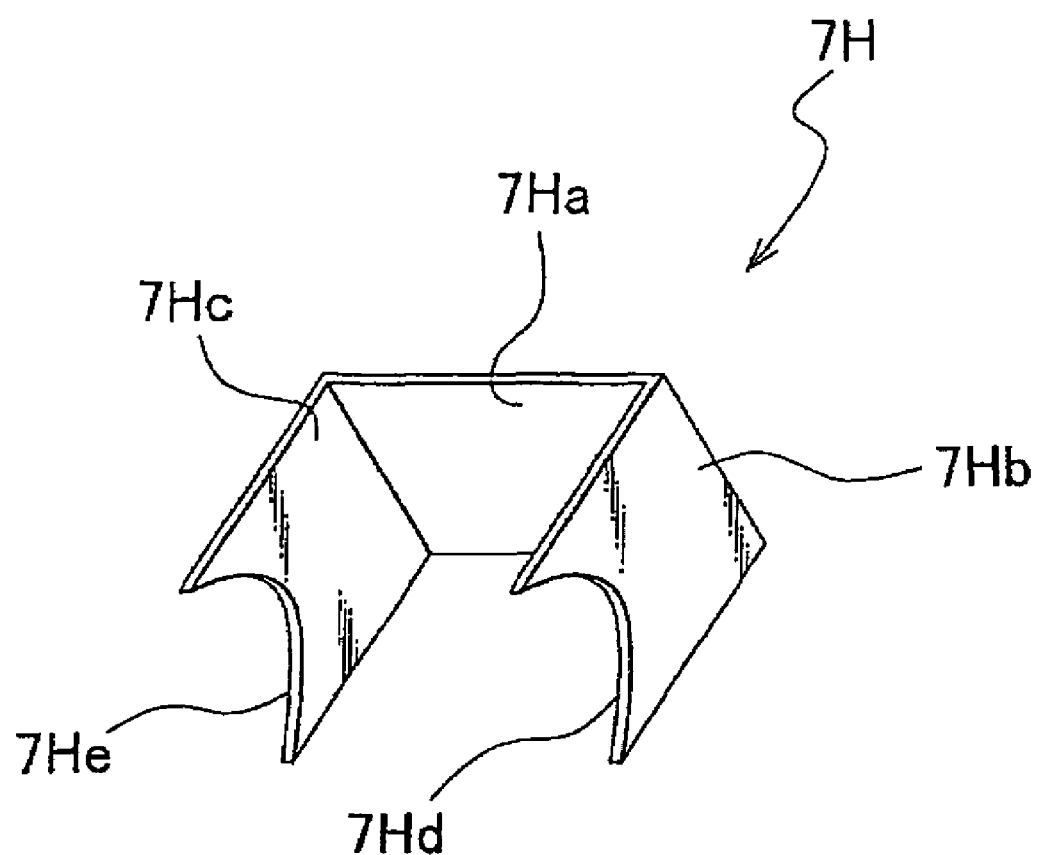
FIG. 13 is a perspective view of a support member according to a fifth modified example, which is viewed from the side impact beam-side.

Also, in the support member 7G in the fourth modified example, the bead portions 7Gf protrude. Therefore, the bead portions 7Gf guides the side impact beam 6 so that the side impact beam 6 contacts the support member 7G Fifth Modified Example FIG. 13 is a perspective view of a support member according to a fifth modified example, which is viewed from the side impact beam-side. The support member 7H shown in FIG. 13 can be connected to the side impact beam 6. The support member 7H includes flat plate portions 7Ha, 7Hb, and 7Hc. The flat plate portion 7Ha extends along the inner panel 5. The flat plate portion 7Hb is continuous with the flat plate portion 7Ha such that the flat plate portion 7Hb is orthogonal to the flat plate portion 7Ha. The flat plate portion 7Hc is positioned on the side opposite to the flat plate portion 7Hb. The flat plate portion 7Hc is continuous with the flat plate portion 7Ha such that the flat plate portion 7Hc is orthogonal to the flat plate portion 7Ha. One edge 7Hd of the flat plate portion 7Hb has an arc shape, and extends along the outer periphery of the side impact beam 6. One edge 7He of the flat plate portion 7Hc has an arc shape, and extends along the outer periphery of the side impact beam 6. The edges 7He and 7Hd are connected to the side impact beam 6, for example, by welding such that the flat plate portions 7Hb and 7Hc are perpendicular to the longitudinal direction of the side impact beam 6.

Sixth Modified Example

Figure 14:
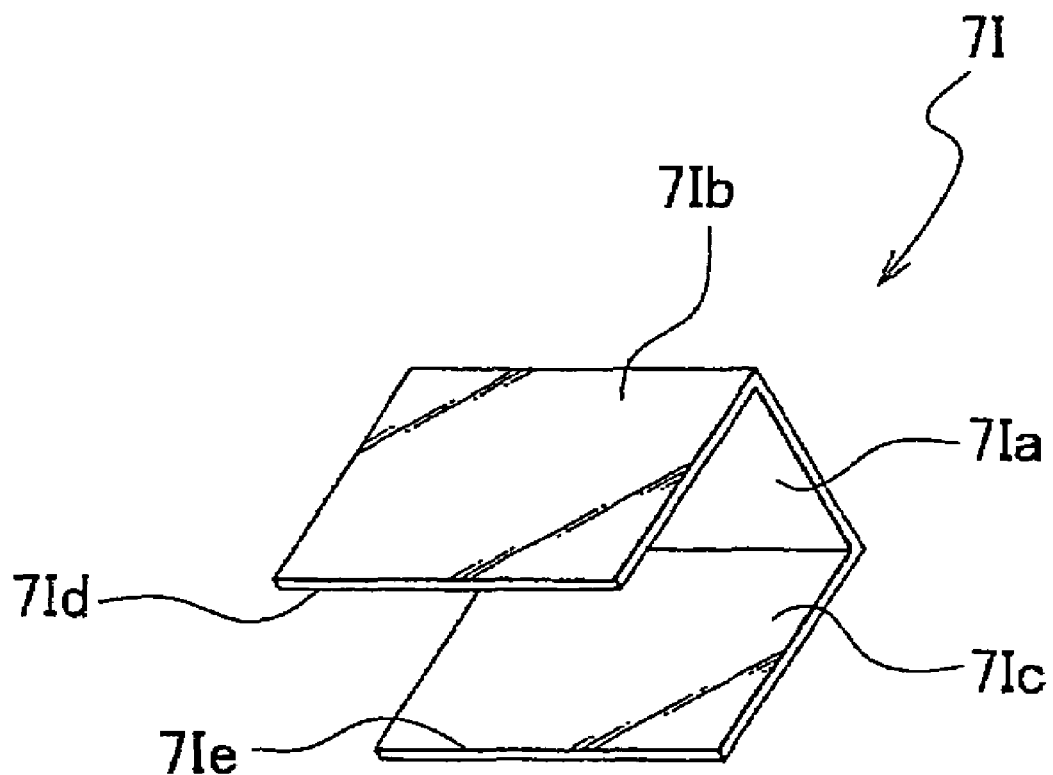
FIG. 14 is a perspective view of a support member according to a sixth modified example, which is viewed from the side impact beam-side.

FIG. 14 is a perspective view of a support member according to a sixth modified example, which is viewed from the side impact beam-side. The support member 7I shown in FIG. 14 can be connected to the side impact beam 6. The support member 7I includes flat plate portions 7Ia, 7Ib, and 7Ic. The flat plate portion 7Ia extends along the inner panel 5. The flat plate portion 7Ib is continuous with the flat plate portion 7Ia such that the flat plate portion 7Ib is orthogonal to the flat plate portion 7Ia. The flat plate portion 7Ic is positioned on the side opposite to the flat plate portion 7Ib. The flat plate portion 7Ic is continuous with the flat plate portion 7Ia such that the flat plate portion 7Ic is orthogonal to the flat plate portion 7Ia. One edge 7Id of the flat plate portion 7Ib and one edge 7Ie of the flat plate portion 7Ic are connected to the side impact beam 6, for example, by welding such that the edges 7Ih and 7Ie are parallel with the longitudinal direction of the side impact beam 6.

Seventh Modified Example

Figure 15:
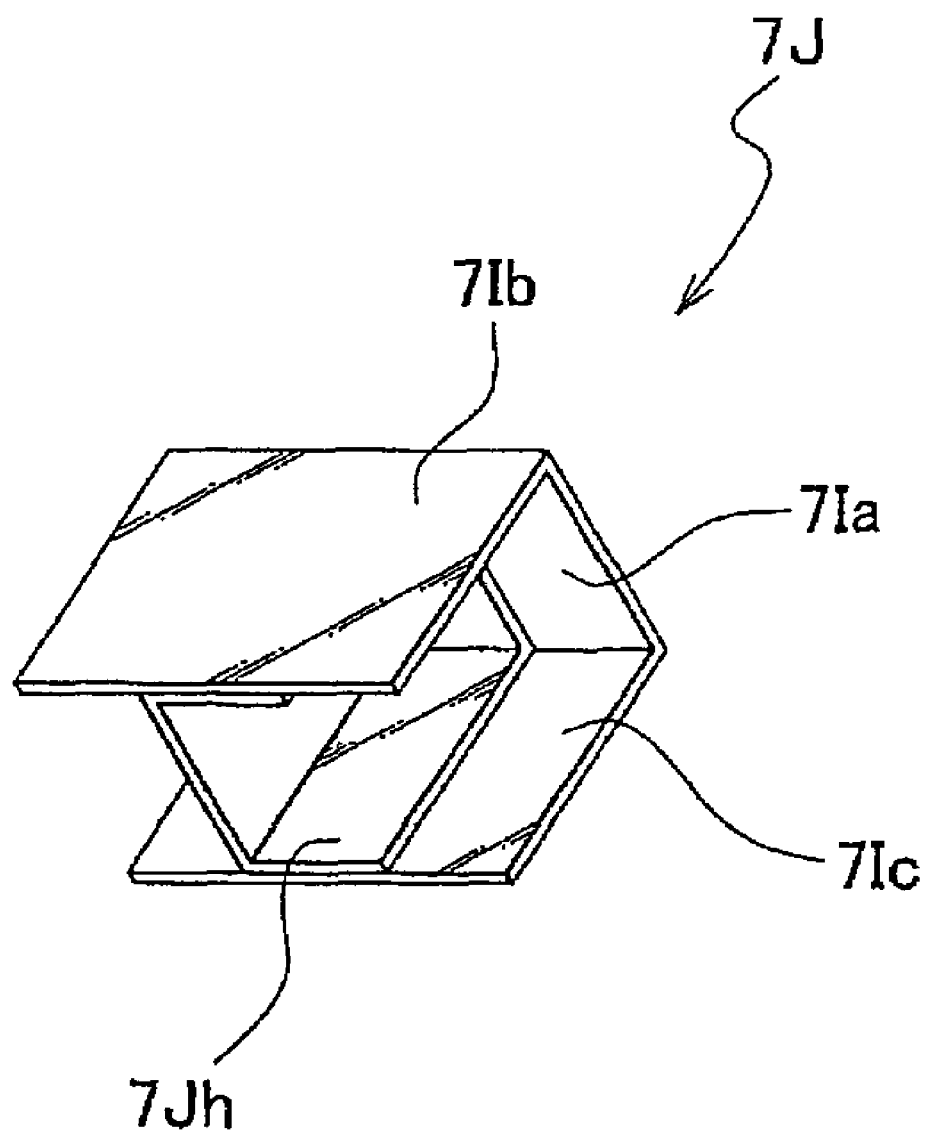
FIG. 15 is a perspective view of a support member according to a seventh modified example, which is viewed from the side impact beam-side.

FIG. 15 is a perspective view of a support member according to a seventh modified example, which is viewed from the side impact beam-side. The support member 7I shown in FIG. 15 differs from the support member 7I in the sixth modified example in that the support member 7J further includes a bulk 7Jh. The bulk 7Jh is provided on the inner side of the support member 7J, like the bulk 7h in the first modified example. The bulk 7Jh includes a flat plate portion that is orthogonal to flat plate portions 7Ia, 7Ib, and 7Ic; and a flat plate portion that is formed to extend along the flat plate portions 7Ia, 7Ib, and 7Ic, and to have a U-shaped cross section.

The support member 7J in the seventh modified example is reinforced by the bulk 7Jh. Therefore, it is possible to obtain the same advantages as those obtained in the first modified example.

Eighth Modified Example

Figure 16:
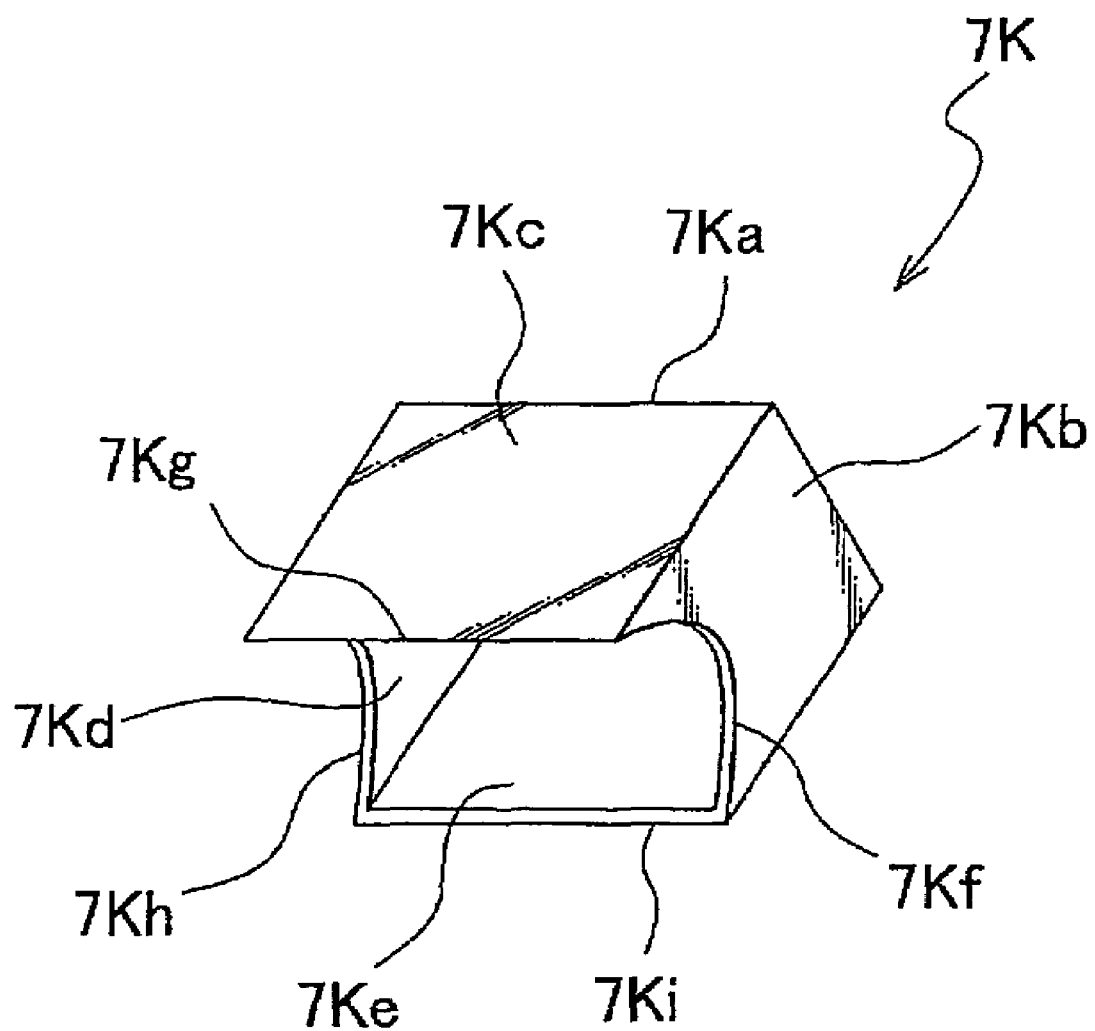
FIG. 16 is a perspective view of a support member according to an eighth modified example, which is viewed from the side impact beam-side.

FIG. 16 is a perspective view of a support member according to an eighth modified example, which is viewed from the side impact beam-side. The support member 7K shown in FIG. 16 can be connected to the side impact beam 6. The support member 7K shown in FIG. 16 is formed using a draw mold, like the support member 7E in the second modified example. More specifically, the support member 7K is formed to have a cup shape by pressing using a draw mold. The support member 7K includes flat plate portions 7Ka, 7Kb, 7Kc, 7Kd, and 7Ke. The flat plate portion 7Ka extends along the inner panel 5. The flat plate portions 7Kb, 7Kc, 7Kd, and 7Ke are continuous with the four sides of the flat plate portion 7Ka such that flat plate portions 7Kb, 7Kc, 7Kd, and 7Ke are orthogonal to the flat plate portion 7Ka. One edge 7Kf of the flat plate portion 7Kb has an arc shape, and extends along the outer periphery of the side impact beam 6. One edge 7Kh of the flat plate portion 7Kd has an arc shape, and extends along the outer periphery of the side impact beam 6. The edges 7Kf and 7Kh are connected to the side impact beam 6, for example, by welding such that the flat plate portions 7Kb and 7Kd are perpendicular to the longitudinal direction of the side impact beam 6. One edge 7Kg of the flat plate portion 7Kc and one edge 7Ki of the flat plate portion 7Ke are connected to the side impact beam 6, for example, by welding such that the edges 7Kg and 7Ki are parallel with the longitudinal direction of the side impact beam 6.

In the support member 7K in the eighth modified example, the side impact beam 6 is supported by the four flat plate portions 7Kb, 7Kc, 7Kd, and 7Ke. Therefore, it is possible to obtain the same advantages as those obtained in the second modified example.

Ninth Modified Example

Figure 17:
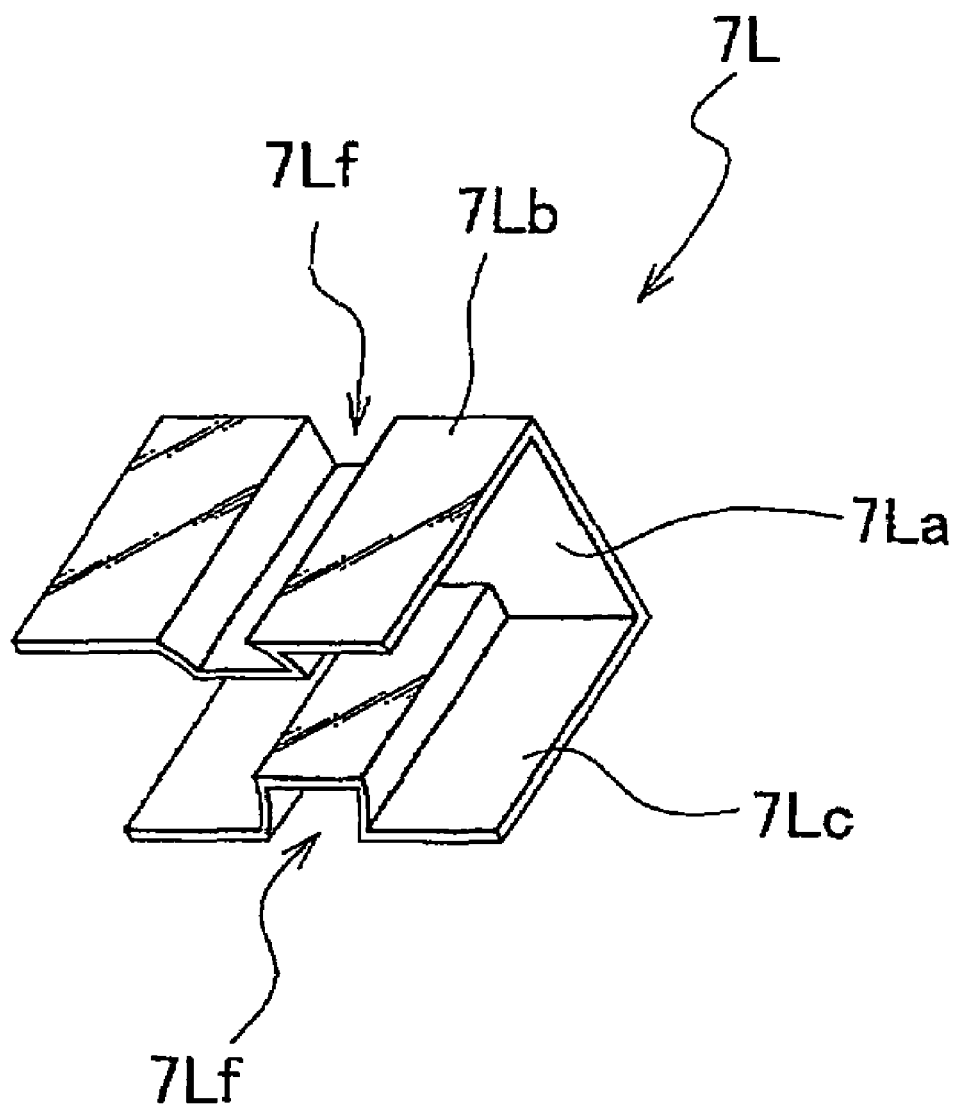
FIG. 17 is a perspective view of a support member according to a ninth modified example, which is viewed from the side impact beam-side.

FIG. 17 is a perspective view of a support member according to a ninth modified example, which is viewed from the side impact beam-side. The support member 7L shown in FIG. 17 differs from the support member 7I in the sixth modified example in that the support member 7L includes the flat plate portions 7Lb and 7Lc instead of the flat plate portions 7Lb and 7Ic. A bead portion 7Lf is provided in the flat plate portions 7Lb and 7Lc. The bead portion 7Lf is formed to be inwardly recessed in the support member 7L. The bead portion 7Lf is similarly provided in the flat plate portion 7Lc.

The support member 7L in the ninth modified example is reinforced by the bead portion 7Lf. Therefore, it is possible to obtain the same advantages as those obtained in the third modified example.

Tenth Modified Example

Figure 18:
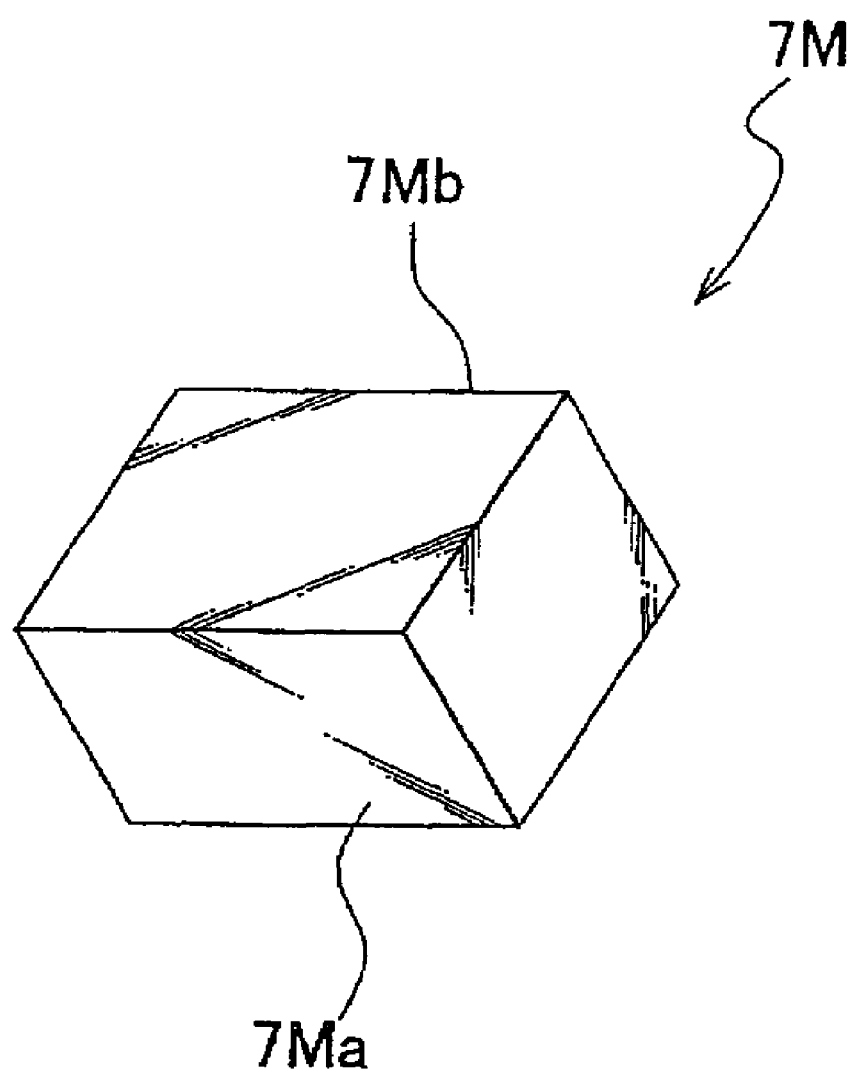
FIG. 18 is a perspective view of a support member according to a tenth modified example, which is viewed from the side impact beam-side.

FIG. 18 is a perspective view of a support member according to a tenth modified example, which is viewed from the side impact beam-side. The support member 7M shown in FIG. 18 is made of a resin material, and has a block shape. The surface 7Ma of the support member 7M extends along the side impact beam 6. The surface 7Mb of the support member 7M, which is opposite to the surface 7Ma, is connected to the inner panel 5, for example, by adhesive agent, screwing, or welding.

Eleventh Modified Example

Figure 19:
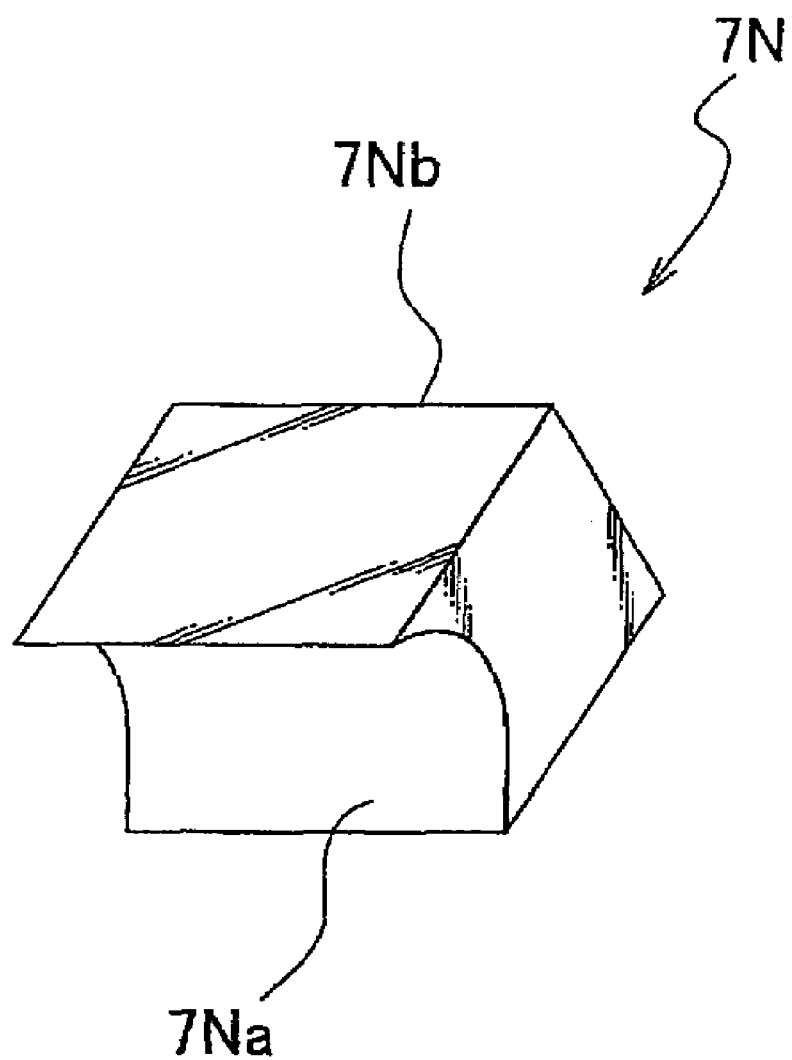
FIG. 19 is a perspective view of a support member according to an eleventh modified example, which is viewed from the side impact beam-side.

FIG. 19 is a perspective view of a support member according to an eleventh modified example, which is viewed from the side impact beam-side. The support member 7N shown in FIG. 19 is made of a resin material, and has a substantially block shape. The surface 7Na of the support member 7N has an arc shape, and extends along the outer periphery of the side impact beam 6. The surface 7Na is connected to the side impact beam 6, for example, by adhesive agent, screwing, or welding. The surface 7Nb of the support member 7N, which is opposite to the surface 7Na, extends along the inner panel 5.

The configurations of the support member in the first to eleventh modified examples may be applied to the support member in the third embodiment.

Twelfth Modified Example

Figure 20:
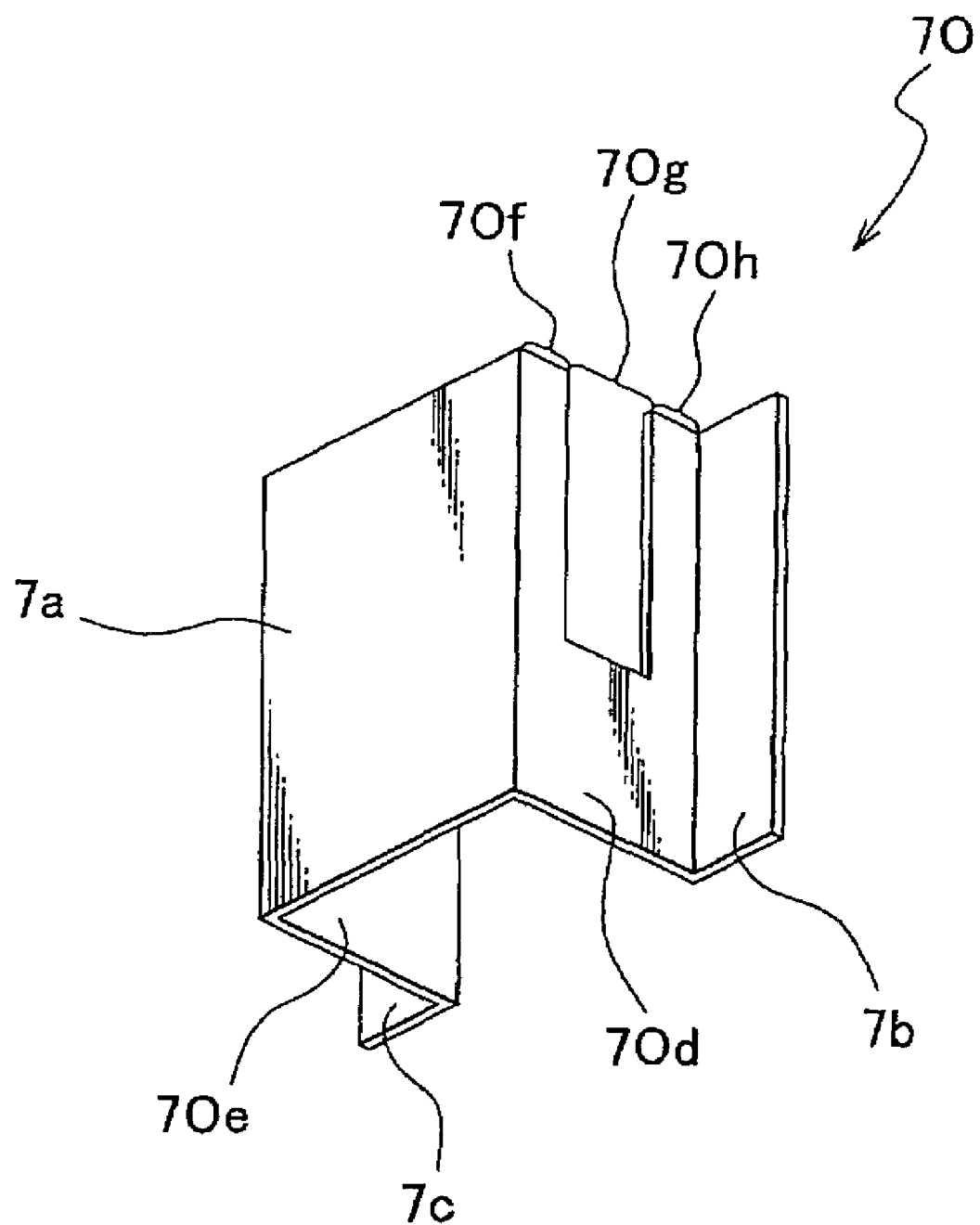
FIG. 20 is a perspective view of a support member according to a twelfth modified example, which is viewed from the side impact beam-side.

FIG. 20 is a perspective view of a support member according to a twelfth modified example, which is viewed from the side impact beam surface-side. The support member 7O shown in FIG. 20 differs from the support member 7 in the first embodiment in that the support member 7O includes flat plate portions 7Od and 7Oe instead of the flat plate portions 7d and 7e. Each of the flat plate portions 7Od and 7Oe has a U-shaped cross section.

In other words, the support member 7O includes a first portion 7Of, a second portion 7Og, and a third portion 7Oh, which are adjacent to each other in the vehicle-width direction. The first portion 7Of includes a flat plate portion 7a; and portions of flat plate portions 7Od and 7Oe, which are long in the vehicle-height direction, and close to the flat plate portion 7a. The second portion 7Og includes portions of the flat plate portions 7Od and 7Oe, which are short in the vehicle-height direction. The third portion 7Oh includes portions of the flat plate portions 7Od and 7Oe, which are long in the vehicle-height direction, and close to the flat plate portions 7b and 7c; and the flat plate portions 7b and 7c. That is, the first portion 7Of is adjacent to the side impact beam 6. The upper end of the second portion 7Og is lower than the upper ends of the first portion 7Of and the third portion 7Oh in the vehicle-height direction.

In the support portion 7O in the twelfth modified example, the upper end of the second portion 7Og is lower than the upper ends of the first portion 7Of and the third portion 7Oh in the vehicle-height direction. Therefore, it is possible to secure an area above the second portion 7Og so that the door glass 4 is housed in the area when the window is open. Accordingly, the support member 7O in the twelfth modified example can be used instead of the support member 7A in the second embodiment.

The support member 7A in the second embodiment and the support member 7O in the twelfth modified example may be reinforced by providing a bulk or a bead portion, or by forming the support member 7A and the support member 7O using a draw mold, as described above. Alternatively, the support member 7A and the support member 7O may be connected to the side impact beam 6. Also, resin materials may be used to form the support member 7A in the second embodiment and the support member 7O in the twelfth modified example.

Thirteenth Modified Example

Figure 21:
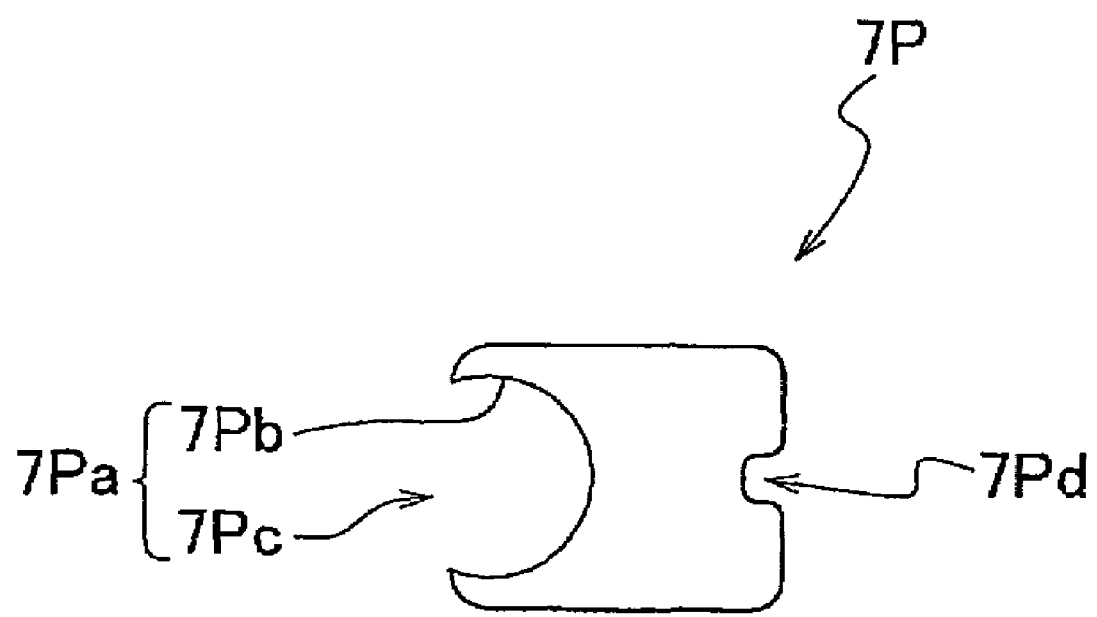
FIG. 21 is a cross sectional view of a support member according to a thirteenth modified example, which is perpendicular to the vehicle fore-and-aft direction.

FIG. 21 is a cross sectional view of a support member according to a thirteenth modified example, which is perpendicular to the vehicle fore-and-aft direction. The support member 7P shown in FIG. 21 is a clip member, like the support member 7C in the fourth embodiment. The support member 7P can be connected to the side impact beam 6. A protrusion portion 7Pa is provided in the support member 7P. The protrusion portion 7Pa includes an inner surface 7Pb, and an opening 7Pc. The inner surface 7Pb has an arc shape, and extends along the outer periphery of the side impact beam 6. The side impact beam 6 is guided to the inner surface 7Pb through the opening 7Pc. The width of the opening 7Pc is smaller than the diameter of the side impact beam 6. The side impact beam 6 is held by the inner surface 7Pb of the protrusion portion 7Pa. Thus, the support member 7P is connected to the side impact beam 6. A recess 7Pd is provided on the side of the support member 7P, which is opposite to the protrusion portion 7Pa. The load-receiving member 9 is guided through the recess 7Pd. Elastic materials such as resin materials are employed to form the support member 7P.

Fourteenth Modified Example

Figure 22:
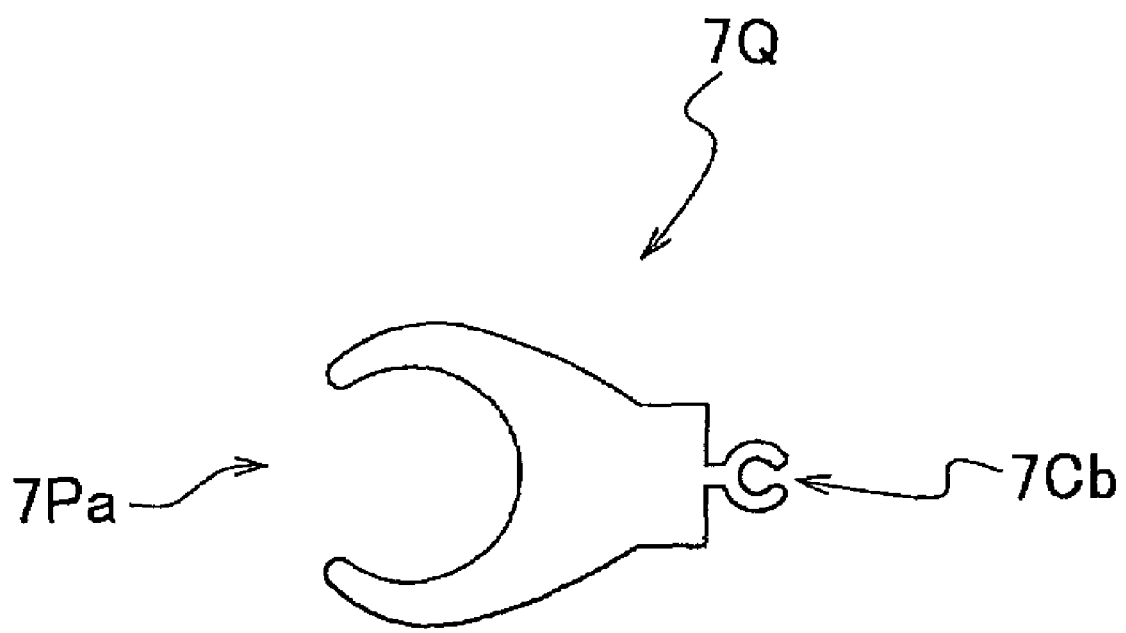
FIG. 22 is a cross sectional view of a support member according to a fourteenth modified example, which is perpendicular to the vehicle fore-and-aft direction.

FIG. 22 is a cross sectional view of a support member according to a fourteenth modified example, which is perpendicular to the vehicle fore-and-aft direction. The support member 7Q shown in FIG. 22 is a clip member, like the support member 7C in the fourth embodiment and the support member 7P in the thirteenth modified example. The support member 7Q can be connected to both of the load-receiving member 9 and the side impact beam 6. Therefore, the support member 7Q includes the protrusion portion 7Cb in the support member 7C and the protrusion portion 7Pa in the support member 7P. Elastic materials such as resin materials are employed to form the support member 7Q.

Fifteenth Modified Example

Figure 23:
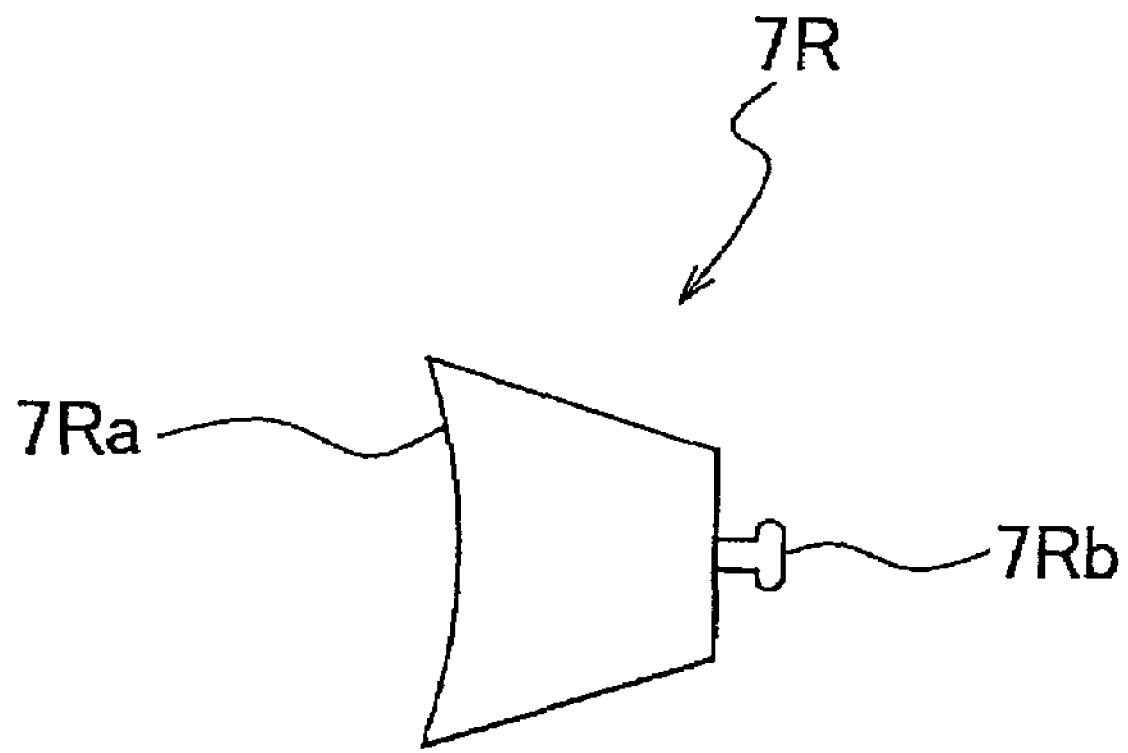
FIG. 23 is a cross sectional view of a support member according to a fifteenth modified example, which is perpendicular to the vehicle fore-and-aft direction.

FIG. 23 is a cross sectional view of a support member according to a fifteenth modified example, which is perpendicular to the vehicle fore-and-aft direction. The support member 7R shown in FIG. 23 can be used instead of the support member 7B in the third embodiment. The support member 7R includes a surface 7Ra adjacent to the side impact beam 6. A protrusion portion 7Rb is provided on the side of the support member 7R, which is opposite to the surface 7Ra. The protrusion portion 7Rb has a columnar shape. The protrusion portion 7Rb extends away from the side of the support member 7R, which is opposite to the surface 7Ra. The diameter of the end of the protrusion portion 7Rb is larger than the diameter of the portion of the protrusion portion 7Rb other than the end. For example, resin materials are employed to form the support member 7R.

By forming a hole in the load-receiving member 8 such that the hole has a diameter smaller than that of the end of the protrusion portion 7Rb, and by inserting the protrusion portion 7Rb into the hole of the load-receiving member 8, the support member 7R in the fifteenth modified example can be easily connected to the load-receiving member 8.

Sixteenth Modified Example

Figure 24:
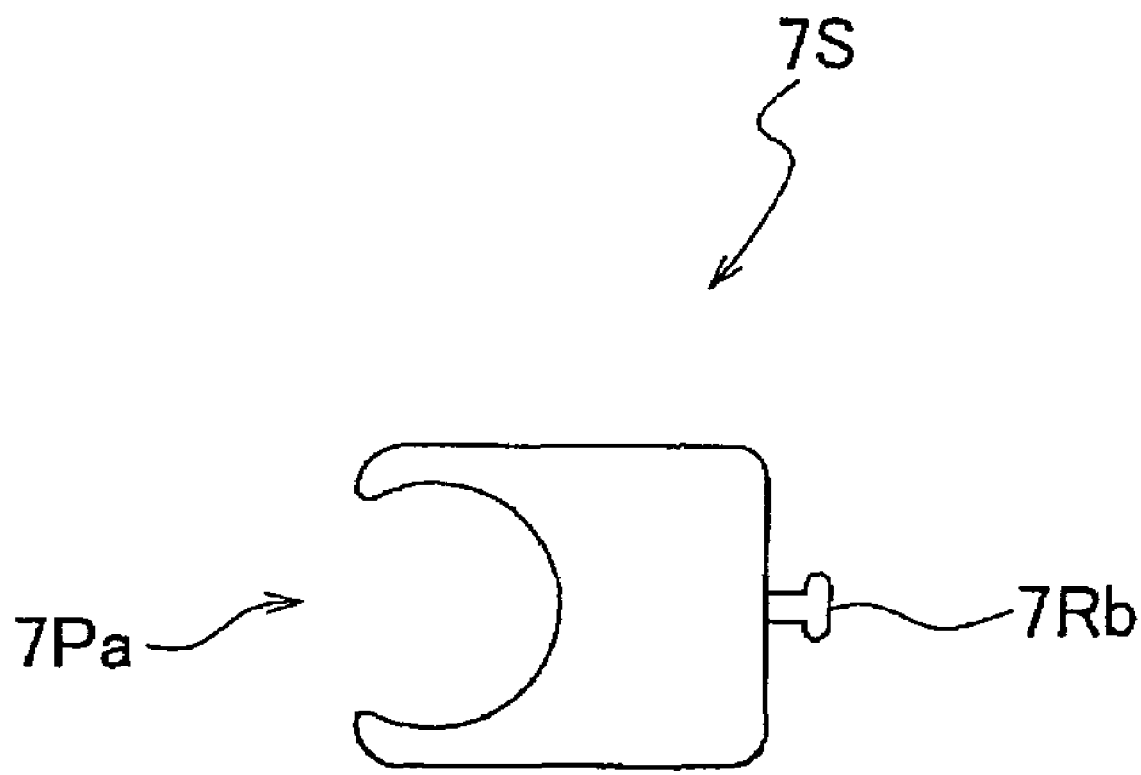
FIG. 24 is a cross sectional view of a support member according to a sixteenth modified example, which is perpendicular to the vehicle fore-and-aft direction.

FIG. 24 is a cross sectional view of a support member according to a sixteenth modified example, which is perpendicular to the vehicle fore-and-aft direction. The support member 7S shown in FIG. 24 can be used instead of the support member 7B in the third embodiment. The support member 7S includes the protrusion portion 7Rb in the support member 7R and the protrusion portion 7Pa in the support member 7P. For example, resin materials are employed to form the support member 7S.

The support member 7S in the sixteenth modified example can be easily connected to the load-receiving portion 8. The support member 7S can also be easily connected to the side impact beam 6.

Fifth Embodiment

Figure 25A:
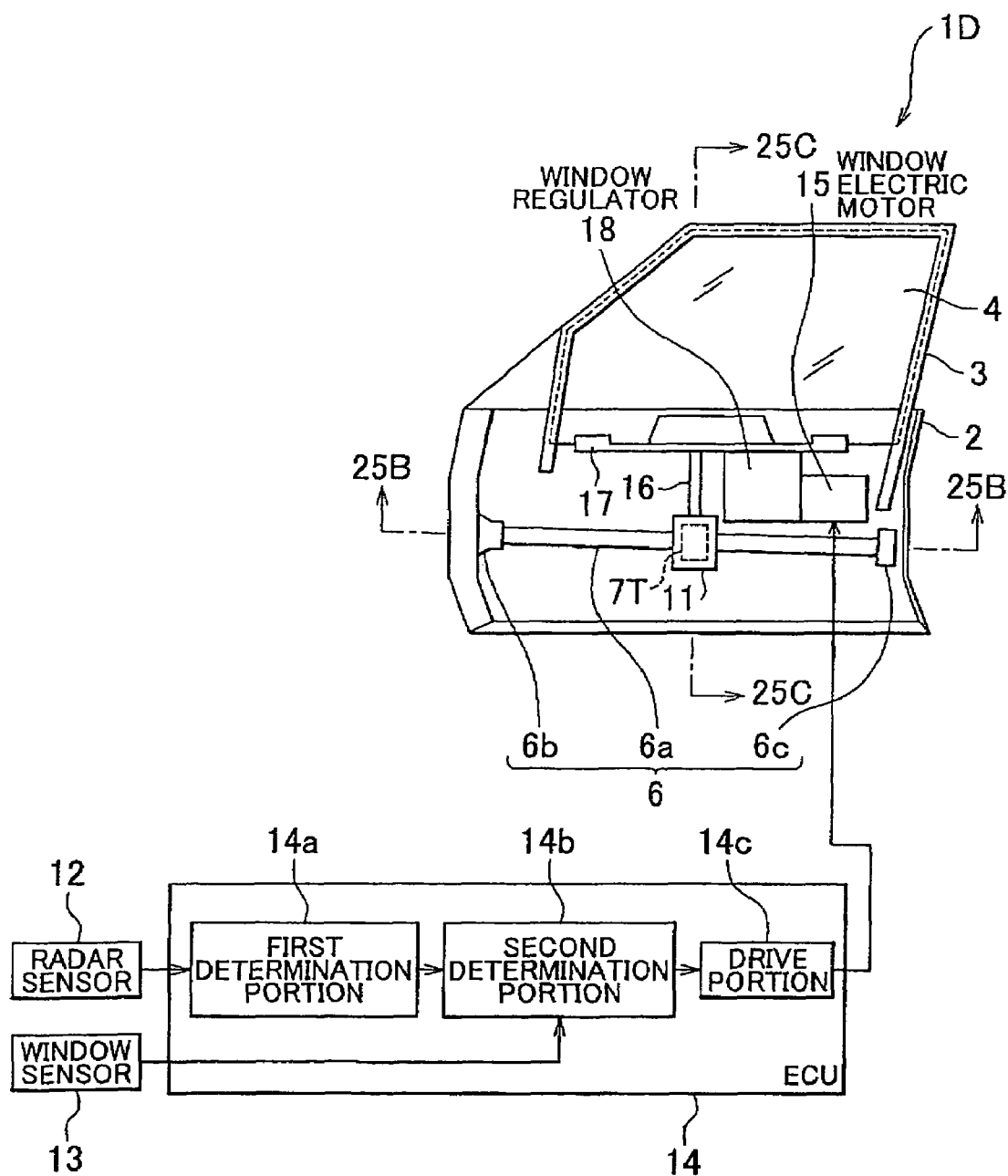
FIG. 25A is a diagram showing a vehicular door according to a fifth embodiment of the invention, which is viewed from the inner surface-side.
Figure 25B:
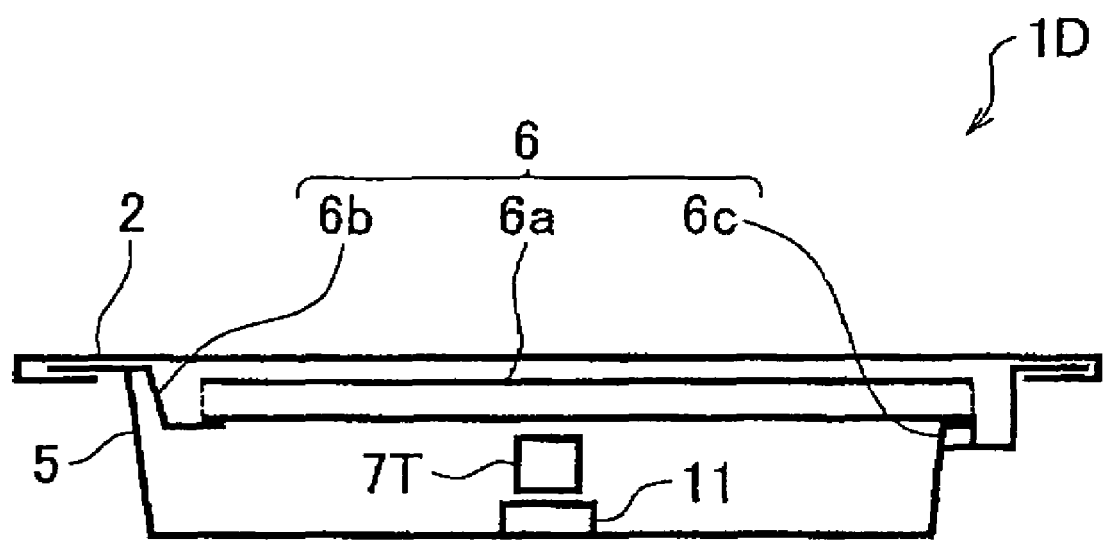
FIG. 25B is an end view of the vehicular door taken along line 25B-25B in FIG. 25A.
Figure 25C:
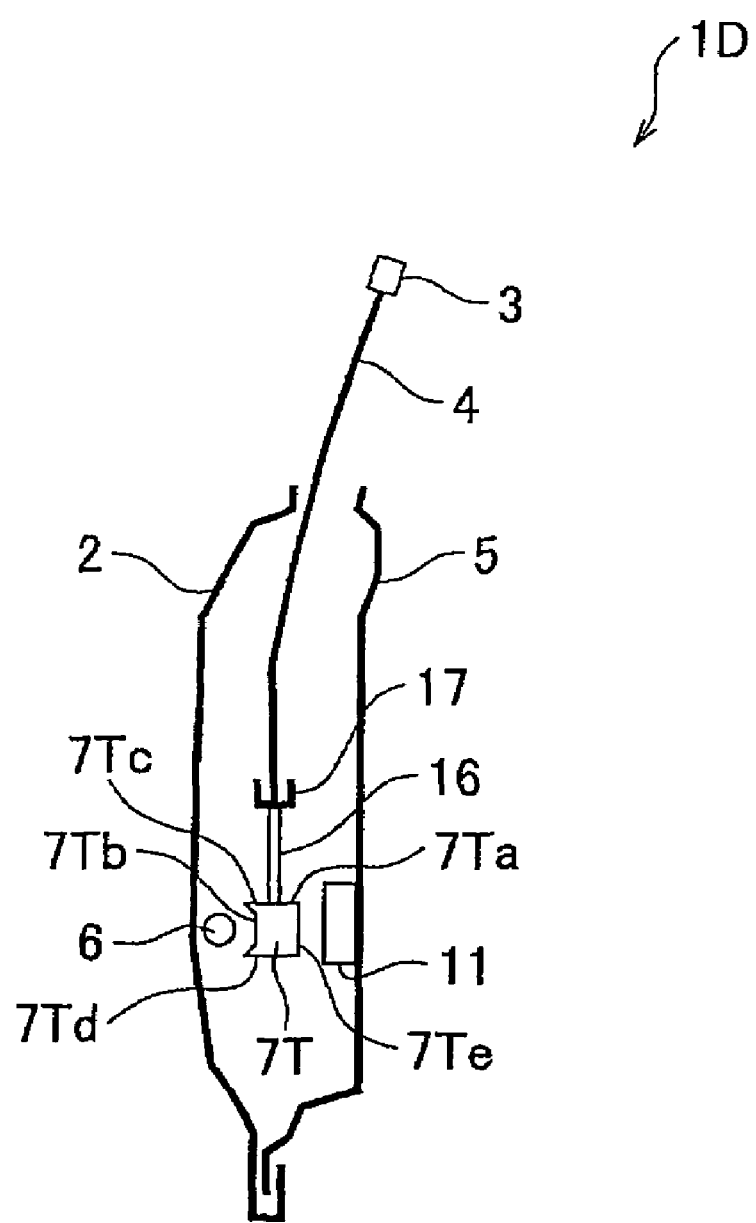
FIG. 25C is an end view of the vehicular door taken along line 25C-25C in FIG. 25A.

A vehicular door according to a fifth embodiment of the invention will be described with reference to FIGS. 25A to 25C. FIG. 25A is a diagram showing the vehicular door according to the fifth embodiment, which is viewed from the inner surface-side. In FIG. 25A, the inner panel is omitted so that the characteristic portions of the embodiment are clearly shown. Also, a circuit block diagram of an electric system portion is shown. FIG. 25B is an end view of the vehicular door taken along line 25B-25B in FIG. 25A. FIG. 25C is an end view of the vehicular door taken along line 25C-25C in FIG. 25A.

The vehicular door 1D shown in FIGS. 25A to 25C includes a support member 7T, a load-receiving member 11, a radar sensor 12, a window sensor 13, an electronic control unit (hereinafter, referred to as "ECU") 14, and a window electric motor 15 that operates the window. The other portions of the vehicular door 1D are the same as those in the above-described embodiments. Therefore, the description thereof will be omitted. The radar sensor 12, the window sensor 13, and the ECU 14 constitute the electric system portion.

The support member 7T has a substantially rectangular parallelepiped shape. The upper surface 7Ta of the support member 7T in the vehicle-height direction is connected to a door-glass support member 17 via a spacer 16, for example, by welding. The door-glass support member 17 is connected to the lower edge of the door glass 4 to support the door glass 4. That is, the support member 7T is connected to the door-glass support member 17 such that the support member 7T is away from the door glass 4. As the door glass 4 is moved upward or downward, the support member 7T is moved upward or downward accordingly.

One surface 7Tb of the support member 7T in the vehicle-width direction is adjacent to the side impact beam 6 in the vehicle-width direction when the window is closed. A protrusion portion 7Tc is provided in the upper portion of the surface 7Tb of the support member 7T in the vehicle-height direction. A protrusion 7Td is provided in the lower portion of the surface 7Tb in the vehicle-height direction. When the side impact beam 6 is deformed by the collision load, the protrusion portions 7Tc and 7Td guide the side impact beam 6 to the surface 7Tb of the support member 7T.

The other surface 7Te of the support member 7T in the vehicle-width direction is adjacent to the load-receiving member 11 in the vehicle-width direction when the window is closed. The load-receiving member 11 has a substantially rectangular parallelepiped shape. The load-receiving member 11 is connected to the inner panel 5, for example, by welding.

Materials such as metal and resin may be used to form the support member 7T and the load-receiving member 11.

Next, the configuration of the electric system portion of the vehicular door 1D in the fifth embodiment will be described. The radar sensor 12 is a milliwave radar sensor such as a pre-crash sensor. The radar sensor 12 is fitted to, for example, the bumper, the side mirror, or the rearview mirror of the vehicle. The radar sensor 12 transmits a milliwave signal to a predetermined range beside the vehicle. The radar sensor 12 receives a reflected wave signal generated when the milliwave signal is reflected by an object. The radar sensor 12 determines whether there is an object beside the vehicle, based on whether the radar sensor 12 receives the reflected wave signal. Also, the radar sensor 12 detects the distance between the vehicle and the object, based on the time at which the milliwave signal is transmitted, and the time at which the reflected wave signal is received. The radar sensor 12 detects the speed of the vehicle relative to the object, by detecting the distance between the vehicle and the object a plurality of times at predetermined time intervals. The radar sensor 12 outputs a distance signal and a speed signal to the ECU 14. The distance signal has a value that indicates the distance between the vehicle and the object, and the speed signal has a value that indicates the speed of the vehicle relative to the object.

The window sensor 13 detects the position of the support member 7T with respect to the side impact beam 6, by detecting the operation amount of the door glass 4. The window sensor 13 is provided, for example, between the outer panel 2 and the inner panel 5. More specifically, the window sensor 13 detects the operation amount of the door glass 4, by detecting the amount by which the window electric motor 15 rotates, and the direction in which the window electric motor 15 rotates, as described below. The window sensor 13 outputs an operation-amount signal having a value that indicates the operation amount of the door glass 4.

The ECU 14 includes a microprocessor, ROM, RAM, and a backup RAM. The microprocessor performs calculations. The ROM stores programs and the like that are used when the microprocessor performs various operations. The RAM stores various data, such as the results of calculations. The backup RAM maintains the stored data using a 12-volt battery. With this configuration, a first determination portion 14a, a second determination portion 14b, and a drive portion 14c are formed in the ECU 14.

The first determination portion 14a determines whether there is a possibility of a lateral collision with the object, based on the distance signal and the speed signal that are received from the radar sensor 12. That is, the first determination portion 14a functions as the determination device in this embodiment. When there is the possibility of the lateral collision with the object, the first determination portion 14a outputs information on the result of the determination to the second determination portion 14b.

When the second determination portion 14b receives the information on the result of the determination from the first determination portion 14a, the second determination portion 14b determines whether the support member 7T is adjacent to the side impact beam 6 in the vehicle-width direction, based on the operation-amount signal received from the window sensor 13. More specifically, the second determination portion 14b determines whether the window is closed, based on the operation amount of the door glass 4 indicated by the operation-amount signal. When the window is not closed, the second determination portion 14b outputs the information on the result of the determination to the drive portion 14c.

When the drive portion 14c receives the information on the result of the determination, the drive portion 14c provides an instruction to the window electric motor 15 so that the support member 7T is adjacent to the side impact beam 6 in the vehicle-width direction. More specifically, the drive portion 14c provides the instruction to the window electric motor 15 so that the window is closed. That is, the drive portion 14c functions as the drive device in the embodiment.

Based on the instruction from the ECU 14, the window electric motor 15 transmits driving force to a window regulator 18, thereby moving the door glass 4 upward or downward. For example, an X-arm window regulator, or a wire window regulator is employed as the window regulator 18. For example, the window electric motor 15 and the ECU 14 are combined with each other to form an assembly. The assembly of the window electric motor 15 and the ECU 14 is provided between the outer panel 2 and the inner panel 5.

Next, the operation of the vehicular door 1D according to the fifth embodiment will be described. First, the radar sensor 12 determines whether there is an object beside the vehicle. Also, the radar sensor 12 detects the distance between the vehicle and the object, and the speed of the vehicle relative to the object. Then, the radar sensor 12 outputs the distance signal and the speed signal to the first determination portion 14a of the ECU 14. The distance signal has the value that indicates the distance between the vehicle and the object. The speed signal has the value that indicates the speed of the vehicle relative to the object. The window sensor 13 detects the operation amount of the door glass 4. Then, the window sensor 13 outputs the operation-amount signal to the second determination portion 14b. The operation-amount signal has the value that indicates the operation amount of the door glass 4.

Figure 26:
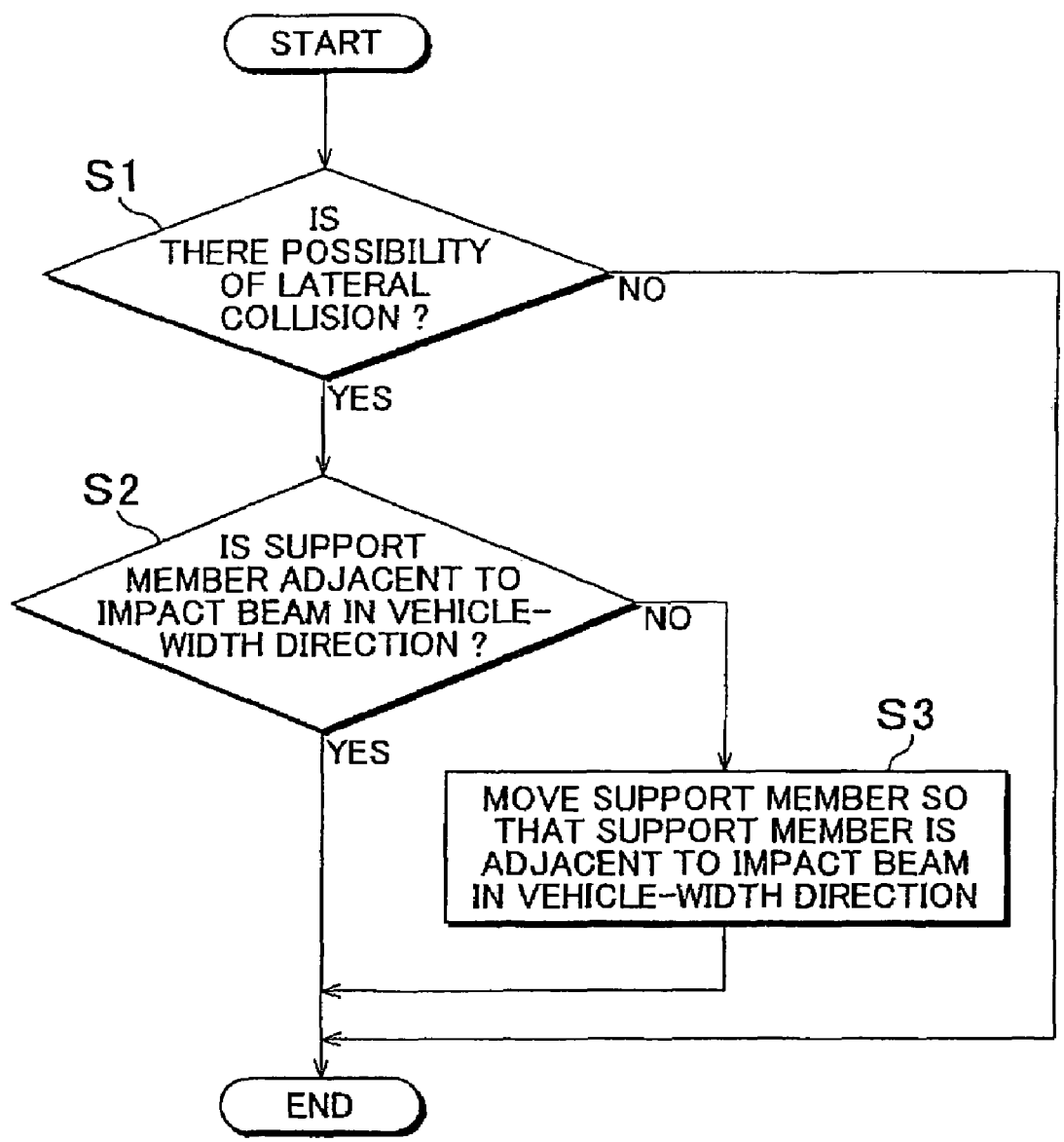
FIG. 26 is a flowchart showing the operation of an ECU in the fifth embodiment.

FIG. 26 is a flowchart showing the operation of the ECU 14. First, the first determination portion 14a determines whether there is a possibility of a lateral collision with an object, based on the distance signal and the speed signal received from the radar sensor 12 (step S1).

If it is determined that there is the possibility of the lateral collision in step S1, the second determination portion 14b determines whether the support member 7T is adjacent to the side impact beam 6 in the vehicle-width direction, based on the operation-amount signal received from the window sensor 13 (step S2).

If it is determined that the support member 7T is not adjacent to the side impact beam 6 in the vehicle-width direction in step S2, the drive portion 14c drives the window electric motor 15, thereby closing the window. That is, the window electric motor 15 moves the door glass 4 and the support member 7T upward. Thus, the support member 7T is disposed such that the support member 7T is adjacent to the side impact beam 6 in the vehicle-width direction (step S3).

If it is determined that there is no possibility of a lateral collision in step S1, the first determination portion 14a does not output the information on the result of the determination to the second determination portion 14b. As a result, the ECU 14 finishes the routine shown in FIG. 26, without performing steps S2 and S3. If it is determined that the support member 7T is adjacent to the side impact beam 6 in the vehicle-width direction in step S2, the second determination portion 14b does not output the information on the result of the determination to the drive portion 14c. As a result, the ECU 14 finishes the routine shown in FIG. 26, without performing step S3.

Figure 27:
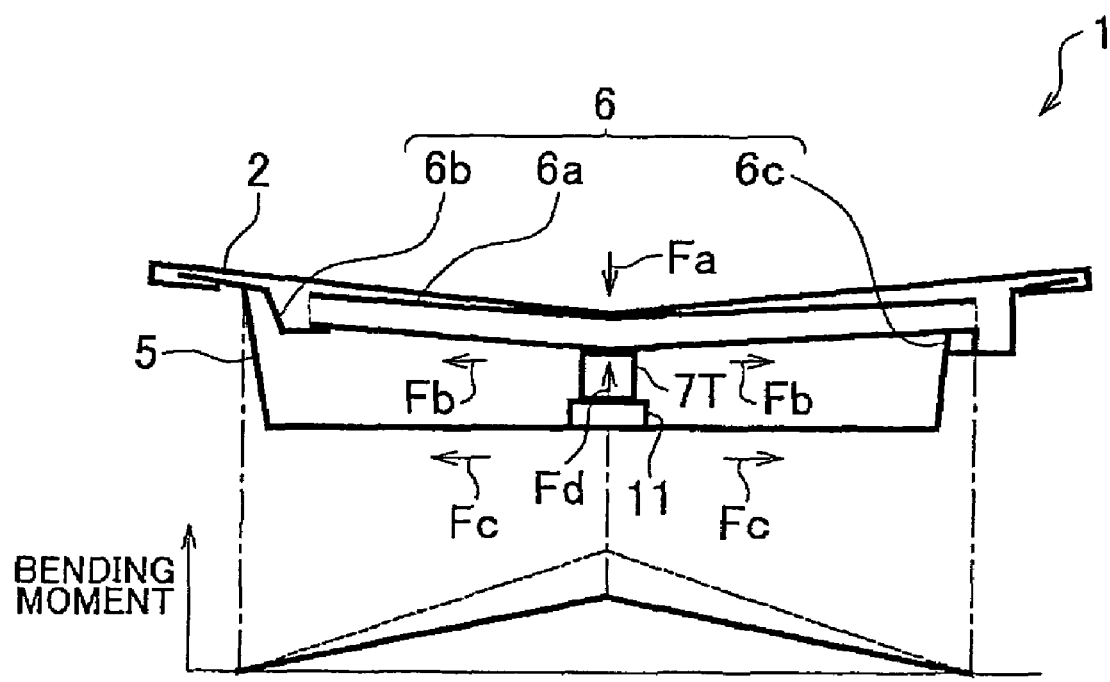
FIG. 27 is a diagram explaining the collision load applied to the vehicular door shown in FIG. 25B and the tension load that occurs in the vehicular door shown in FIG. 25B.

Next, the collision load applied to the vehicular door 1D and the tension load that occurs in the vehicular door 1D at the time of a lateral collision will be described. FIG. 27 is a diagram explaining the collision load applied to the vehicular door 1D shown in FIG. 25B and the tension load that occurs in the vehicular door 1D.

The vehicular door 1D according to the embodiment will be described with reference to FIG. 27. As in the case of the conventional vehicular door 10, if the collision load Fa is applied to the outer panel 2 of the vehicular door 1D from an object when the vehicle has a lateral collision or the like, the collision load Fa is transmitted to the side impact beam 6 via the outer panel 2. The tension load Fb occurs in the side impact beam 6. Further, the collision load Fa is transmitted to the inner panel 5 via the support member 7T and the load-receiving member 21. Thus, the tension load Fc occurs in the inner panel 5. Then, the reaction force Fd is transmitted to the side impact beam 6 via the support member 7. The reaction force Fd varies depending on the tension load Fc.

Thus, as shown in FIG. 27, the bending moment that occurs in the side impact beam 6 is decreased by the reaction force Fd, from the moment indicated by the dotted line to the moment indicated by the solid line. Accordingly, even if the collision load Fa and the bending moment are further increased, the bending of the side impact beam 6 is suppressed.

Thus, in the vehicular door 1D according to the embodiment, it is possible to increase the strength against the collision load Fa applied to the outer panel 2 when the vehicle has a collision or the like, without interfering with the upward or downward movement of the door glass 4.

Also, in the vehicular door 1D according to the embodiment, when there is the possibility of the lateral collision, the support member 7T is made adjacent to the side impact beam 6 in the vehicle-width direction, using the radar sensor 12, the window sensor 13, the ECU 14, and the window electric motor 15. Accordingly, in the vehicular door 1D in the embodiment, it is possible to increase the strength against the collision load Fa applied to the outer panel 2 when the vehicle has a lateral collision or the like, regardless of the operating state of the door glass 4.

Sixth Embodiment

Figure 28A:
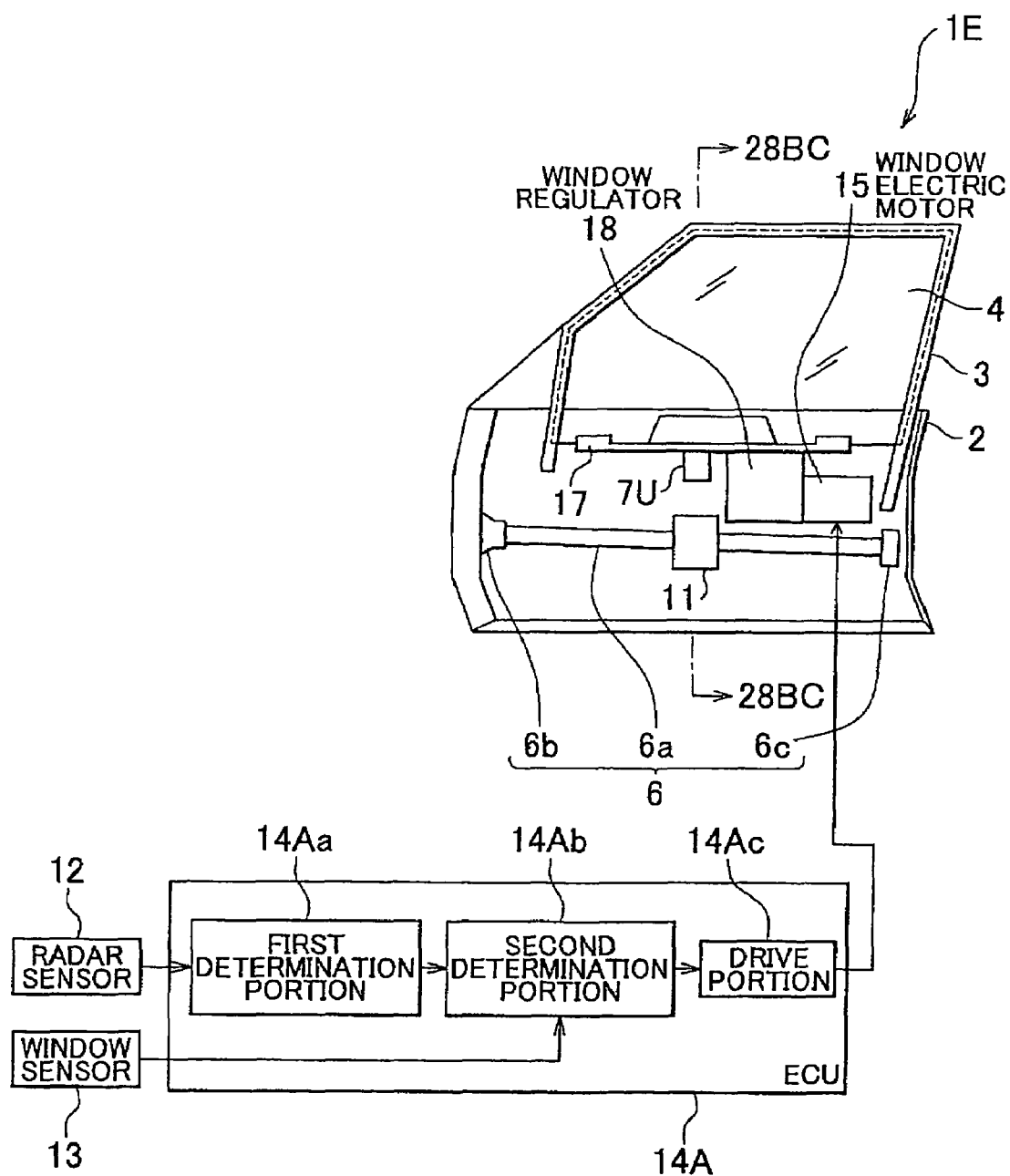
FIG. 28A is a diagram showing a vehicular door according to a sixth embodiment of the invention, which is viewed from the inner surface-side.
Figure 28B:
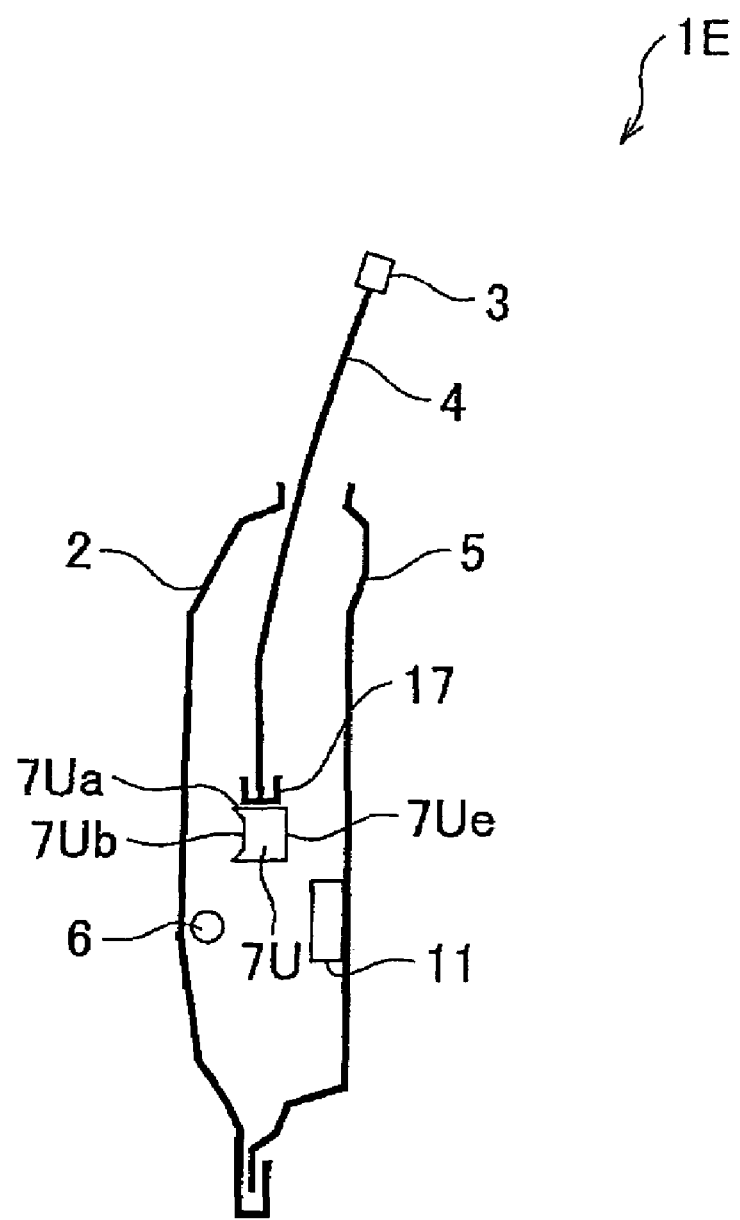
FIG. 28B is an end view of the vehicular door taken along line 28B-28B in FIG. 28A.
Figure 28C:
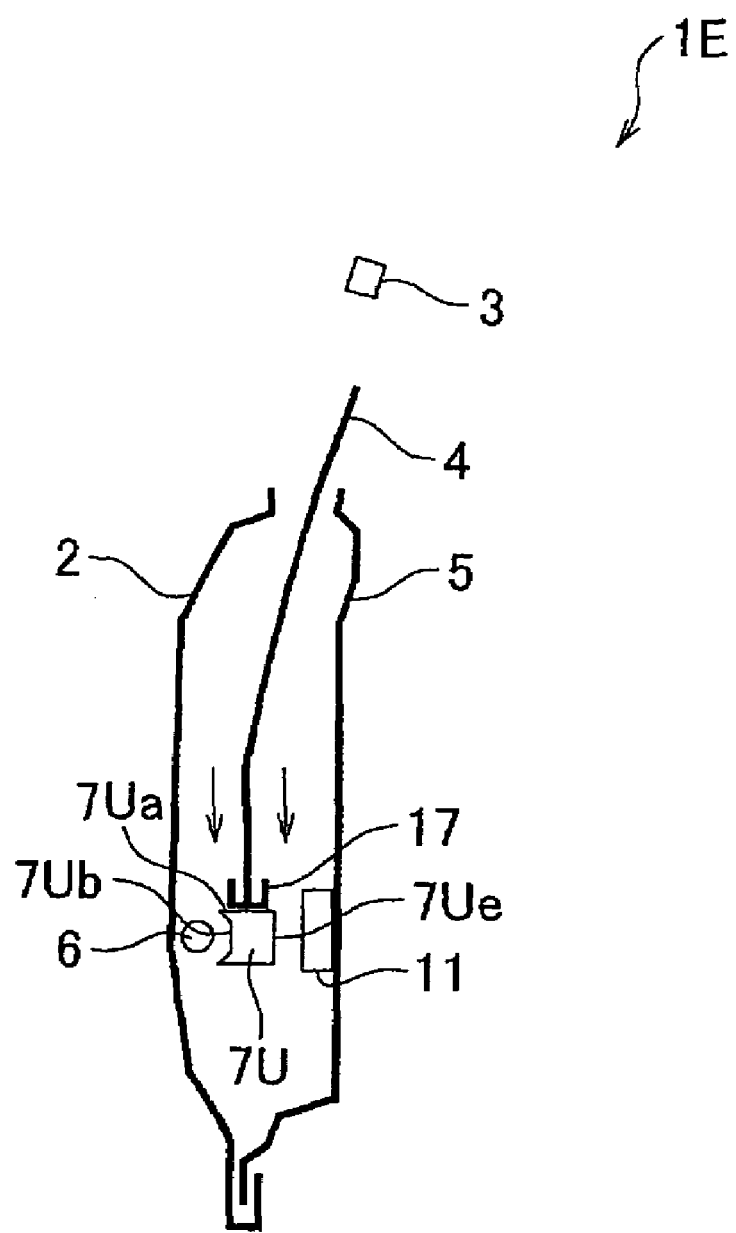
FIG. 28C is an end view of the vehicular door taken along line 28C-28C in FIG. 28A.

Next, the configuration of a vehicular door according to a sixth embodiment of the invention will be described with reference to FIGS. 28A to 28C. FIG. 28A is a diagram showing the vehicular door according to the sixth embodiment of the invention, which is viewed from the inner surface-side. In FIG. 28A, the inner panel is omitted so that the characteristic portions of the embodiment are clearly shown. Also, a circuit block diagram of the electric system portion is shown. FIG. 28B and FIG. 28C are end views of the vehicular door taken along line 28BC-28BC in FIG. 28A. FIG. 28B shows the vehicular door 1E in which the window is closed. FIG. 28C shows the vehicular door 1E that is prepared for a lateral collision.

The vehicular door 1E shown in FIG. 28A and FIG. 28B differs from the vehicular door 1D in the fifth embodiment in that the support member 7U is connected to the door-glass support member 17 without providing the spacer 16 between the support member 7U and the door-glass support member 17, and an ECU 14A is provided instead of the ECU 14. The other portions of the configuration of the vehicular door 1E are the same as those of the vehicular door 1D. Therefore, the description thereof will be omitted.

The upper surface 7Ua of the support member 7U in the vehicle-height direction is connected to the door-glass support member 17, for example, by welding, without providing the spacer 16 between the support member 7U and the door-glass support member 17. That is, the support member 7U is connected to the door-glass support member 17 such that the support member 7U is adjacent to the door glass 4. As the door glass 4 is moved upward or downward, the support member 7U is moved upward or downward accordingly. Thus, when the window is opened by a predetermined amount as shown in FIG. 28C, one surface 7Ub of the support member 7U in the vehicle-width direction is adjacent to the side impact beam 6 in the vehicle-width direction, and the other surface 7Ue of the support member 7 in the vehicle-width direction is adjacent to the load-receiving member 11 in the vehicle-width direction.

The ECU 14A differs from the ECU 14 in that the ECU 14A includes a second determination portion 14Ab instead of the second determination portion 14b; and a drive portion 14Ac instead of the drive portion 14c. The first determination portion 14Aa of the ECU 14A is the same as the first determination portion 14a of the ECU 14. Therefore, the description of the first determination portion 14Aa will be omitted.

When the second determination portion 14Ab receives the information on the result of the determination from the first determination portion 14Aa, the second determination portion 14Ab determines whether the support member 7U is adjacent to the side impact beam 6 in the vehicle-width direction, based on the operation-amount signal received from the window sensor 13. More specifically, the second determination portion 14Ab stores in advance a predetermined operation amount of the door glass 4, which is the operation amount when the support member 7U is adjacent to the side impact beam 6 in the vehicle-width direction. The second determination portion 14Ab determines whether the support member 7U is adjacent to the side impact beam 6 in the vehicle-width direction, by comparing the operation amount indicated by the operation-amount signal received from the window sensor 13, and the predetermined operation amount. If it is determined that the support member 7U is not adjacent to the side impact beam 6 in the vehicle-width direction, the second determination portion 14Ab outputs the information on the result of the determination, the operation-amount signal, and the predetermined operation amount to the drive portion 14Ac (step S2).

When the drive portion 14Ac receives the information on the result of the determination from the second determination portion 14Ab, the drive portion 14Ac provides the instruction to the window electric motor 15 so that the support member 7U is adjacent to the side impact beam 6 in the vehicle-width direction. More specifically, the drive portion 14Ac determines the difference between the operation amount indicated by the operation-amount signal and the predetermined operation amount. Then, the drive portion 14Ac provides the instruction to the window electric motor 15 so that the door glass 4 is moved upward or downward, according to whether the value of the difference is a positive value or a negative value, and according to the value of the difference (step S3). That is, the drive portion 14Ac functions as the drive device in the embodiment.

Thus, in the vehicular door 1E in the embodiment, the support member 7U is connected to the door glass 4. When there is the possibility of the lateral collision, the support member 7U is moved upward or downward so that the support member 7U is adjacent to the side impact beam 6 in the vehicle-width direction, using the radar sensor 12, the window sensor 13, the ECU 14A, and the window electric motor 15. Therefore, it is possible to obtain the same advantages as those obtained in the vehicular door 1D in the fifth embodiment.

Seventh Embodiment

Figure 29A:
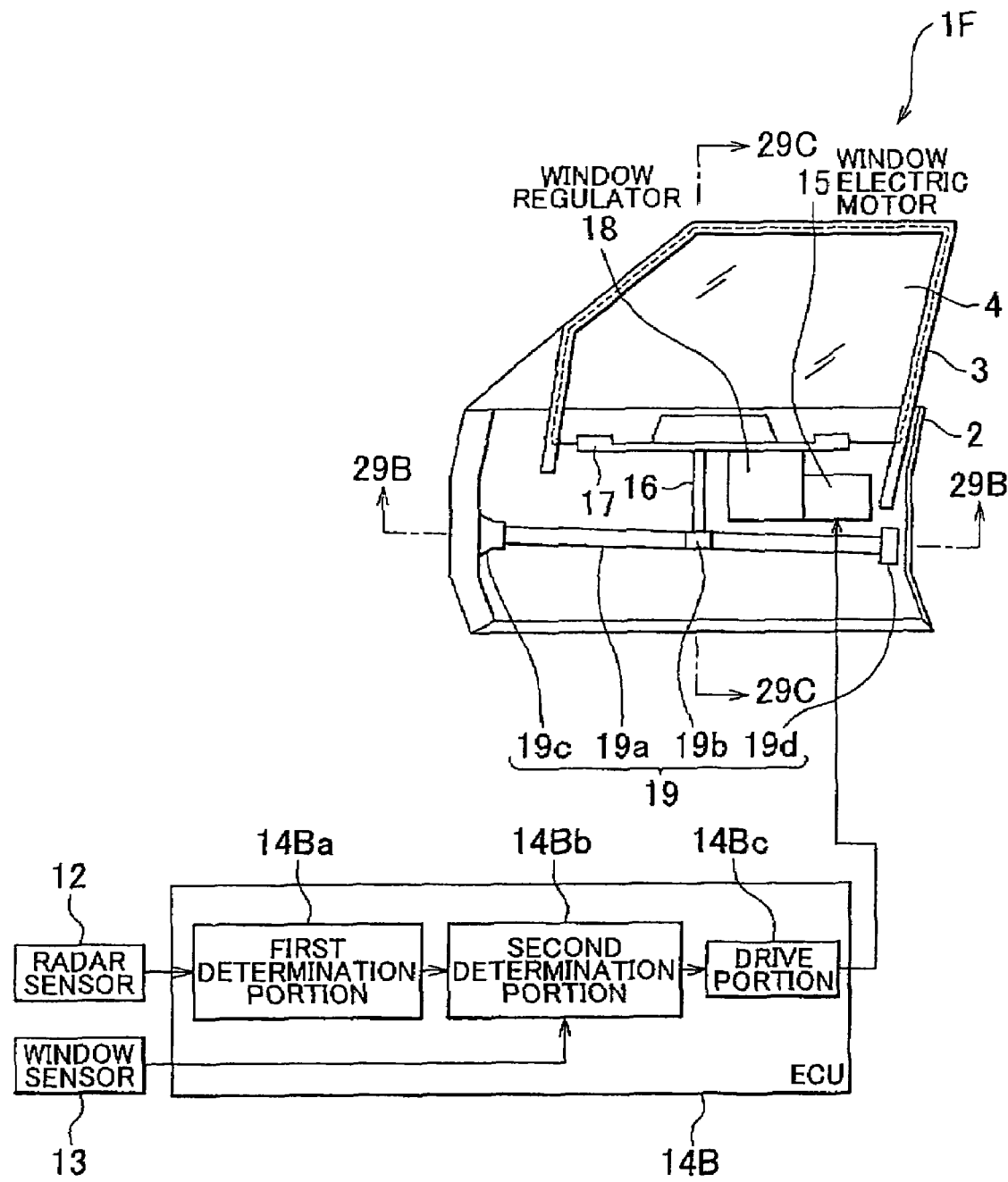
FIG. 29A is a diagram showing a vehicular door according to a seventh embodiment of the invention, which is viewed from the inner surface-side.
Figure 29B:
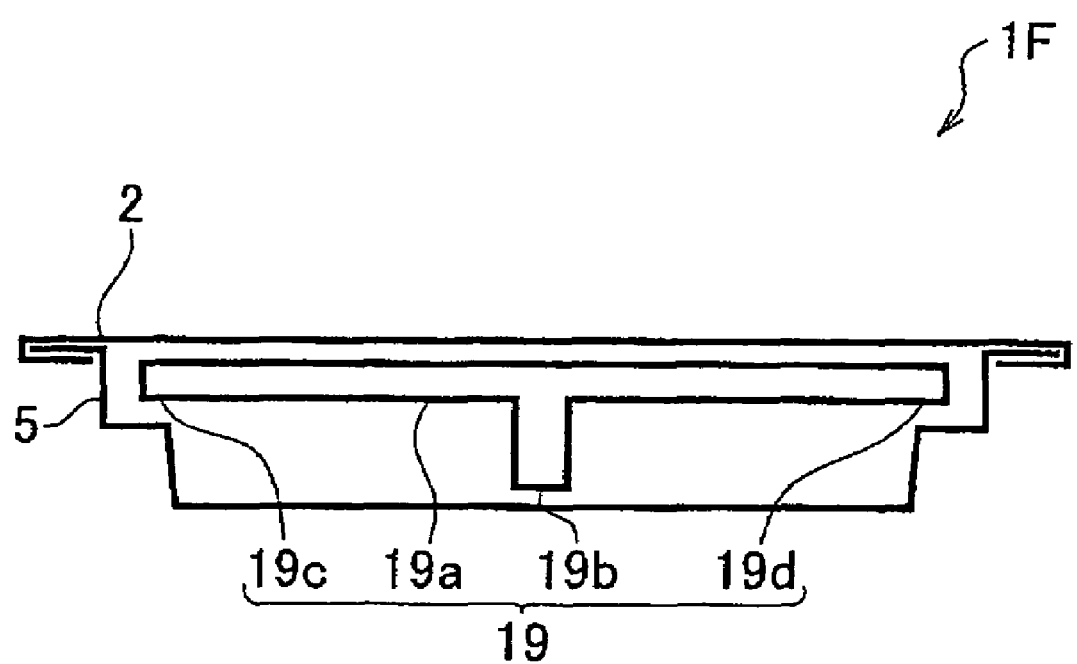
FIG. 29B is an end view of the vehicular door taken along line 29B-29B in FIG. 29A.
Figure 29C:
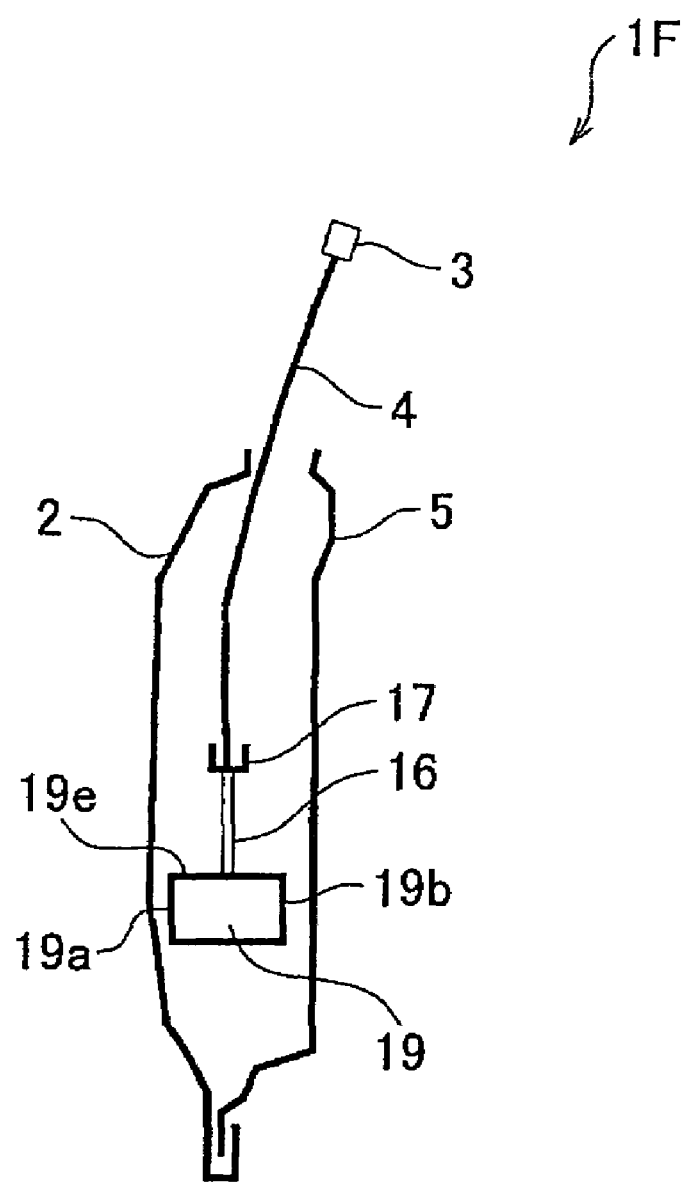
FIG. 29C is an end view of the vehicular door taken along line 29C-29C in FIG. 29A.

Next, the configuration of a vehicular door according to a seventh embodiment of the invention will be described with reference to FIGS. 29A to 29C. FIG. 29A is a diagram showing the vehicular door according to the seventh embodiment, which is viewed from the inner surface-side. In FIG. 29A, the inner panel is omitted so that the characteristic portions of the embodiment are clearly shown. Also, a circuit block diagram of the electric system portion is shown. FIG. 29B is an end view of the vehicular door taken along line 29B-29B in FIG. 29A. FIG. 29C is an end view of the vehicular door taken along line 29C-29C in FIG. 29A.

The vehicular door 1F shown in FIGS. 29A to 29C differs from the vehicular door 1D in the fifth embodiment in that the vehicular door 1F includes a reinforcement member 19 instead of the side impact beam 6, the support member 7T, and the load-receiving member 11; and an ECU 14B instead of the ECU 14. The other portions of the configuration of the vehicular door 1F are the same as those of the vehicular door 1D. Therefore, the description thereof will be omitted.

The reinforcement member 19 is provided between the outer panel 2 and the inner panel 5. The reinforcement member 19 includes a first portion 19a, and a second portion 19b. For example, the first portion 19a has a substantially rectangular parallelepiped shape, and extends in the vehicle fore-and-aft direction. Each of both ends 19c and 19d of the first portion 19a is adjacent to a vehicle framework member in the vehicle-width direction. The second portion 19b is continuous with a center portion of the inner surface of the first portion 19a in the vehicle fore-and-aft direction. The second portion 19b has a substantially rectangular parallelepiped shape, end extends in the vehicle-width direction.

The upper surface 19e of the reinforcement member 19 in the vehicle-height direction is connected to the door-glass support member 17 via the spacer 16. That is, the reinforcement member 19 is connected to the door-glass support member 17 such that the reinforcement member 19 is away from the door glass 4. As the door glass 4 is moved upward or downward, the reinforcement member 19 is moved upward or downward accordingly. Thus, the reinforcement member 19 is disposed at a predetermined position in the vehicle-height direction when the window is closed. More specifically, the reinforcement member 19 is disposed at the position that matches the position of the bumper of the vehicle in the vehicle height direction when the window is closed. The position of the bumper is approximately 400 mm to 500 mm away from the ground surface.

The ECU 14B differs from the ECU 14 in the fifth embodiment in that the ECU 14B includes a second determination portion 14Bb instead of the second determination portion 14b; and a drive portion 14Bc instead of the drive portion 14c. The first determination portion 14Ba of the ECU 14B is the same as the first determination portion 14a of the ECU 14. Therefore, the description of the first determination portion 14Ba will be omitted.

When the second determination portion 14Bb receives the information on the result of the determination from the first determination portion 14Ba, the second determination portion 14Bb determines whether the reinforcement member 19 is disposed at the predetermined position, based on the operation-amount signal received from the window sensor 13. More specifically, the second determination portion 14Bb determines whether the window is closed, based on the operation amount of the door glass 4 indicated by the operation-amount signal. When the window is not closed, the second determination portion 14Bb outputs the information on the result of the determination to the drive portion 14Bc.

When the drive portion 14Bc receives the information on the result of the determination from the second determination portion 14Bb, the drive portion 14Bc provides the instruction to the window electric motor 15 so that the reinforcement member 19 is disposed at the predetermined position. More specifically, the drive portion 14Bc provides the instruction to the window electric motor 15 so that the window is closed. That is, the drive portion 14Bc functions as the drive device in the embodiment.

Next, the operation of the vehicular door 1F according to the seventh embodiment will be described. The operation of the radar sensor 12 and the operation of the window sensor 13 are described above. Therefore, the description thereof will be omitted.

Figure 30:
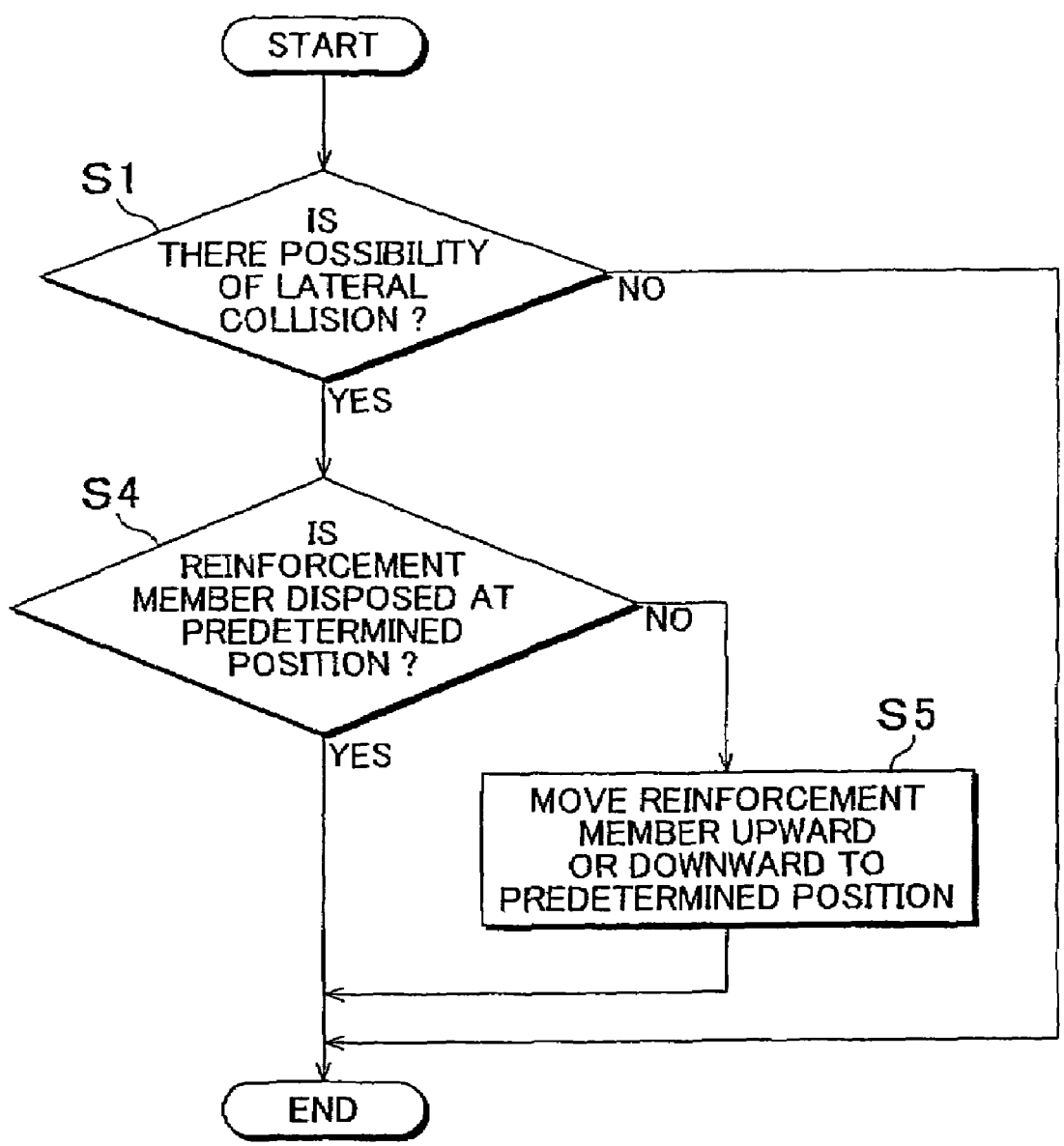
FIG. 30 is a flowchart showing the operation of an ECU in a seventh embodiment of the invention.

FIG. 30 is a flowchart showing the operation of the ECU 14B. The first determination portion 14Ba determines whether there is a possibility of a lateral collision with an object, based on the distance signal and the speed signal received from the radar sensor 12 (step S1).

If it is determined that there is the possibility of the lateral collision in step S1, the second determination portion 14Bb determines whether the reinforcement member 19 is disposed at the predetermined position, based on the operation-amount signal received from the window sensor 13 (step S4).

If it is determined that the reinforcement member 19 is not disposed at the predetermined position in step S4, the drive portion 14Bc drives the window electric motor 15, thereby closing the window. That is, the window electric motor 15 moves the door glass 4 and the reinforcement member 19 upward. Thus, the reinforcement member 19 is disposed at the predetermined position (step S5).

If it is determined that there is no possibility of a lateral collision in step S1, the first determination portion 14Ba does not output the information on the result of the determination to the second determination portion 14Bb. As a result, the ECU 14B finishes the routine shown in FIG. 30, without performing steps S4 and S5. If it is determined that the reinforcement member 19 is disposed at the predetermined position in step S4, the second determination portion 14Bb does not output the information on the result of the determination to the drive portion 14Bc. As a result, the ECU 14B finishes the routine shown in FIG. 30, without performing step S5.

Figure 31:
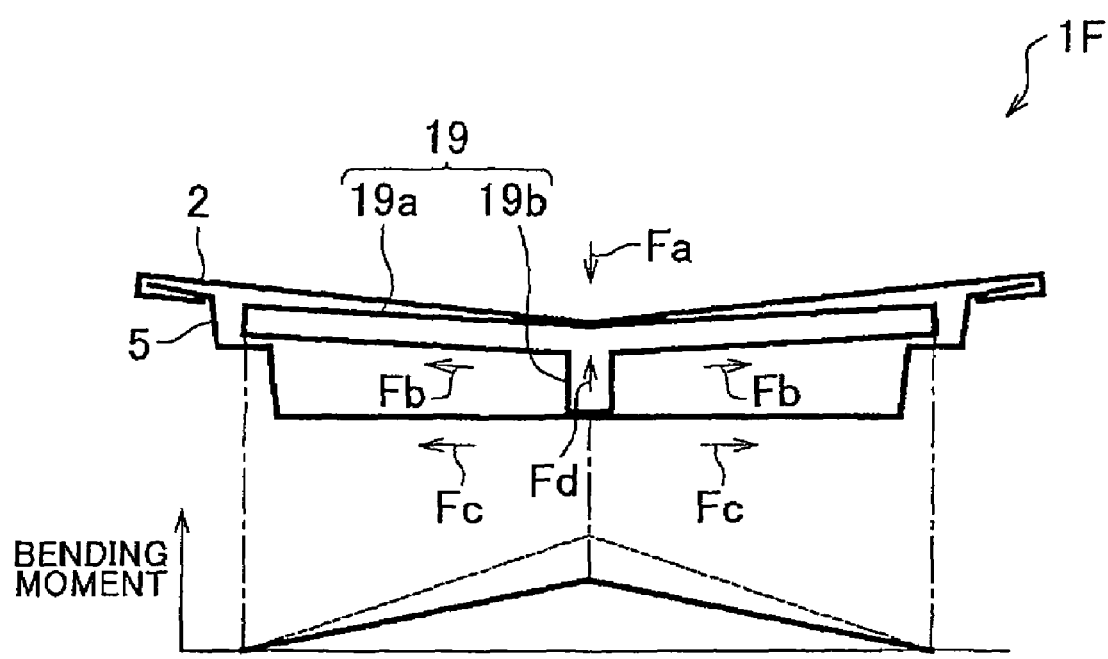
FIG. 31 is a diagram explaining the collision load applied to he vehicular door shown in FIG. 29B and the tension load that occurs in the vehicular door shown in FIG. 29B.

Next, the collision load applied to the vehicular door 1F and the tension load that occurs in the vehicular door 1F at the time of a lateral collision will be described. FIG. 31 is a diagram explaining the collision load applied to the vehicular door 1F shown in FIG. 29B and the tension load that occurs in the vehicular door 1F shown in FIG. 29.

If the collision load Fa is applied to the outer panel 2 of the vehicular door 1F from an object when the vehicle has a lateral collision or the like, the collision load Fa is transmitted to the first portion 19a of the reinforcement member 19 via the outer panel 2. Because each of the both end portions of the first portion 19a is adjacent to the vehicle framework member in the vehicle-width direction, the tension load Fb occurs in the first portion 19a. The first portion 19a supports the collision load Fa using the tension load Fb.

Further, the collision load Fa is transmitted to the inner panel 5 via the second portion 19b, and the tension load Fc occurs in the inner panel 5. Then, the reaction force Fd is transmitted to the first portion 19a via the second portion 19b. The reaction force Fd varies depending on the tension load Fc. As a result, as shown in FIG. 31, the bending moment that occurs in the first portion 19a is decreased by the reaction force Fd, from the moment indicated by the dotted line to the moment indicated by the solid line. Accordingly, even if the collision load Fa and the bending moment are further increased, the bending of the first portion 19a is suppressed.

Thus, in the vehicular door 1F according to the embodiment, it is possible to increase the strength against the collision load Fa applied to the outer panel 2 when the vehicle has a collision or the like, without interfering with the upward or downward movement of the door glass 4.

Also, in the vehicular door 1F according to the invention, when there is the possibility of the lateral collision, the reinforcement member 19 can be disposed at the predetermined position in the vehicle-height direction, using the radar sensor 12, the window sensor 13, the ECU 14B, and the window electric motor 15. Accordingly, in the vehicular door 1F in the embodiment, it is possible to increase the strength against the collision load Fa applied to the outer panel 2 when the vehicle has a lateral collision or the like, regardless of the operating state of the door glass 4.

Eighth Embodiment

Figure 32A:
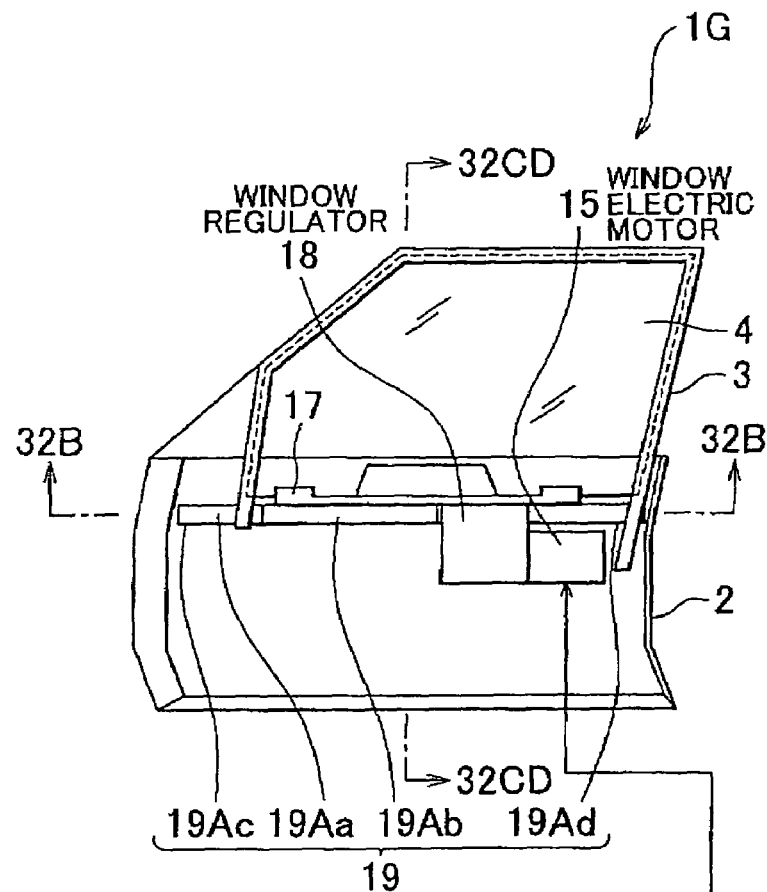
FIG. 32A is a diagram showing a vehicular door according to an eighth embodiment of the invention, which is viewed from the inner surface-side.
Figure 32A:
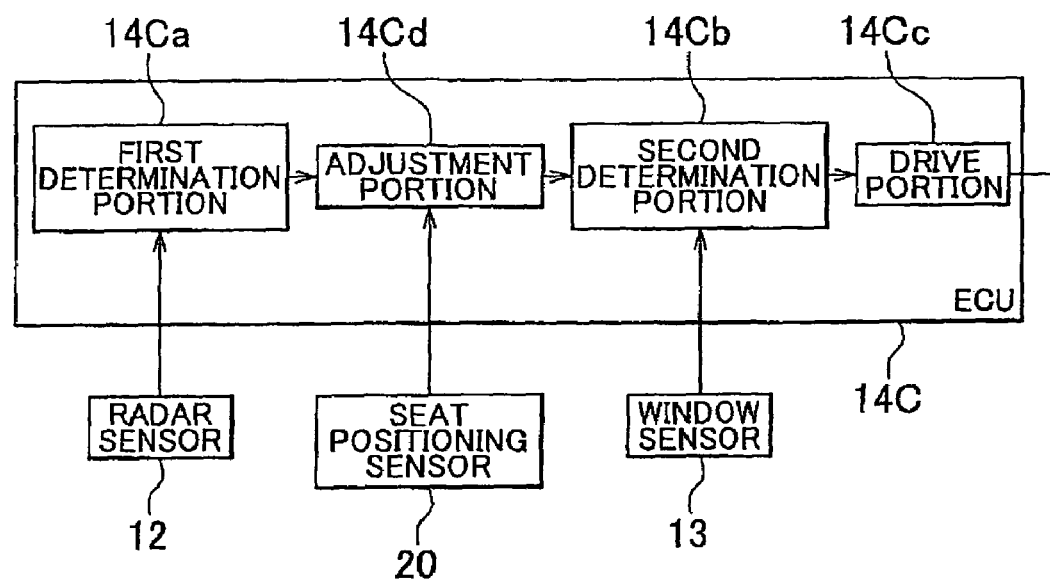
Figure 32B:
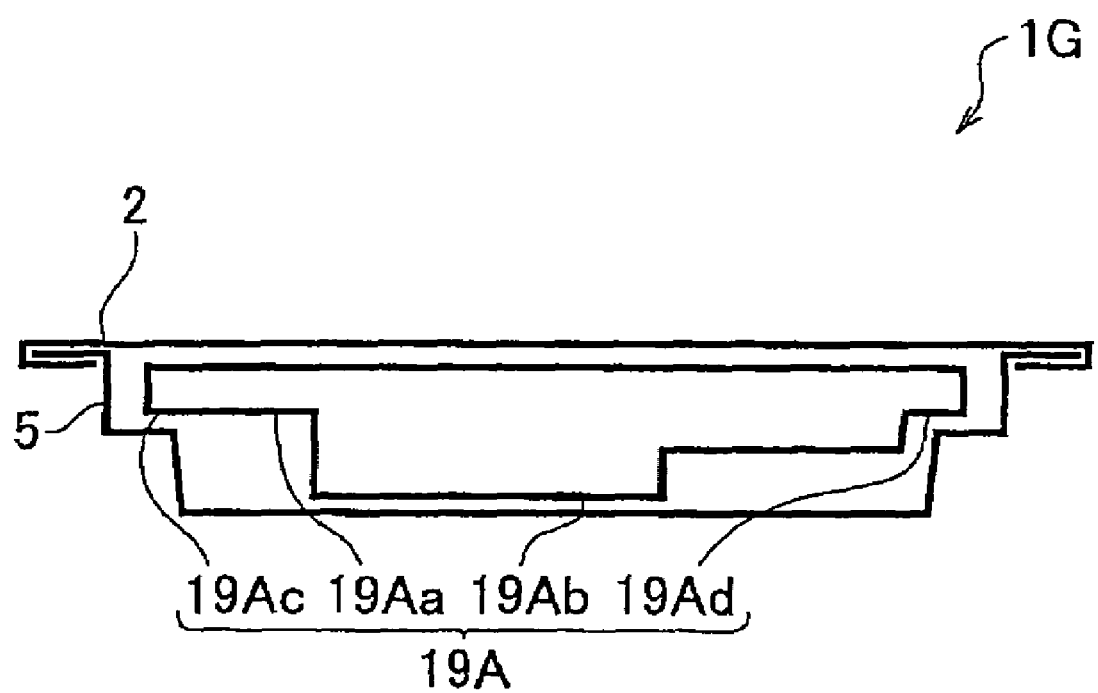
FIG. 32B is an end view of the vehicular door taken along line 32B-32B in FIG. 32A.
Figure 32C:
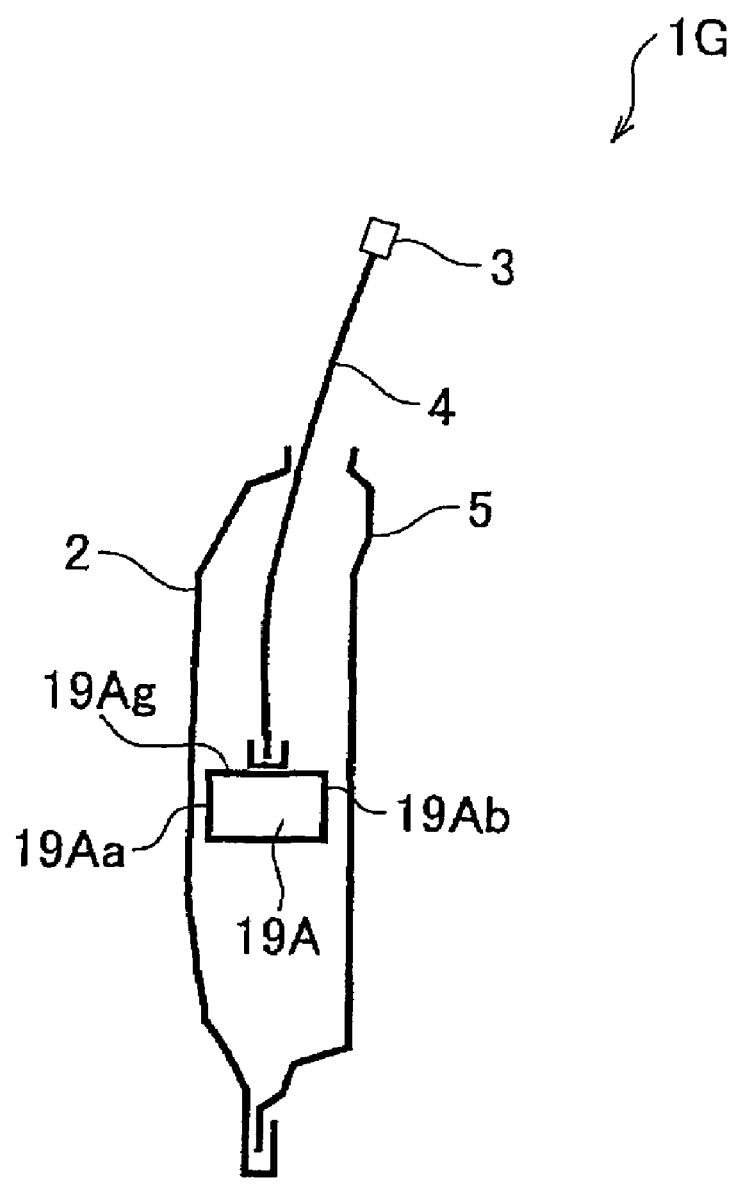
FIG. 32C is an end view of the vehicular door taken along line 32C-32C in FIG. 32A.
Figure 32D:
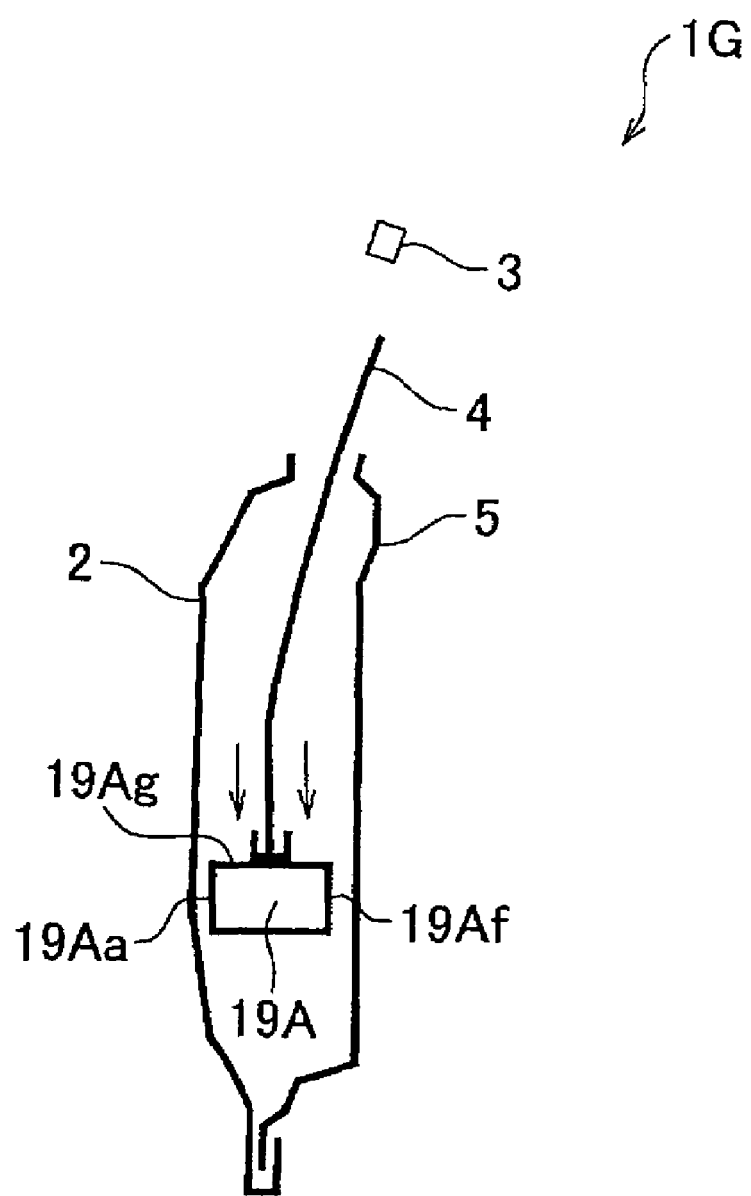
FIG. 32D is an end view of the vehicular door taken along line 32D-32D in FIG. 32A.

Next, the configuration of a vehicular door according to an eighth embodiment of the invention will be described with reference to FIGS. 32A to 32D. FIG. 32A is a diagram showing the vehicular door according to the eighth embodiment of the invention, which is viewed from the inner surface-side. In FIG. 32A, the inner panel is omitted so that the characteristic portions of the embodiment are clearly shown. Also, a circuit block diagram of the electric system portion is shown. FIG. 32B is an end view of the vehicular door taken along line 32B-32B in FIG. 32A. FIG. 32C and FIG. 32D are end views of the vehicular door taken along line 32CD-32CD in FIG. 32A. FIG. 32C shows the vehicular door 1G in which the window is closed. FIG. 32D shows the vehicular door 1G that is prepared for a lateral collision.

The vehicular door 1G shown in FIGS. 32A to 32D differs from the vehicular door 1F in the seventh embodiment in that the vehicular door 1G includes the reinforcement member 19A instead of the reinforcement member 19, and the reinforcement member 19A is connected to the door-glass support member 17 without providing the spacer 16 between the reinforcement member 19A and the door-glass support member 17. The vehicular door 1G differs from the vehicular door 1F also in that the vehicular door 1G further includes a seat positioning sensor 20, and includes an ECU 14C instead of the ECU 14B. The other portions of the configuration of the vehicular door 1G are the same as those of the vehicular door 1F. Therefore, the description of thereof will be omitted.

The reinforcement member 19A differs from the reinforcement member 19 in that the reinforcement member 19A includes a second portion 19Ab instead of the second portion 19b. The second portion 19Ab extends in the vehicle-width direction from the entire inner surface of the first portion 19Aa, except the area where the door frame 3, the window electric motor 15, window regulator 18, and the like are provided. The first portion 19Aa of the reinforcement member 19A is the same as the first portion 19a of the reinforcement member 19.

The upper surface 19A of the reinforcement member 19A in the vehicle-height direction is connected to the door-glass support member 17 without providing the spacer 16 between the reinforcement member 19A and the door-glass support member 17. That is, the reinforcement member 19A is connected to the door-glass support member 17 such that the reinforcement member 19A is adjacent to the door glass 4. As the door glass 4 is moved upward or downward, the reinforcement member 19A is moved upward or downward accordingly. Thus, as shown in FIG. 32D, the reinforcement member 19A is disposed at a predetermined position in the vehicle-height direction, when the window is opened by a predetermined amount. More specifically, the reinforcement member 19A is disposed at the position that matches the position at which an occupant is seated (hereinafter, referred to as "occupant seated position") in the vehicle-height direction, when the window is opened by the predetermined amount. For example, the occupant seated position is the position of the hip point of the occupant.

The seat positioning sensor 20 detects the occupant seated position that varies depending on the load applied to the vehicle, that is, the position of the hip point of the occupant, by detecting the stroke amount of a suspension. The seat positioning sensor 20 outputs a stroke-amount signal to the ECU 14C. The intensity of the stroke-amount signal varies depending on the stroke amount of the suspension.

The ECU 14C differs from the ECU 14B in the seventh embodiment in that the ECU 14C includes a second determination portion 14Cb instead of the second determination portion 14Bb; and a drive portion 14Cc instead of the drive portion 14Bc. The ECU 14C differs from the ECU 14B also in that the ECU 14C further includes an adjustment portion 14Cd. The first determination portion 14Ca of the ECU 14C is the same as the first determination portion 14Ba of the ECU 14B. Therefore, the description thereof will be omitted.

The adjustment portion 14Cd stores in advance a predetermined operation amount of the door glass 4, which is the operation amount when the reinforcement member 19A is disposed at the position that matches the position of the hip point in the vehicle-height direction. When the adjustment portion 14Cd receives the information on the result of the determination from the first determination portion 14Ca, the adjustment portion 14Cd adjusts the predetermined operation amount of the door glass 4 that is stored in advance, by the stroke amount of the suspension that is indicated by the stroke-amount signal received from the seat positioning sensor 20. After the adjustment portion 14Cd finishes adjusting the operation amount of the door glass 4, the adjustment portion 14Cd outputs the information that the adjustment is finished, and the adjusted predetermined operation amount of the door glass 4, to the second determination portion 14Cb.

When the second determination portion 14Cb receives the information that the adjustment is finished, from the adjustment portion 14Cd, the second determination portion 14Cb determines whether the reinforcement member 19A is disposed at the predetermined position, based on the operation-amount signal received from the window sensor 13. More specifically, the second determination portion 14Cb determines whether the reinforcement member 19A is disposed at the predetermined position, by comparing the operation amount of the door glass 4 indicated by the operation-amount signal, and the predetermined operation amount of the door glass 4 adjusted by the adjustment portion 14Cd. When the reinforcement member 19A is not disposed at the predetermined position, the second determination portion 14Cb outputs the information on the result of the determination, the operation-amount signal, and the adjusted predetermined operation amount, to the drive portion 14Cc.

When the drive portion 14Cc receives the information on the result of the determination from the second determination portion 14Cb, the drive portion 14Cc provides the instruction to the window electric motor 15 so that the reinforcement member 19A is disposed at the predetermined position. More specifically, the drive portion 14Cc determines the difference between the operation amount of the door glass 4 indicated by the operation-amount signal and the adjusted predetermined operation amount of the door glass 4. Then, the drive portion 14Cc provides the instruction to the window electric motor 15 so that the door glass 4 is moved upward or downward, according to whether the value of the difference is a positive value or a negative value, and according to the value of the difference. That is, the drive portion 14Cc functions as the drive device in the embodiment.

Next, the operation of the vehicular door 1G according to the eighth embodiment will be described. The operation of the radar sensor 12 and the operation of the window sensor 13 are described above. Therefore, the description thereof will be omitted.

Figure 33:
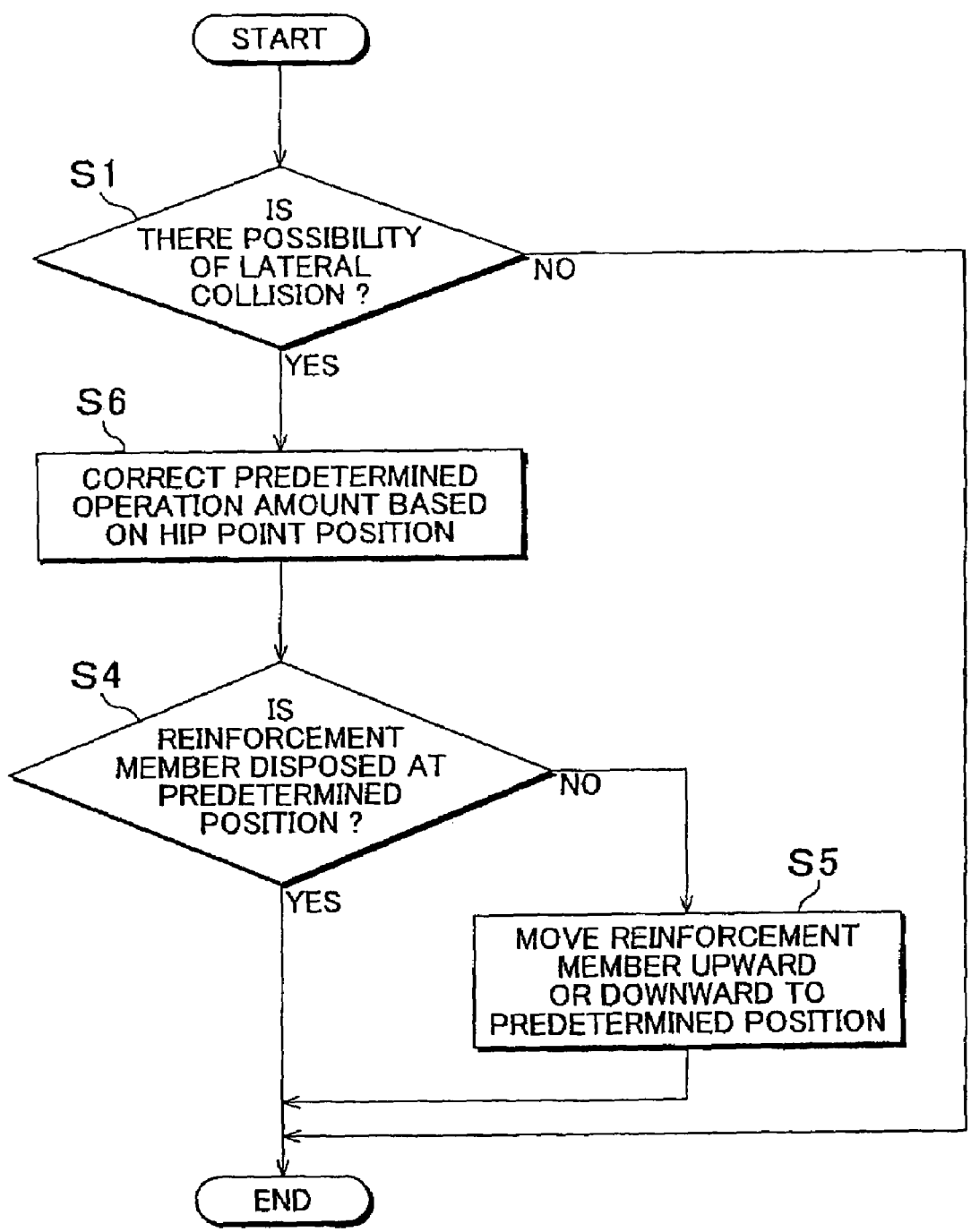
FIG. 33 is a flowchart showing the operation of an ECU in the eighth embodiment.

FIG. 33 is a flowchart showing the operation of the ECU 14C. The first determination portion 14Ca determines whether there is the possibility of the lateral collision with an object, based on the distance signal and the speed signal received from the radar sensor 12 (step S1).

If it is determined that there is the possibility of the lateral collision in step S1, the adjustment portion 14Cd corrects the predetermined operation amount of the door glass 4 that is stored in advance, by the stroke amount of the suspension indicated by the stroke-amount signal received from the seat positioning sensor 20 (step S6).

Then, the second determination portion 14Cb determines whether the reinforcement member 19A is disposed at the predetermined position, based on the operation-amount signal received form the window sensor 13. More specifically, the second determination portion 14Cb determines whether the reinforcement member 19A is disposed at the predetermined position, by comparing the operation amount of the door glass 4 indicated by the operation-amount signal, and the predetermined operation amount of the door glass 4 adjusted by the adjustment portion 14Cd (step S4).

If it is determined that the reinforcement member 19A is not disposed at the predetermined position in step S4, the drive portion 14Cc drives the window electric motor 15, thereby moving the door glass 4 and the reinforcement member 19A upward or downward. Thus, the reinforcement member 19A is disposed at the predetermined position, that is, at the position that matches the position of the hip point of the occupant in the vehicle-height direction (step S5).

If it is determined that there is no possibility of a lateral collision in step S1, the first determination portion 14Ca does not output the information on the result of the determination to the adjustment portion 14Cd. As a result, the ECU 14C finishes the routine shown in FIG. 33, without performing steps S6, S4, and S5. If it is determined that the reinforcement member 19A is disposed at the predetermined position in step S4, the second determination portion 14Cb does not output the information on the result of the determination to the drive portion 14Cc. As a result, the ECU 14C finishes the routine shown in FIG. 33 without performing step S5.

Thus, in the vehicular door 1G in the embodiment, the reinforcement member 19A is connected to the door glass 4. Therefore, if there is the possibility of the lateral collision, the reinforcement member 19A is moved upward or downward so that the reinforcement member 19A is disposed at the predetermined position, using the radar sensor 12, the window sensor 13, the seat positioning sensor 20, the ECU 14C, and the window electric motor 15. Accordingly, it is possible to obtain the same advantages as those in the vehicular door 1F in the seventh embodiment.

Also, in the vehicular door 1G in the embodiment, the second portion 19Ab of the reinforcement member 19A extends in the vehicle-width direction from the entire inner surface of the first portion 19Aa. Therefore, it is possible to further increase the strength against the collision load Fa applied to the outer panel 2 when the vehicle has a lateral collision or the like. Also, in the vehicular door 1G in the embodiment, the reinforcement member 19A can be appropriately disposed at the position that matches the occupant seated position that varies depending on the load applied to the vehicle, that is, the position of the hip point, using the seat positioning sensor 20 and the adjustment portion 14Cd of the ECU 14C. Accordingly, it is possible to improve the safety of the occupant when the vehicle has a lateral collision or the like.

The invention is not limited to the above-described embodiments. Various modifications may be made.

In the vehicular door 1D in the fifth embodiment, one support member 7T and one load-receiving member 11 are provided to face the center portion of the side impact beam 6 in the vehicle fore-and-aft direction. In the vehicular door 1E in the sixth embodiment, one support member 7U and one load-receiving member 11 are provided to face the center portion of the side impact beam 6 in the vehicle fore-and-aft direction. However, a plurality of support members 7T or 7U and a plurality of load-receiving members 11 may be provided to face the side impact beam 6 that extends in the vehicle fore-and-aft direction.

In the vehicular door 1F in the seventh embodiment, one second portion 19b of the reinforcement member 19 is provided at the center portion of the first portion 19a in the vehicle fore-and-aft direction. However, a plurality of second portions 19b may be provided in the first portion 19a in the vehicle fore-and-aft direction.

In the embodiments, each of the vehicular doors 1D, 1E, 1F, and 1G includes the radar sensor 12. However, each of the vehicular doors 1D, 1E, 1F, and 1G may include a CCD camera instead of the radar sensor 12. In this case, the first determination portion of each of the ECUs 14, 14A, 14B, and 14C determines the possibility of the lateral collision based on image data captured by the CCD camera.

In the eighth embodiment, the adjustment portion 14Cd adjusts the predetermined operation amount of the door glass 4 based on the operation-amount signal received from the seat positioning sensor 20 so that the reinforcement member 19A is appropriately disposed at the position that matches the position of the hip point in the vehicle-height direction. However, the adjustment portion 14Cd may adjust the predetermined operation amount of the door glass 4 so that the reinforcement member 19A is appropriately disposed at the height of a strengthening member (for example, the bumper, front side member, or front cross member) of another vehicle. In this case, the adjustment portion 14Cd may adjust the predetermined operation amount of the door glass 4 based on the height of the other vehicle detected by means for detecting the other vehicle (for example, image data captured by the above-described CCD camera). Alternatively, the adjustment portion 14Cd may adjust the predetermined operation amount of the door glass 4 based on information concerning the other vehicle received by communication means (for example, the position of the bumper received by vehicle-to-vehicle communication).

Ninth Embodiment

Figure 34A:
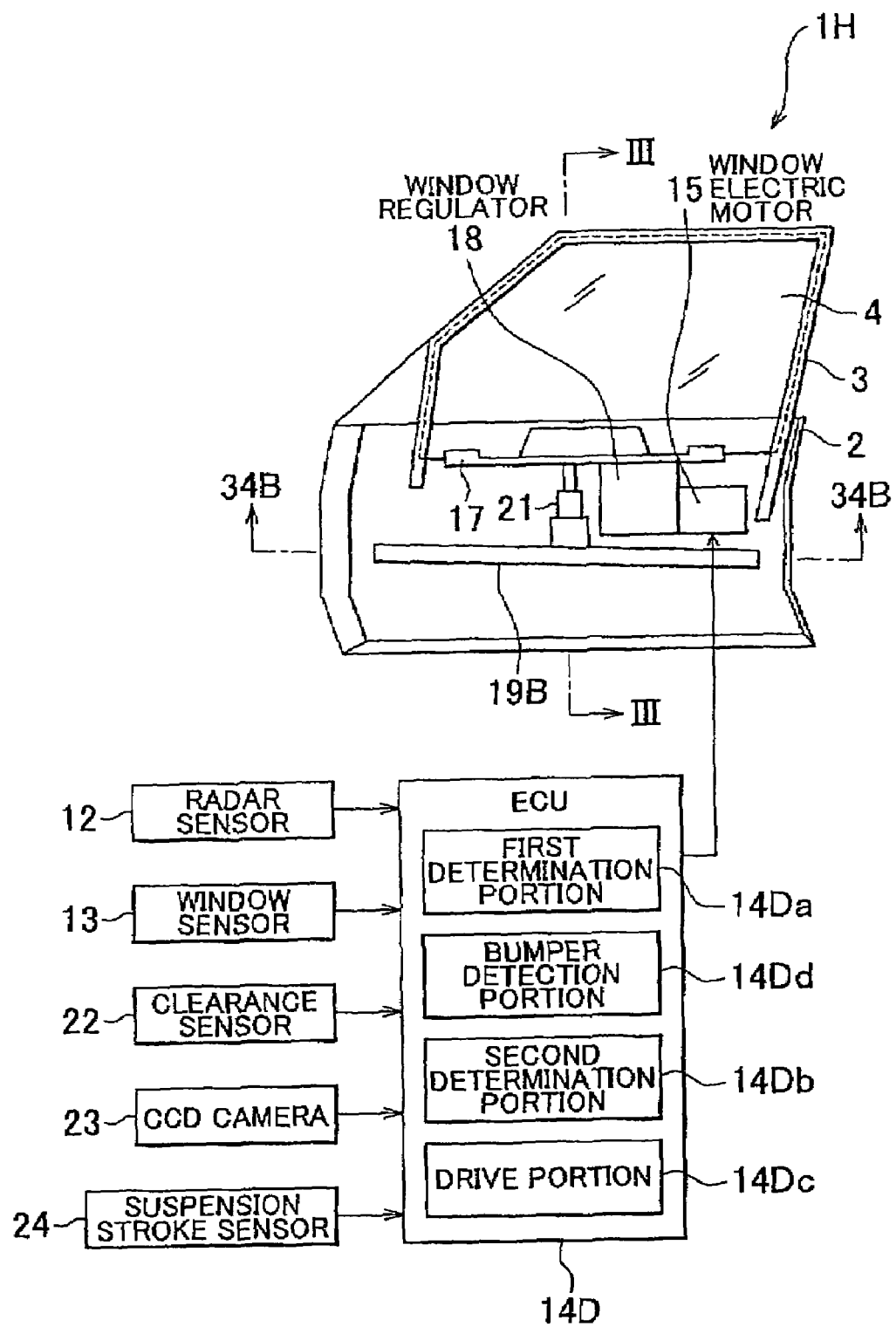
FIG. 34A is a diagram showing a vehicular door according to a ninth embodiment of the invention, which is viewed from the inner surface-side of the vehicle compartment.
Figure 34B:
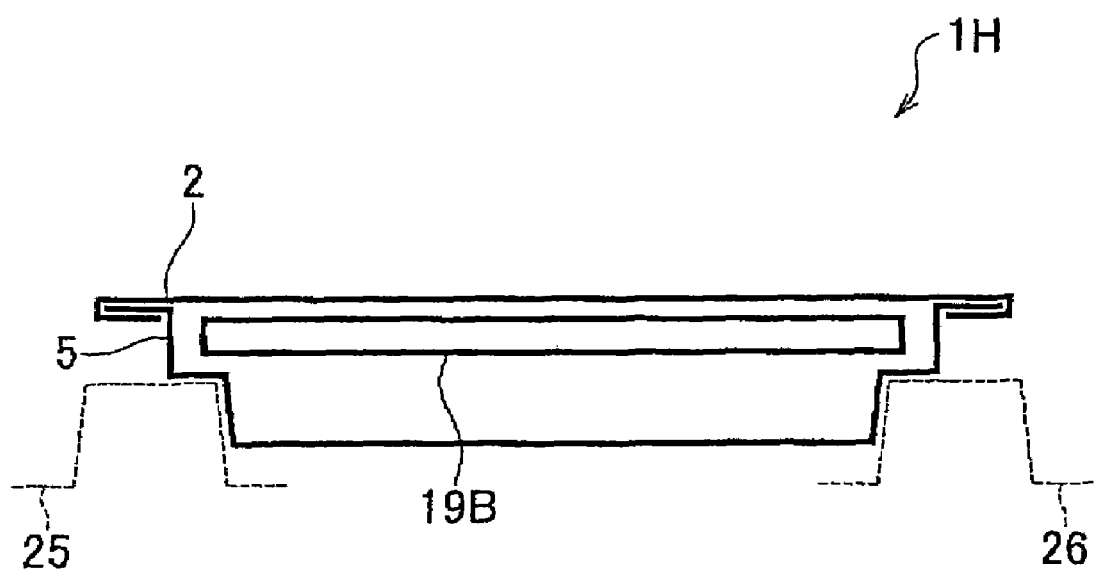
FIG. 34B is an end view of the vehicular door taken along line 34B-34B in FIG. 34A.
Figure 34C:
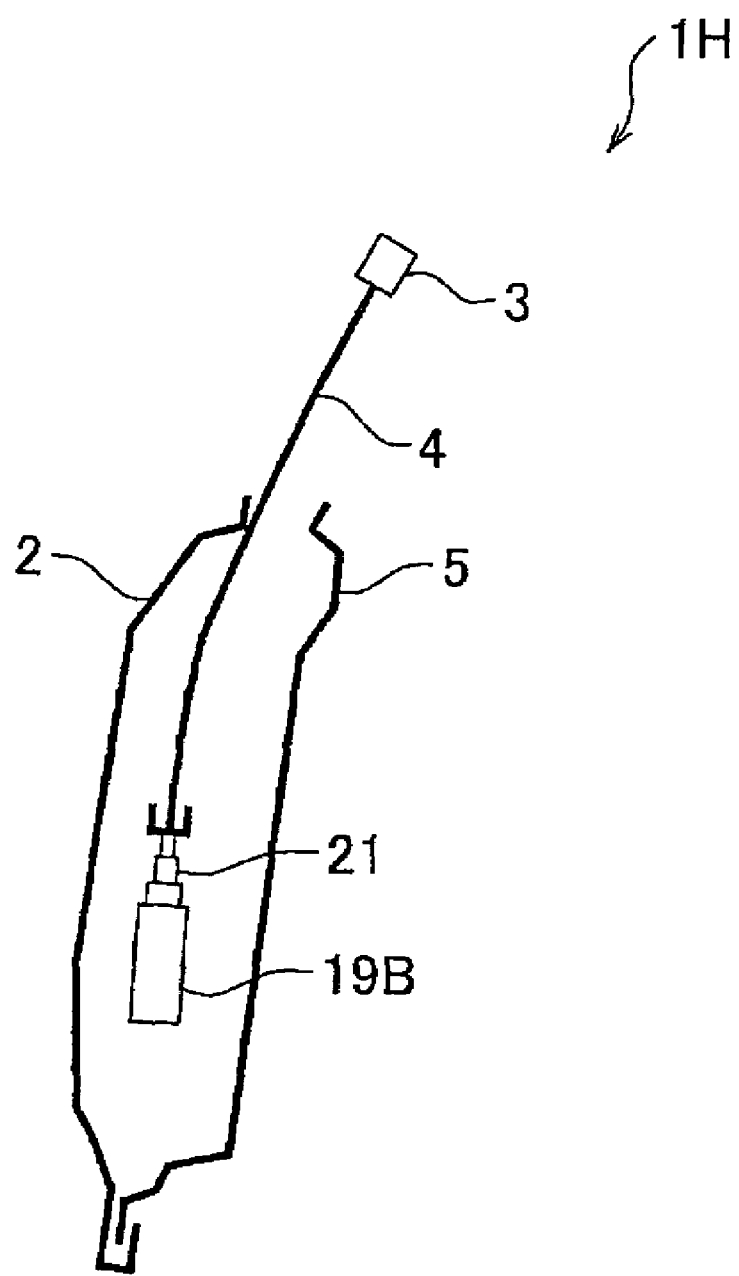
FIG. 34C is an end view of the vehicular door taken along line 34C-34C in FIG. 34A.
Figure 35:
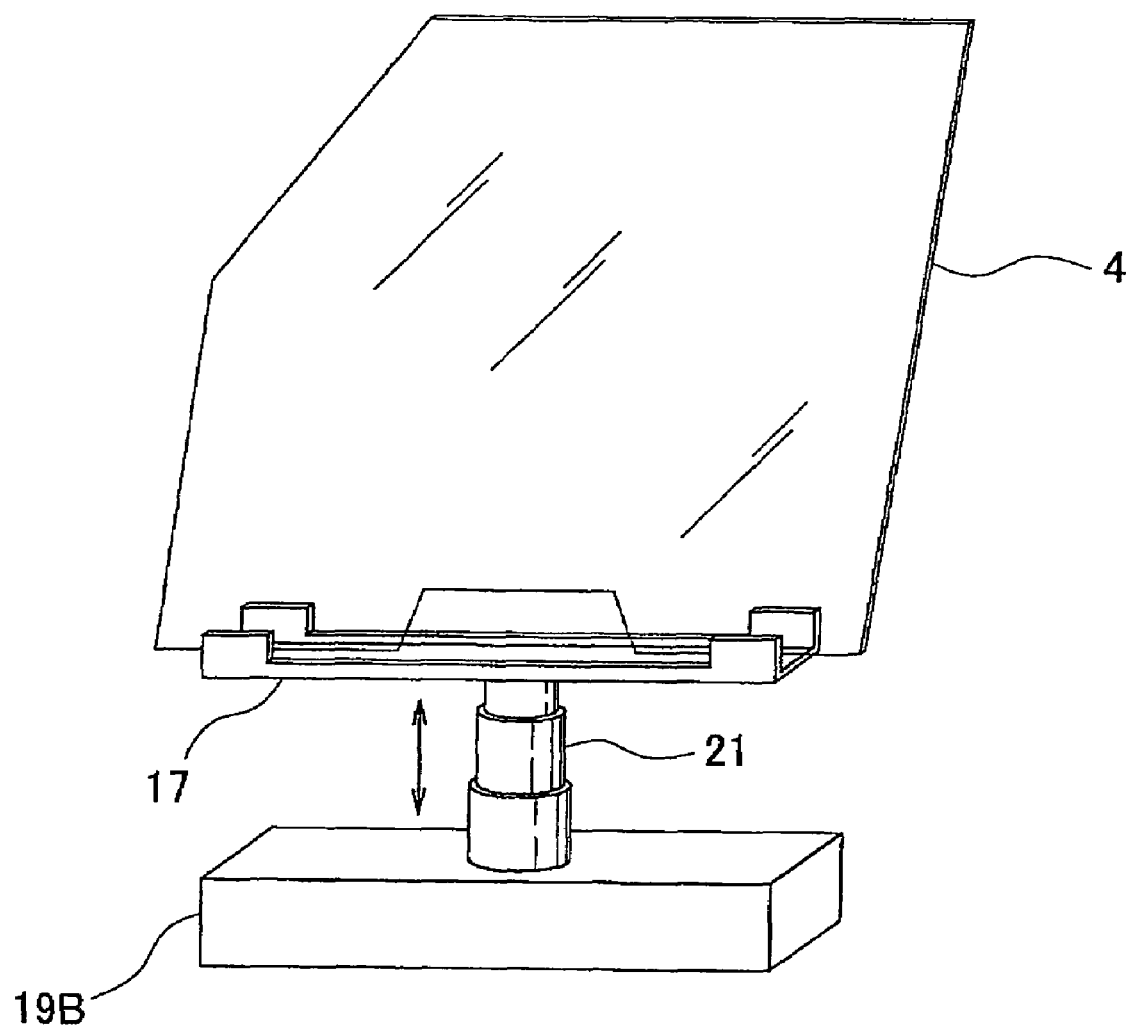
FIG. 35 is a perspective view showing the main portion of the vehicular door shown in FIG. 34A.

Next, the configuration of a vehicular door according to a ninth embodiment of the invention will be described with reference to FIGS. 34A to 35. FIG. 34A is a diagram showing the vehicular door according to the ninth embodiment of the invention, which is viewed from the inside of the vehicle compartment. In FIG. 34A, the inner panel is omitted so that the characteristic portions of the embodiment are clearly shown. Also, a circuit block diagram of the electric system portion is shown. FIG. 34B is an end view of the vehicular door taken along line 34B-34B in FIG. 34A. FIG. 34C is an end view of the vehicular door taken along line 34C-34C in FIG. 34A. FIG. 35 is a perspective view showing the main portion of the vehicular door shown in FIG. 34A.

The vehicular door 1H shown in FIGS. 34A to 35 includes a reinforcement member 19B, a clearance change portion 21, a clearance sensor 22, a CCD camera 23, a suspension stroke sensor 24, and an ECU 14D. The other portions of the configuration of the vehicular door 1H are the same as those in the above-described embodiments. Therefore, the description thereof will be omitted. The clearance sensor 22, the CCD camera 23, the suspension stroke sensor 24, and the ECU 14D constitute the electric system portion.

The reinforcement member 19B is provided between the outer panel 2 and the inner panel 5. The reinforcement member 19B has a bar shape, and extends in the vehicle fore-and-aft direction. In the embodiment, the reinforcement member 19B has a rectangular cross section. However, the cross section of the reinforcement member 19B may have various shapes. The reinforcement member 19B is disposed below the door glass 4 such that both end portions of the reinforcement member 19B overlap pillars 25 and 26 in the vehicle-width direction. The pillars 25 and 26 constitute a part of the vehicle framework. The reinforcement member 19B is connected to the door-glass support member 17 such that the reinforcement member 19B is away from the door glass 4. The clearance change portion 21 is provided between the reinforcement member 19B and the door glass 4.

The lower end portion of the clearance change portion 21 is connected to the center portion of the reinforcement member 19, for example, by welding. The upper end portion of the clearance change portion 21 is connected to the center portion of the door-glass support member 17, for example, by welding. The door-glass support member 17 is connected to the lower edge of the door glass 4 to support the door glass 4. The clearance change portion 21 is stretched and shrunk in the vehicle-height direction. When the clearance change portion 21 is stretched or shrunk according to the instruction from the ECU 14D, the clearance between the door glass 4 and the reinforcement member 19B is changed. Thus, the clearance change portion 21 moves the reinforcement member 19B upward or downward in the vehicle-height direction. The clearance change portion 21 will be described in detail below.

Next, the configuration of the electric system portion of the vehicular door 1H in the ninth embodiment will be described. The clearance sensor 22 detects the clearance between the door glass 4 and the reinforcement member 19B, which is adjusted by the clearance change portion 21. For example, the clearance sensor 22 is provided in the clearance change portion 21. More specifically, the clearance sensor 22 detects the clearance between the door glass 4 and the reinforcement member 19B, by detecting the amount by which an electric actuator 21g rotates, and the direction in which the electric actuator 21g rotates. The electric actuator 21g is provided in the clearance change portion 21, and will be described below. The clearance sensor 22 outputs a clearance signal to the ECU 14D. The clearance signal has the value that indicates the detected clearance.

The CCD camera 23 captures an image to detect the position of the bumper of the other vehicle. For example, the CCD camera 23 is provided in the bumper, side mirror, rearview mirror or the like of the host vehicle. The CCD camera 23 captures an image in a predetermined range beside the vehicle, and outputs an image signal to the ECU 14D. The image signal indicates the captured image.

The suspension stroke sensor 24 detects the stroke amount of the suspension. The suspension stroke sensor 24 functions as the vehicle-height detection device in the embodiment. The suspension stroke sensor 24 outputs the stroke signal to the ECU 14D. The stroke signal has the value that indicates the detected stroke amount of the suspension.

The ECU 14D differs from the ECU 14 in the fifth embodiment in that the ECU 14D includes a second determination portion 14Db instead of the second determination portion 14b; and a drive portion 14Dc instead of the drive portion 14c. The ECU 14D differs from the ECU 14 in the fifth embodiment also in that the ECU 14D further includes a bumper detection portion 14Dd. The first determination portion 14Da of the ECU 14D is the same as the first determination portion 14a of the ECU 14. Therefore, the description thereof will be omitted. The bumper detection portion 14Dd detects the other vehicle and the position of the bumper of the other vehicle, by performing image processing on the image received from the CCD camera 23. In the embodiment, the bumper detection portion 14Dd and the CCD camera 23 function as the bumper detection device in the embodiment.

The second determination portion 14Db determines whether the height position of the reinforcement member 19B matches the height position of the bumper of the other vehicle, based on the ground height of the bumper of the other vehicle detected by the bumper detection portion 14Dd, the operation-amount signal transmitted from the window sensor 13, the clearance signal transmitted from the clearance sensor 22, and the stroke signal transmitted from the suspension stroke sensor 24. More specifically, the second determination portion 14Db determines the amount of change in the stroke amount of the suspension based on the stroke amount of the suspension when no load is applied to the vehicle, for example, at the time of shipment, and the stroke amount indicated by the stroke signal. The stroke amount of the suspension when no load is applied to the vehicle is stored in the memory or the like in advance. The second determination portion 14Db determines the ground height of the reinforcement member 19B, based on the determined amount of change in the stroke amount, the operation amount of the door glass 4 indicated by the operation-amount signal, and the clearance between the door glass 4 and the reinforcement member 19B indicated by the clearance signal. Then, the second determination portion 14Db determines whether the ground height of the reinforcement member 19B matches the ground height of the bumper of the other vehicle. In the embodiment, if the difference between the ground height of the reinforcement member 19B and the ground height of the bumper of the other vehicle is in a predetermined range, it is regarded that the ground height of the reinforcement member 19B matches the ground height of the bumper of the other vehicle.

If the second determination portion 14Db determines that the ground height of the reinforcement member 19B does not match the ground height of the bumper of the other vehicle, the drive portion 14Dc provides the instruction to the clearance change portion 7 so that the ground height of the reinforcement member 19B matches the ground height of the bumper of the other vehicle. At this time, it is preferable that the drive portion 14Dc should provide the instruction to the window electric motor 15 so that the window electric motor 15 closes the door glass 4. The drive portion 14Dc functions as the drive device in the embodiment.

If the ground height of the bumper of the other vehicle is not detected by the bumper detection portion 14Dd, the drive portion 14Dc provides the instruction to the clearance change portion 21 so that the reinforcement member 19B is moved to a predetermined position. The predetermined position is the position of the bumper of an ordinary vehicle. That is, the predetermined position is the position of approximately 400 mm to 500 mm above the ground. At this time, it is preferable that the drive portion 14Dc should provide the instruction to the window electric motor 15 so that the window electric motor 15 closes the door glass 4.

Figure 36:
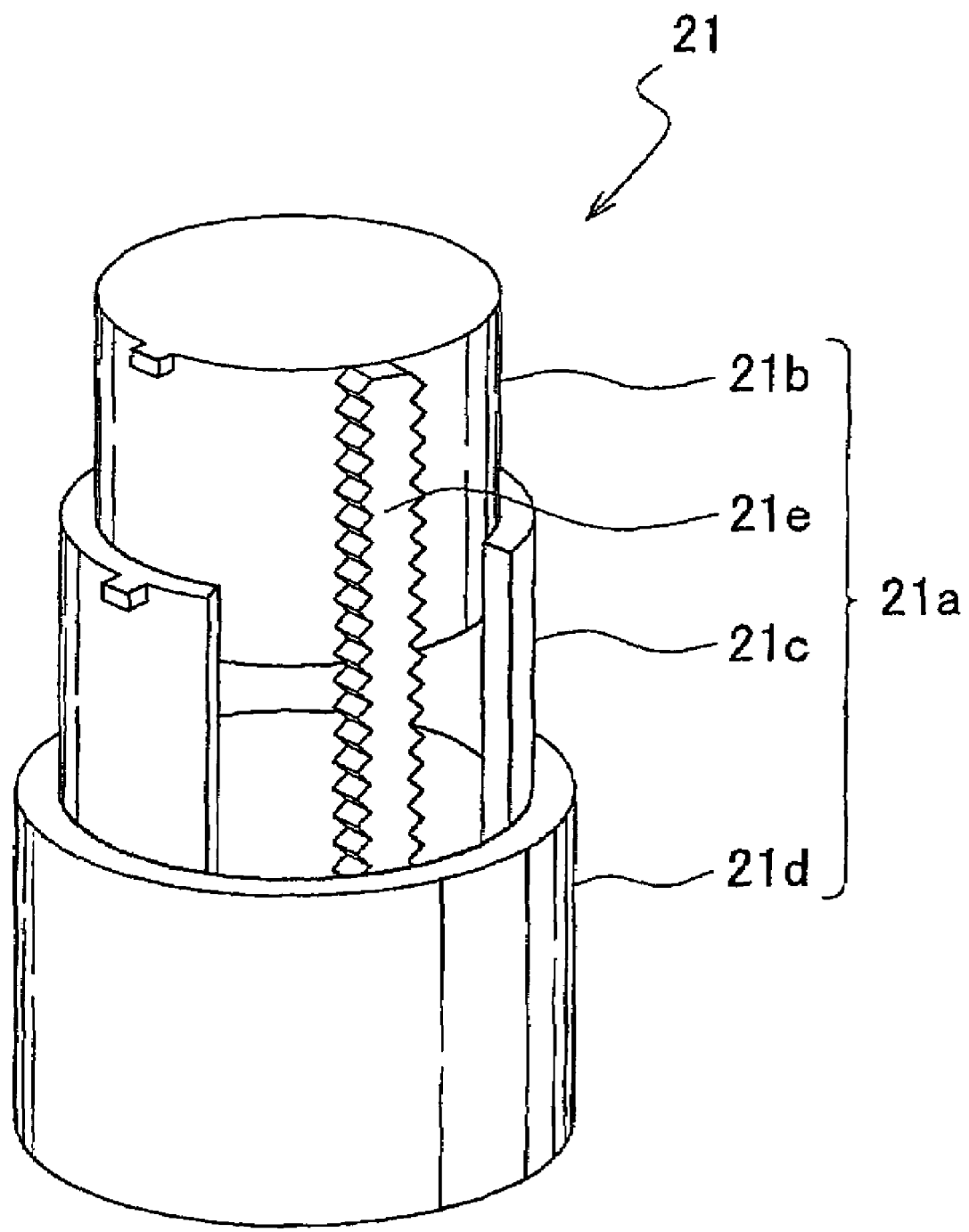
FIG. 36 is a perspective view showing a clearance change portion.
Figure 37:
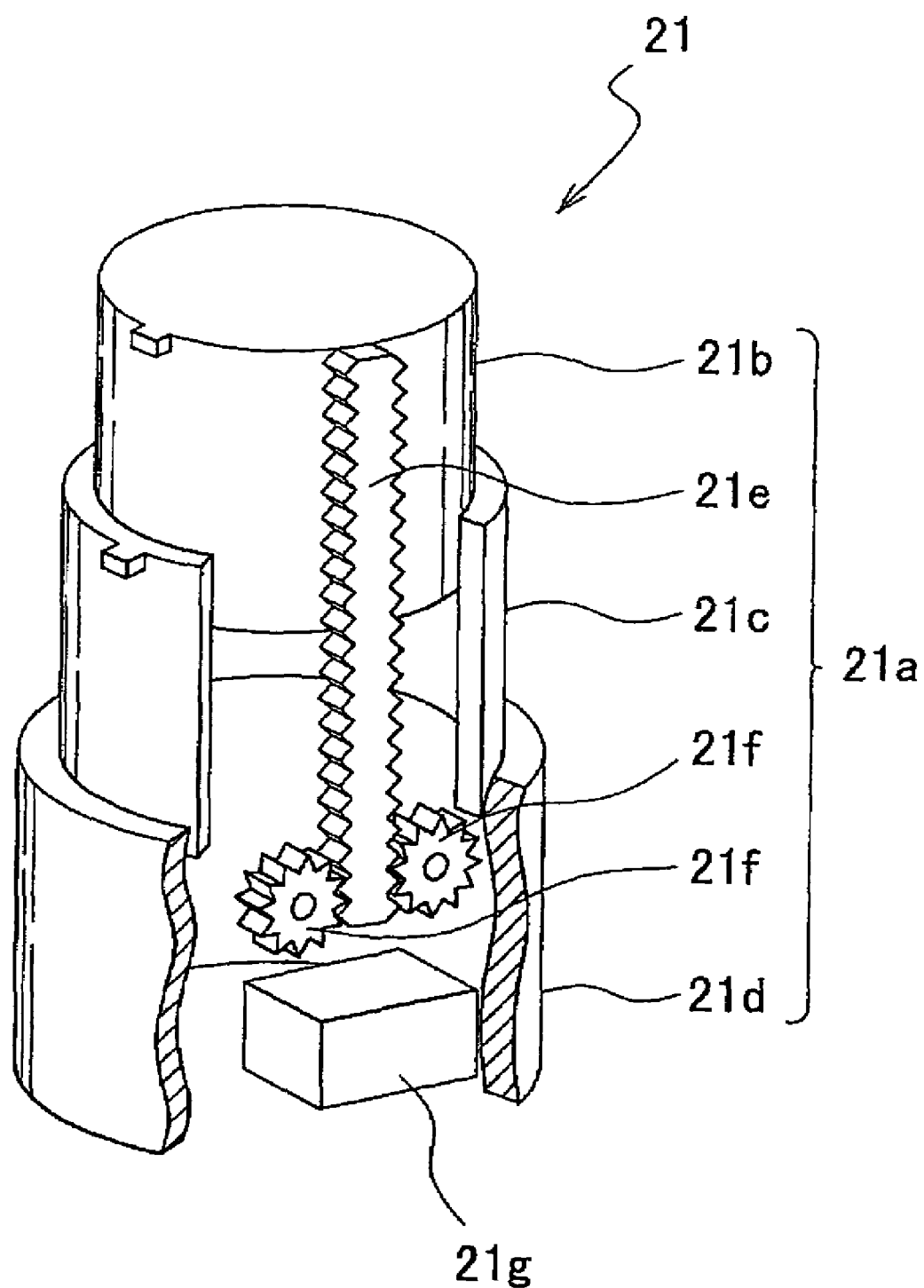
FIG. 37 is a partially cutaway perspective view showing the clearance change portion.

Next, the clearance change portion 21 will be described in detail. FIG. 36 is a perspective view showing the clearance change portion 21. FIG. 37 is a partially cutaway perspective view showing the clearance change portion 21. As shown in FIG. 36 and FIG. 37, in the embodiment, the clearance change portion 21 includes a rack-and-pinion stretchable member 21a and the electric actuator 21g.

In the embodiment, the stretchable member 21a includes members 21b, 21c, and 21d that are substantially cylindrical. The member 21c is provided inside the hole of the member 21d. The member 21b is provided inside the hole of the member 21c. A rack 21e is provided on the outer surface of the member 21b. Pinions 21f and the electric actuator 21g are provided inside the hole of the member 21d.

In the embodiment, the electric actuator 21g is an electric motor. The electric actuator 21g transmits the rotational force to the pinions 21f through a transmission mechanism (not shown), according to the instruction from the ECU 14D. Thus, when the electric actuator 21g and the pinions 21f rotate in a normal direction or a reverse direction, the members 21b and 21c sequentially move upward or downward. As a result, the stretchable member 21a is stretched or shrunk.

Next, the operation of a vehicle door 1H according to a ninth embodiment will be described. First, the radar sensor 12 determines whether there is an object beside the vehicle. The radar sensor 12 detects the distance between the vehicle and the object, and the speed of the vehicle relative to the object. Then, the radar sensor 12 outputs the distance signal and the speed signal to the ECU 14D. The distance signal has the value that indicates the distance between the vehicle and the object. The speed signal has the value that indicates the speed of the vehicle relative to the object. Also, the window sensor 13 detects the operation amount of the door glass 4, and outputs the operation-amount signal to the ECU 14D. The operation-amount signal has the value that indicates the operation amount of the door glass 4. The clearance sensor 22 detects the clearance between the door glass 4 and the reinforcement member 19B, and outputs the clearance signal to the ECU 14D. The clearance signal has the value that indicates the clearance. The CCD camera 23 captures the image beside the vehicle, and outputs the image signal to the ECU 14D. The image signal indicates the captured image. The suspension stroke sensor 24 detects the stroke amount of the suspension, and outputs the stroke signal to the ECU 14D. The stroke signal has the value that indicates the stroke amount.

Figure 38:
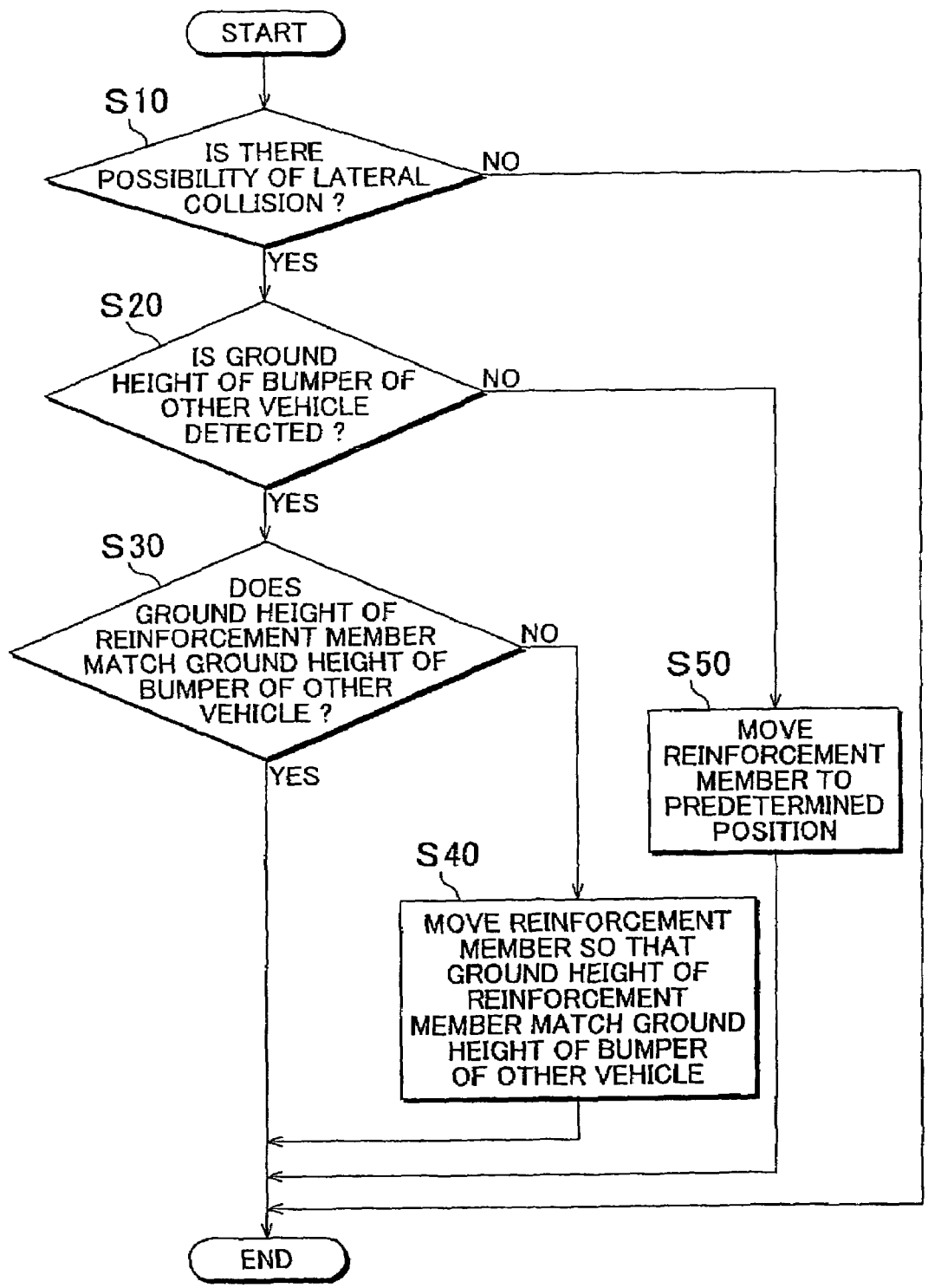
FIG. 38 is a flowchart showing the operation of an ECU in the ninth embodiment.

FIG. 38 is a flowchart showing the operation of the ECU 14D. First, the first determination portion 14Da determines whether there is a possibility of a lateral collision with an object, based on the distance signal and the speed signal received from the radar sensor 12 (step S10). If the first determination portion 14Da determines that there is no possibility of a lateral collision, the routine is finished.

If the first determination portion 14Da determines that there is the possibility of the lateral collision, the bumper detection portion 14Dd detects the ground height of the bumper of the other vehicle that may collide with the lateral portion of the host vehicle, based on the image indicated by the image signal received from the CCD camera 23 (step S20).

If the bumper detection portion 14Dd detects the ground height of the bumper of the other vehicle, the second determination portion 14Db determines whether the ground height of the reinforcement member 19B matches the ground height of the bumper of the other vehicle, based on the detected ground height of the bumper of the other vehicle, the operation-amount signal received from the window sensor 13, the clearance signal received from the clearance sensor 22, the stroke signal received from the suspension stroke sensor 24, and the stroke amount of the suspension when no load is applied to the vehicle, for example, at the time of shipment (step S30). The stroke amount of the suspension when no load is applied to the vehicle is stored in the memory or the like in advance.

If the second determination portion 14Db determines that the ground height of the reinforcement member 19B matches the ground height of the bumper of the other vehicle, the routine is finished.

If the second determination portion 14Db determines that the ground height of the reinforcement member 19B does not match the ground height of the bumper of the other vehicle, the drive portion 14Dc provides the instruction to the clearance change portion 21 so that the clearance change portion 21 is stretched or shrunk. Thus, the reinforcement member 19B is moved so that the ground height of the reinforcement member 19B matches the ground height of the bumper of the other vehicle (step S40). At this time, it is preferable that the drive portion 14Dc should provide the instruction to the window electric motor 15 so that the window electric motor closes the door glass 4.

If the ground height of the bumper of the other vehicle is not detected by the bumper detection portion 14Dd, the drive portion 14Dc provides the instruction to the clearance change portion 21 so that the clearance change portion 21 is stretched or shrunk. Thus, the reinforcement member 19B is moved to the predetermined position (step S50). At this time, it is preferable that the drive portion 14Dc should provide the instruction to the window electric motor 15 so that the window electric motor 15 closes the door glass 4.

Figure 39:
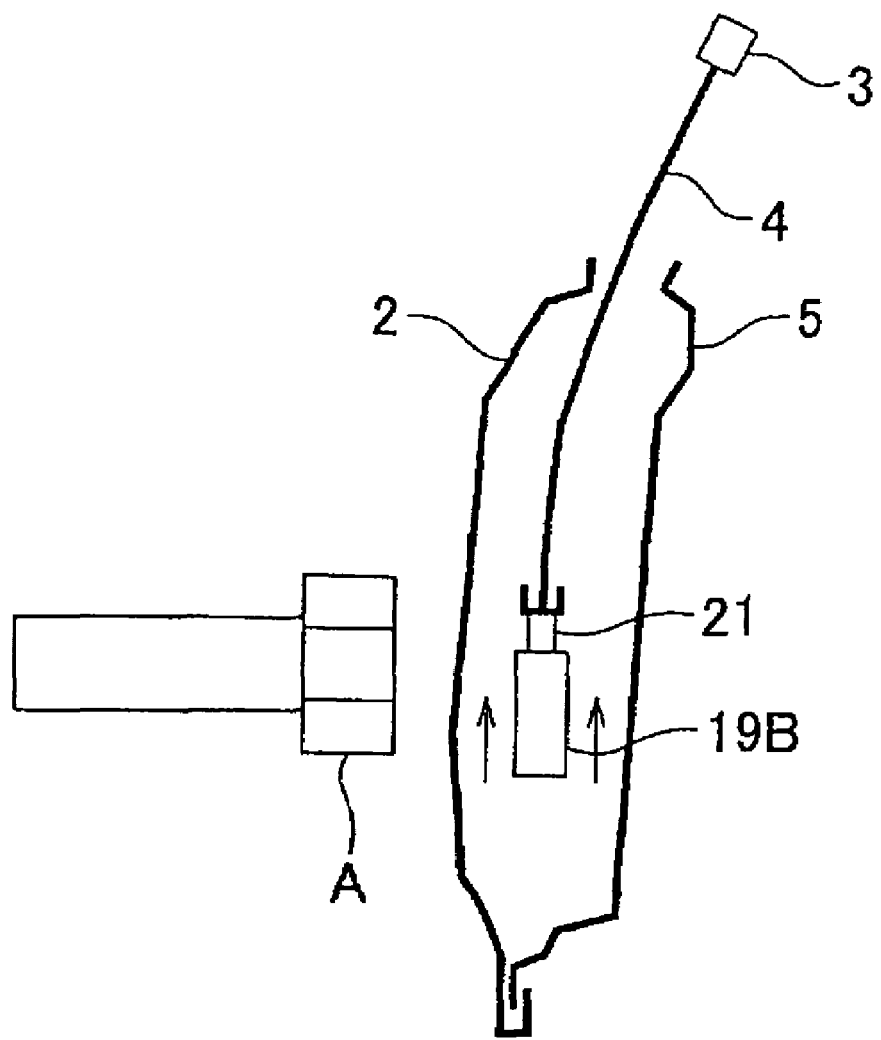
FIG. 39 is a diagram showing the vehicular door when a host vehicle has a lateral collision with another vehicle that has a bumper disposed at a high position above the ground.
Figure 40:
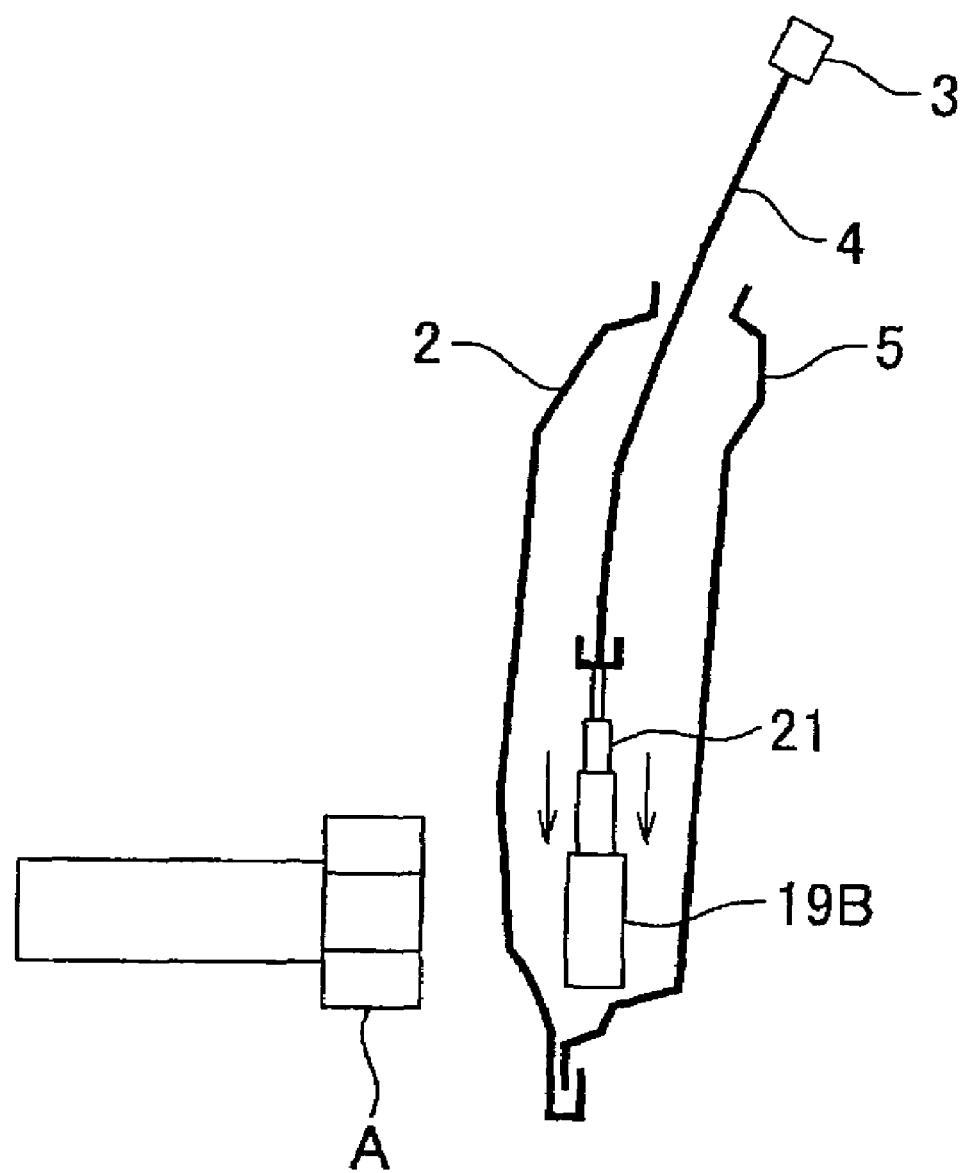
FIG. 40 is a diagram showing the vehicular door when the host vehicle has a lateral collision with another vehicle that has a bumper disposed at a low position above the ground.

FIG. 39 is a diagram showing the vehicular door when the host vehicle has a lateral collision with the other vehicle that has a bumper disposed at a high position above the ground. FIG. 40 is a diagram showing the vehicular door when the host vehicle has a lateral collision with the other vehicle that has a bumper disposed at a low position above the ground. In the case where the other vehicle is a sport utility vehicle or the like, and a bumper A is disposed at a high position above the ground as shown in FIG. 39, it is possible to make the ground height of the reinforcement member 19B match the ground height of the bumper of the other vehicle, by closing the door glass 4, and shrinking the clearance change portion 21 at the time of a lateral collision. In the case where the other vehicle is a sport-type car or the like, and the bumper A is disposed at a low position above the ground as shown in FIG. 40, it is possible to make the ground height of the reinforcement member 19B match the ground height of the bumper of the other vehicle, by closing the door glass 4 and stretching the clearance change portion 21 at the time of a lateral collision.

Thus, in the vehicular door 1H according to the ninth embodiment, when there is the possibility of the lateral collision with the other vehicle, the drive portion 14Dc moves the reinforcement member 19B upward or downward, based on the ground height of the bumper of the other vehicle, which is detected by the bumper detection portion 14Dd. Accordingly, regardless of the ground height of the bumper of the other vehicle that may collide with the lateral portion of the host vehicle, it is possible to make the ground height of the reinforcement member 19B match the ground height of the bumper of the other vehicle when the host vehicle has a lateral collision with the other vehicle. Thus, a collision load applied from the other vehicle can be supported by the reaction force in the reinforcement member 19B whose both ends are supported by the pillars 25 and 26. This suppresses the local deformation of the door. Thus, the vehicular door 1H is effective for reducing the damage to the occupant.

In the vehicular door 1H in the ninth embodiment, the reinforcement member 19B can be moved upward or downward. Therefore, the width of the reinforcement member 19B in the vehicle-height direction does not need to be increased. This suppresses the increase in the weight of the vehicular door. Accordingly, it is possible to suppress the increase in the weight of the vehicular door, and to suppress the local deformation of the vehicular door when the host vehicle has a lateral collision with the other vehicle, regardless of the ground height of the bumper of the other vehicle.

In the vehicular door 1H in the ninth embodiment, the drive portion 14Dc moves the reinforcement member 19B upward or downward, also based on the ground height of the host vehicle, which is detected by the suspension stroke sensor 24. Accordingly, even when the vehicle height of the host vehicle varies depending on the number of occupants, and the load applied to the vehicle, it is possible to move the reinforcement member 19B to the appropriate position when the host vehicle has a lateral collision with the other vehicle.

In the vehicular door 1H in the ninth embodiment, the drive portion 14Dc moves the reinforcement member 19B upward or downward based on the ground height of the bumper of the other vehicle, which is detected by the CCD camera 23. Therefore, even when the ground height of the bumper of the other vehicle varies depending on the behavior of the vehicle, for example, "nose-dive" at the time of braking, it is possible to move the reinforcement member 19B to the appropriate position when the host vehicle has a lateral collision with the other vehicle.

In the vehicular door 1H in the ninth embodiment, the clearance change portion 21 is provided between the reinforcement member 19B and the door glass 4, and the drive portion 14Dc changes the clearance between the door glass 4 and the reinforcement member 19B by stretching or shrinking the clearance change portion 21. As a result, the reinforcement member 19B is moved upward or downward. Accordingly, the reinforcement member 19B can be moved even if the door glass 4 is closed when the host vehicle has a lateral collision with the other vehicle. This improves the safety of the occupant.

In the vehicular door 1H in the ninth embodiment, even when the ground height of the bumper of the other vehicle is not detected by the bumper detection portion 14Dd, the reinforcement member 19B is moved upward or downward to the predetermined position. Therefore, the reinforcement member 19B can be moved to the appropriate position.

Tenth Embodiment

Figure 41:
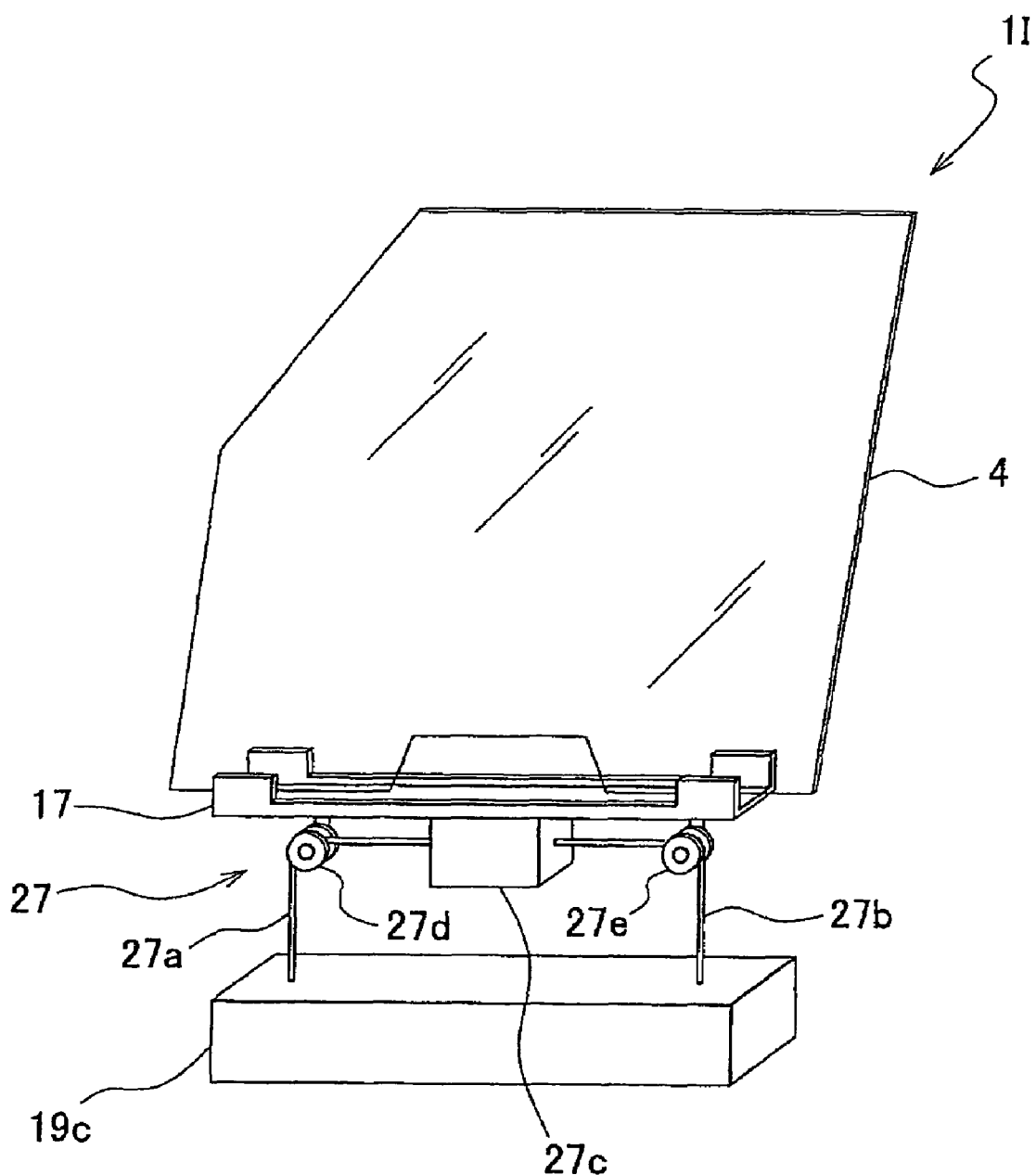
FIG. 41 is a perspective view showing only the main portion of a vehicular door according to a tenth embodiment of the invention.

Next, the configuration of a vehicular door according to a tenth embodiment of the invention will be described with reference to FIG. 41. FIG. 41 is a perspective view showing only the main portion of the vehicular door according to the tenth embodiment of the invention.

As shown in FIG. 41, the vehicular door 1I in the tenth embodiment differs from the vehicular door 1H in the ninth embodiment in that the vehicular door 1I includes a clearance change portion 27 instead of the clearance change portion 21 in the vehicular door 1H. The other portion of the configuration of the vehicular door 1I is the same as those of the vehicular door 1H. Therefore, the description thereof will be omitted.

The clearance change portion 27 includes wires 27a and 27b; an electric actuator 27c, and wire guides 27d and 27e.

One end of the wire 27a is connected to one end side of the upper surface of the reinforcement member 19C. The other end of the wire 27a is reeled by the electric actuator 27c. Similarly, one end of the wire 27b is connected to the other end side of the upper surface of the reinforcement member 19C. The other end of the wire 27b is reeled by the electric actuator 27c. The wires 27a and 27b are supported by the wire guides 27d and 27e, respectively.

In the embodiment, the electric actuator 27c includes an electric motor, and a reel mechanism that reels the wires 27a and 27b when the electric motor rotates according to the instruction from the ECU 14D. The electric actuator 27c moves the reinforcement member 19C upward by reeling the wires 27a and 27b. Also, the electric actuator 27c moves the reinforcement member 19C downward by unreeling the wires 27a and 27b.

The wire guides 27d and 27e are connected to lower portions of the both end portions of the door-glass support member 17. When the reinforcement member 19C is moved upward or downward, the wire guides 27d and 27e guide the wires 27a and 27b.

Thus, in the vehicular door 1I in the tenth embodiment, the clearance change portion 27 can move the reinforcement member 19C upward or downward according to the instruction from the ECU 14D. Therefore, it is possible to obtain the same advantages as those obtained in the ninth embodiment. Further, in the vehicular door 1I in the tenth embodiment, it is possible to increase the speed at which the wires 27a and 27b are unreeled from the electric actuator 27c, and the speed at which the reinforcement member 19C is moved downward, because of the gravitational acceleration applied to the reinforcement member 19C. Therefore, it is possible to make the ground height of the reinforcement member 19C match the ground height of the bumper of the other vehicle quickly, as compared to the vehicular door 1H in the ninth embodiment.

Eleventh Embodiment

Figure 42:
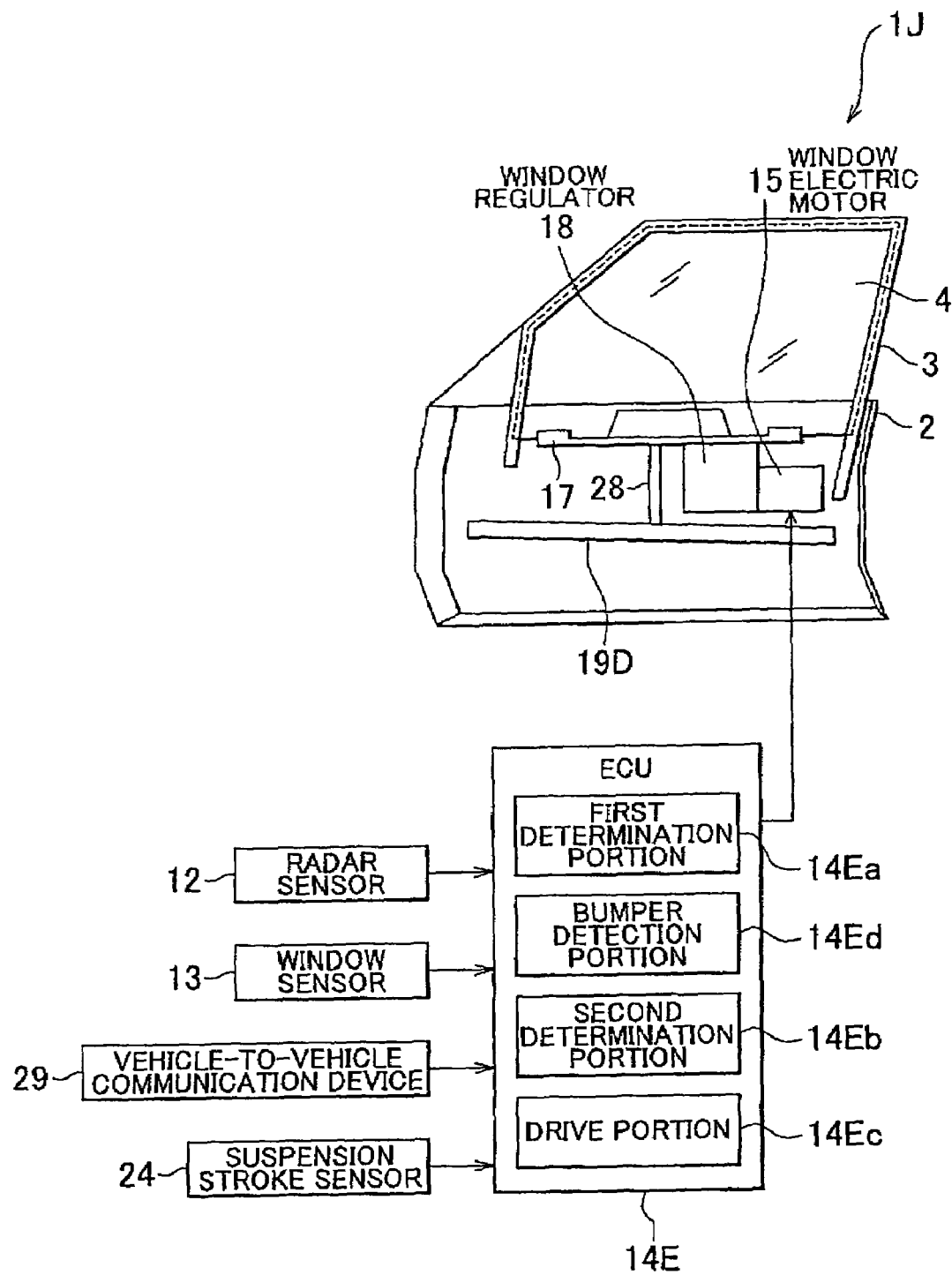
FIG. 42 is a diagram showing a vehicular door according to an eleventh embodiment of the invention, which is viewed from the inner surface-side of the vehicle.

Next, the configuration of a vehicular door according to an eleventh embodiment of the invention with reference to FIG. 42. FIG. 42 is a diagram showing the vehicular door according to the eleventh embodiment of the invention, which is viewed from the inside of the vehicle compartment. In FIG. 42, the inner panel is omitted so that the characteristic portions of the embodiment are clearly shown. Also, a circuit block diagram of the electric system portion is shown.

The vehicular door 1J shown in FIG. 42 differs from the vehicular door 1H in the ninth embodiment in that the vehicular door 1J includes a clearance fixing member 28 instead of the clearance change portion 21; and a vehicle-to-vehicle communication device 29 instead of the CCD camera 23. The vehicular door 1J differs from the vehicular door 1H in the ninth embodiment also in that the vehicular door 1J includes an ECU 14E instead of the ECU 14D, and the vehicular door 1J does not include the clearance sensor 22. The other portions of the configuration of the vehicular door 1J are the same as those of the vehicular door 1H. Therefore, the description thereof will be omitted.

The clearance fixing member 28 differs from the clearance change portion 21 in that the clearance fixing member 28 is not stretched or shrunk, and the length of the clearance fixing member 28 is fixed.

The vehicle-to-vehicle communication device 29 stores information concerning the host vehicle. The vehicle-to-vehicle communication device 29 transmits the information, and receives information concerning the other vehicle from a vehicle-to-vehicle communication device provided in the other vehicle. The vehicle-to-vehicle communication device 29 detects the ground height of the bumper of the other vehicle, based on the received information concerning the other vehicle. Then, the vehicle-to-vehicle communication device 29 outputs the information concerning the detected ground height of the bumper to the ECU 14E.

The ECU 14E differs from the ECU 14D in that the ECU 14E includes a bumper detection portion 14Ed instead of the bumper detection portion 14Dd; a second determination portion 14Eb instead of the second determination portion 14Db; and a drive portion 14Ec instead of the drive portion 14Dc. The other portions of the configuration of the ECU 14E are the same as those of the ECU 14D. Therefore, the description thereof will be omitted.

The bumper detection portion 14Ed detects the other vehicle, and the position of the bumper of the other vehicle, and determines the ground height of the bumper, based on the information concerning the ground height of the bumper of the other vehicle received from the vehicle-to-vehicle communication device 29.

The second determination portion 14Eb determines whether the ground height of the reinforcement member 19D matches the ground height of the bumper of the other vehicle, based on the ground height of the bumper of the other vehicle, which is detected by the bumper detection portion 14Ed, the operation-amount signal received from the window sensor 13, the stroke signal received from the suspension stroke sensor 24, and the stroke amount of the suspension when no load is applied to the vehicle, for example, at the time of shipment. The stroke amount of the suspension when no load is applied to the vehicle is stored in the memory or the like in advance.

If the second determination portion 14Eb determines that the ground height of the reinforcement member 19D does not match the ground height of the bumper of the other vehicle when there is a possibility of a lateral collision, the drive portion 14Ec provides the instruction to the window electric motor 15 so that the ground height of the reinforcement member 19D matches the ground height of the bumper of the other vehicle.

If the ground height of the bumper of the other vehicle is not detected by the bumper detection portion 14Ed, the drive portion 14Ec provides the instruction to the window electric motor 15 so that the reinforcement member 19D is moved to the predetermined position.

Figure 43:
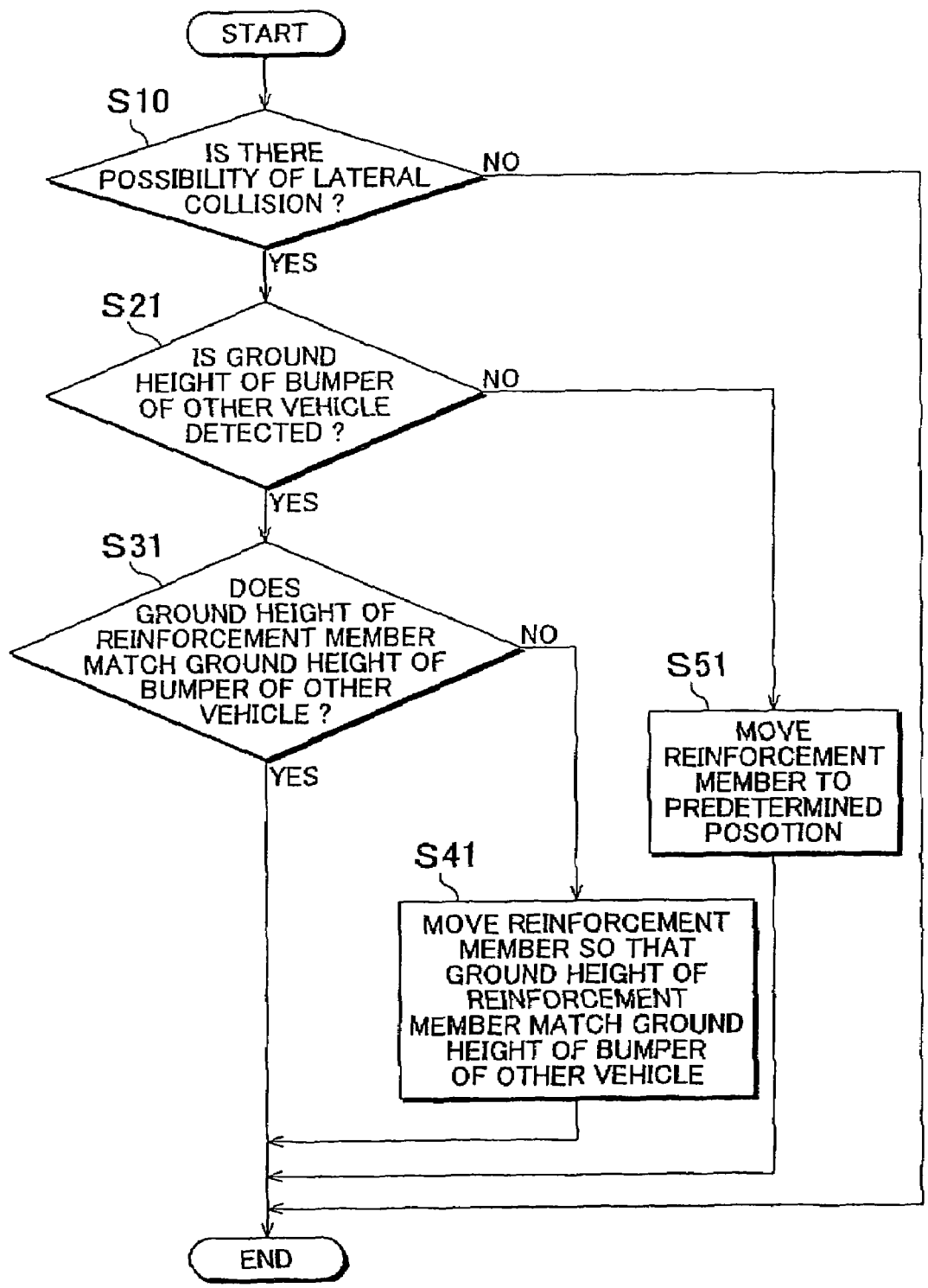
FIG. 43 is a flowchart showing the operation of an ECU in the eleventh embodiment.

FIG. 43 is a flowchart showing the operation of the ECU 14E in the eleventh embodiment FIG. 43 differs from FIG. 38 in that step S21 is performed instead of step S20; step S31 is performed instead of step S30; step S41 is performed instead of step S40; and step S51 is performed instead of step S50. Other steps performed in the vehicular door 1J are the same as those in the ninth embodiment Therefore, the description thereof will be omitted.

In step S21, the bumper detection portion 14Ed detects the ground height of the bumper of the other vehicle that may collide with the lateral portion of the host vehicle, based on the information concerning the ground height of the bumper of the other vehicle received from the vehicle-to-vehicle communication device 29.

In step S31, the second determination portion 14Eb determines whether the ground height of the reinforcement member 19D matches the ground height of the bumper of the other vehicle, based on the ground height of the bumper of the other vehicle, which is detected by the bumper detection portion 14Ed, the operation-amount signal received from the window sensor 13, the stroke signal received from the suspension stroke sensor 24, and the stroke amount of the suspension when no load is applied to the vehicle, for example, at the time of shipment. The stroke amount of the suspension when no load is applied to the vehicle is stored in the memory or the like in advance.

In step S41, the drive portion 14Ec provides the instruction to the window electric motor 15, and the window electric motor 15 opens or closes the door glass 4. Thus, the reinforcement member 19D is moved so that the ground height of the reinforcement member 19D matches the ground height of the bumper of the other vehicle.

In step S51, the drive portion 14Ec provides the instruction to the window electric motor 15, and the window electric motor 15 opens or closes the door glass 4. Thus, the reinforcement member 19D is moved to the predetermined position.

Figure 44:
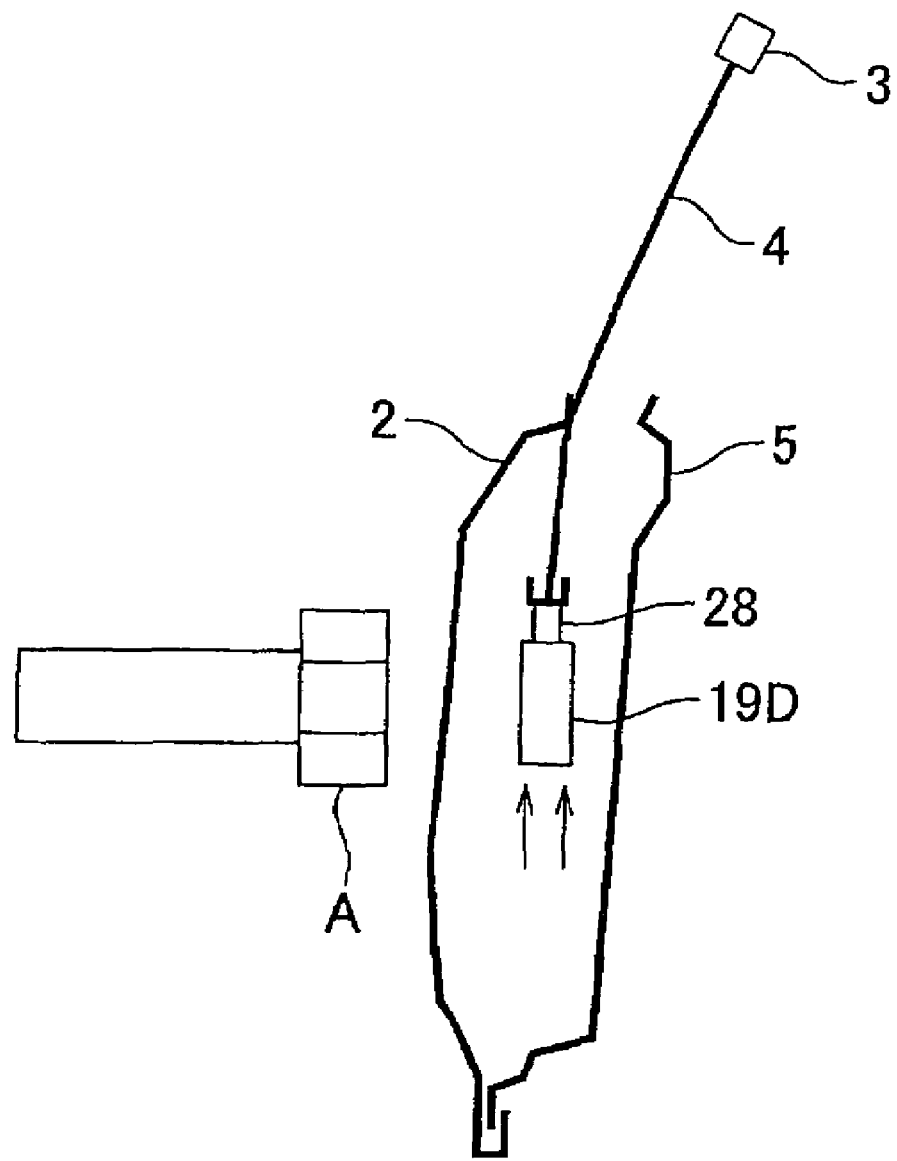
FIG. 44 is a diagram showing the vehicular door when the host vehicle has a lateral collision with another vehicle that has a bumper disposed at a high position above the ground.
Figure 45:
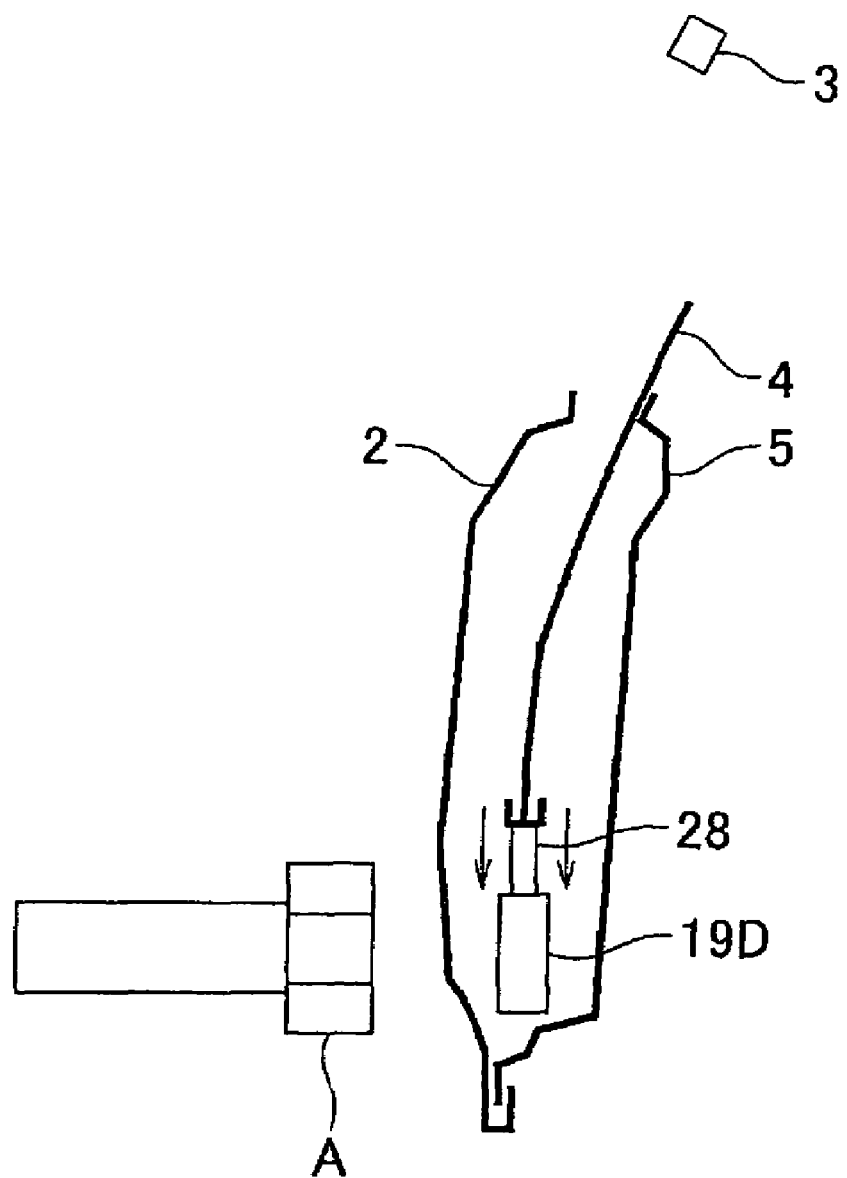
FIG. 45 is a diagram showing the vehicular door when the host vehicle has a lateral collision with another vehicle that has a bumper disposed at a low position above the ground.

FIG. 44 is a diagram showing the vehicular door when the host vehicle has a lateral collision with the other vehicle that has a bumper disposed at a high position above the ground. FIG. 45 is a diagram showing the vehicular door when the host vehicle has a lateral collision with the other vehicle that has a bumper disposed at a low position above the ground. In the case where the other vehicle is a sport utility vehicle or the like, and a bumper A is disposed at a high position above the ground as shown in FIG. 44, it is possible to make the ground height of the reinforcement member 19D match the ground height of the bumper of the other vehicle by closing the door glass 4 at the time of a lateral collision. In the case where the other vehicle is a sport-type car or the like, and the bumper A is disposed at a low position above the ground as shown in FIG. 45, it is possible to make the ground height of the reinforcement member 19D match the ground height of the bumper of the other vehicle by opening the door glass 4 at the time of a lateral collision.

Thus, in the vehicular door 1J in the eleventh embodiment, it is possible to obtain the same advantages as those obtained in the ninth embodiment.

The invention is not limited to the above-described embodiments. Various modifications may be made.

In the embodiments, the clearance change portions 21 and 27 are employed as the mechanisms that move the reinforcement member 19B and 19C upward or downward. However, the mechanisms that move the reinforcement members 19B and 19C upward or downward are not limited to the clearance change portions 21 and 27. For example, the mechanism that moves the reinforcement member 19B or 19C may have the same structure as that of a stretchable antenna for a vehicle. More specifically, the mechanism that moves the reinforcement member 19B or 19C upward or downward may include a stretchable member, a wire, and a reel mechanism. The stretchable member is composed of a plurality of cylindrical members that have different inner diameters. The stretchable member is formed by arranging the cylindrical members such that the cylinder at the innermost position has the smallest inner diameter, and the cylinder at the outermost position has the largest inner diameter. The wire is provided in the stretchable member. The reel mechanism reels and unreels the wire. In this structure, when the reel mechanism reels or unreels the wire, the stretchable member is stretched or shrunk.

The mechanism that moves the reinforcement member 19B or 19C may include a screw and a cylinder. More specifically, the mechanism that moves the reinforcement member 19B or 19C may include an electric motor that has a screw fixed to the reinforcement member 19B or 19C; and a nut cylinder fixed to the door glass. When the electric motor rotates, the screw is screwed into, or unscrewed from the nut cylinder, that is, the length of the screw is changed.

Figure 46:
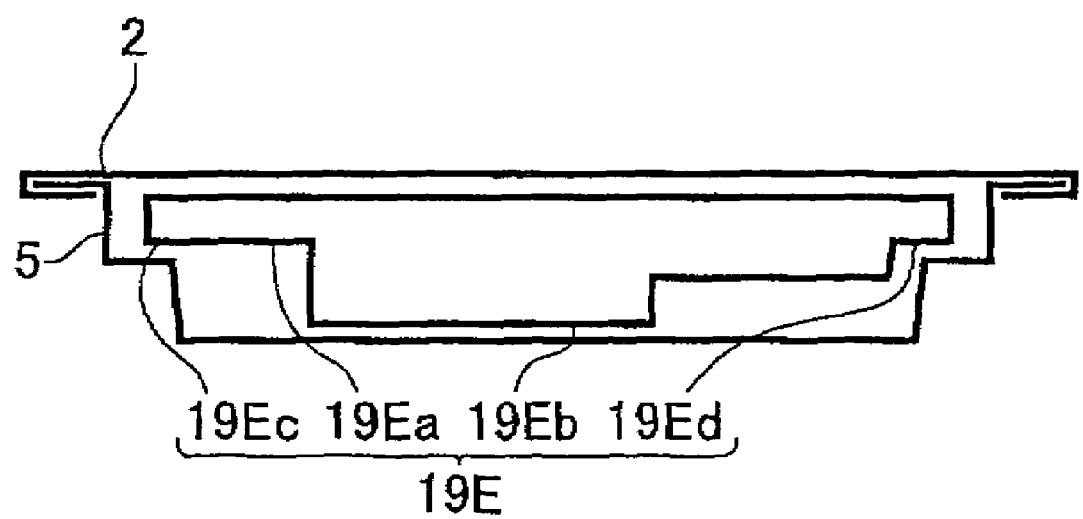
FIG. 46 is a diagram showing a reinforcement member according to a modified example.

In the embodiments, an example of the shape of the reinforcement member is described. However, the shape of the reinforcement is not limited to the shape in the embodiments. For example, the reinforcement member may have a shape shown in FIG. 46. The reinforcement member 19E shown in FIG. 46 includes a first portion 19Ea and a second portion 19Eb. The first portion 19Ea has a substantially rectangular parallelepiped shape, and extends in the vehicle fore-and-aft direction. Each of both end portions 19Ec and 19Ed of the first portion 19Ea is adjacent to the framework member of the vehicle in the vehicle-width direction. The second portion 19Eb is continuous with the center portion of the inner surface of the first portion 19Ea in the vehicle fore-and-aft direction. The second portion 19Eb has a substantially rectangular parallelepiped shape, and extends in the vehicle-width direction.

What is claimed is:

1. A vehicular door comprising:
    an outer panel;
    an inner panel provided on an inner surface-side of the outer panel;
    a side impact beam provided between the outer panel and the inner panel;
    a support member which is provided between the inner panel and the side impact beam, and which is connected to at least one of the inner panel and the side impact beam; and
    a moving device that moves a door glass upward and downward, the moving device being disposed so that the support member does not overlap with the moving device in a longitudinal direction of the door.

2. The vehicular door according to claim 1, wherein
    the support member includes a first portion and a second portion that are adjacent to each other in a vehicle-width direction; and
    the first portion is adjacent to the side impact beam, and an upper end of the second portion is lower than an upper end of the first portion in a vehicle-height direction.

3. The vehicular door according to claim 1, wherein the support member is provided to face a center portion of the side impact beam in a longitudinal direction.

4. The vehicular door according to claim 1, wherein a bulk is provided on an inner side of the support member.

5. The vehicular door according to claim 1, wherein the support member has a cup shape.

6. The vehicular door according to claim 1, wherein a bead portion is provided in the support member.

7. The vehicular door according to claim 1, wherein a side impact beam-side of the support member has an arc shape.

8. The vehicular door according to claim 1, wherein the support member is made of a resin material, and has a block shape.

9. A vehicular door comprising:
an outer panel;
an inner panel provided on an inner surface-side of the outer panel;
a side impact beam provided between the outer panel and the inner panel;
a load-receiving member which is provided between the inner panel and the side impact beam, and provided away from the inner panel, and which has both end portions connected to at least one of the inner panel and the side impact beam;
a support member which is provided between the load-receiving member and the side impact beam, and which is connected to at least one of the load-receiving member and the side impact beam; and
a moving device that moves a door glass upward and downward, the moving device being disposed so that the support member does not overlap with the moving device in a longitudinal direction of the door.

10. The vehicular door according to claim 9, wherein the support member includes a recess through which the load-receiving member is guided.

11. The vehicular door according to claim 9, wherein the support member is a clip member that can be connected to both of the load-receiving member and the side impact beam.

12. The vehicular door comprising:
an outer panel;
an inner panel provided on an inner surface-side of the outer panel;
a side impact beam provided between the outer panel and the inner panel;
a door glass;
a support member which is connected to a lower portion of the door glass, and which is disposed between the inner panel and the side impact beam;
an electric motor that moves the door glass upward or downward;
a sensor that detects an object beside a vehicle;
a determination device that determines whether there is a possibility of a lateral collision with the object based on a signal from the sensor; and
a drive device that drives the electric motor so that the support member is adjacent to the side impact beam in a vehicle-width direction with the door glass when the determination device determines that there is the possibility of the lateral collision.

13. A vehicular door comprising:
an outer panel;
an inner panel provided on an inner surface-side of the outer panel;
door glass; and
a reinforcement member which has a first portion and a second portion, and which is connected to a lower portion of the door glass, and provided between the outer panel and the inner panel, wherein the first portion extends in a vehicle fore-and-aft direction, and has both end portions each of which is adjacent to a vehicle framework member in a vehicle-width direction, and the second portion is continuous with the first portion, and extends in the vehicle-width direction.

14. The vehicular door according to claim 13, further comprising:
an electric motor that moves the door glass upward or downward;
a sensor that detects an object beside a vehicle;
a determination device that determines whether there is a possibility of a lateral collision with the object based on a signal from the sensor; and
a drive device that drives the electric motor so that the reinforcement member is disposed at a predetermined position when the determination device determines that there is the possibility of the lateral collision.

15. The vehicular door according to claim 14, further comprising:
a seated position detection device that detects a position at which an occupant is seated,
wherein when the determination device determines that there is the possibility of the lateral collision, the drive device drives the electric motor so that the reinforcement member is disposed at a position that matches the position at which the occupant is seated in a vehicle-height direction.

16. The vehicular door according to claim 13, further comprising:
an other-vehicle detection device that detects a height position of a strengthening member of a vehicle other than a host vehicle; and
a drive device that moves the reinforcement member in the vehicle-height direction based on the height position of the strengthening member of the other vehicle, when there is a possibility that the host vehicle may have a lateral collision with the other vehicle.

17. The vehicular door according to claim 16, wherein
the other-vehicle detection device detects a height position of a bumper of the other vehicle; and
when there is the possibility that the host vehicle may have the lateral collision with the other vehicle, the drive device moves the reinforcement member in the vehicle-height direction based on the height position of the bumper of the other vehicle, which is detected by the other-vehicle detection device.

18. The vehicular door according to claim 16, wherein when the height position of the strengthening member of the other vehicle is not detected by the other-vehicle detection device, the drive device moves the reinforcement member to a predetermined height position.

19. The vehicular door according to claim 18, wherein when the height position of the strengthening member of the other vehicle is not detected by the other-vehicle detection device, the drive device moves the reinforcement member to a position of approximately 400 mm to 500 mm above a ground.

20. The vehicular door according to claim 16 further comprising:
a vehicle-height detection device that detects a vehicle height of the host vehicle,
wherein the drive device moves the reinforcement member based on the vehicle height of the host vehicle, which is detected by the vehicle-height detection device.

21. The vehicular door according to claim 16 further comprising:
a clearance change device which is disposed between the door glass and the reinforcement member to connect the door glass and the reinforcement, and which changes a clearance between the door glass and the reinforcement member,
wherein the drive device moves the reinforcement member by driving the clearance change device.

* * * * *